US012779539B2

(12) United States Patent
Holfelder-Schwalme et al.

(10) Patent No.: US 12,779,539 B2
(45) Date of Patent: Nov. 3, 2026

(54) DETERMINATION OF PROPERTY VALUES OF A SEGMENT OF A MANUFACTURING PRODUCT MADE OF A PLURALITY OF LAYERS OF A CONSTRUCTION MATERIAL

(71) Applicant: EOS GMBH ELECTRO OPTICAL SYSTEMS, Krailling (DE)

(72) Inventors: Peter Holfelder-Schwalme, Saal an der Donau (DE); Susanne Junghans, Munich (DE)

(73) Assignee: EOS GMBH ELECTRO OPTICAL SYSTEMS, Krailling (DE)

(*) Notice: Subject to any disclaimer, the term of this patent is extended or adjusted under 35 U.S.C. 154(b) by 78 days.

(21) Appl. No.: 18/293,336

(22) PCT Filed: Jul. 18, 2022

(86) PCT No.: PCT/EP2022/070101
§ 371 (c)(1),
(2) Date: Jan. 29, 2024

(87) PCT Pub. No.: WO2023/006485
PCT Pub. Date: Feb. 2, 2023

(65) Prior Publication Data
US 2025/0091134 A1 Mar. 20, 2025

(30) Foreign Application Priority Data
Jul. 28, 2021 (DE) ..................... 10 2021 119 639.6

(51) Int. Cl.
*B33Y 10/00* (2015.01)
*B22F 10/366* (2021.01)
(Continued)

(52) U.S. Cl.
CPC ............ *B22F 10/366* (2021.01); *B22F 10/85* (2021.01); *B33Y 10/00* (2014.12); *B33Y 50/02* (2014.12)

(58) Field of Classification Search
None
See application file for complete search history.

(56) References Cited

U.S. PATENT DOCUMENTS

2016/0067923 A1 3/2016 James et al.
2018/0052445 A1 2/2018 Shapiro et al.
(Continued)

FOREIGN PATENT DOCUMENTS

CN 105492981 A 4/2016
CN 106029262 A 10/2016
(Continued)

OTHER PUBLICATIONS

Robinson Joseph Henry et al., "The effect of hatch angle rotation on parts manu-factured using selective laser melting", Rapid Prototyping Journal, GB, vol. 25, No. 2, doi:10.1108/RPJ-06-2017-0111], ISSN 1355-2546, (Oct. 12, 2018), pp. 289-298, URL: http://dx.doi.org/10.1108/RPJ-06-2017-0111, XP055977028.
(Continued)

*Primary Examiner* — Yung-Sheng M Tsui
(74) *Attorney, Agent, or Firm* — Polsinelli PC

(57) ABSTRACT

Disclosed is a method and a device for determining property values of a segment of a manufacturing product made by an additive manufacturing process. In the process, a parameter set is determined which includes a defined group of process parameter values for the construction process of a layer of the segment. At least one process parameter value comprises a layer scanning direction arrangement. Furthermore, a segment scanning direction distribution is determined for the construction process of the segment. A macro property value
(Continued)

of the segment is determined based on the parameter set and the segment scanning direction distribution. The invention additionally relates to a method for testing a manufacturing product, to a control data generation device, to a control device for a production device, and to a production device. The invention also relates to a method for setting up a basic property database and to a property database system.

14 Claims, 19 Drawing Sheets

(51) Int. Cl.
*B22F 10/85* (2021.01)
*B33Y 50/02* (2015.01)

(56) References Cited

U.S. PATENT DOCUMENTS

| | | | | |
|---|---|---|---|---|
| 2018/0056594 | A1 | 3/2018 | Sterenthal et al. | |
| 2019/0229252 | A1* | 7/2019 | Leblanc | B22F 12/41 |
| 2020/0156323 | A1 | 5/2020 | Woytowitz et al. | |

FOREIGN PATENT DOCUMENTS

| | | | | |
|---|---|---|---|---|
| CN | 107877855 | A | 4/2018 | |
| CN | 112313067 | A | 2/2021 | |
| CN | 112512729 | A | 3/2021 | |
| DE | 102017127148 | A1 | 5/2019 | |
| EP | 3376412 | A1 | 9/2018 | |
| EP | 3495904 | A1 * | 6/2019 | B22F 12/90 |

OTHER PUBLICATIONS

L. Spieß, G. Teichert, R. Schwarzer, H. Behnken, C. Genzel, Moderne Röntgenbeugung. Röntgendiffraktometrie für Materialwissenschaftler, Physiker und Chemiker, 2009, Chapter 14.2, pp. 500-512, Springer Spektrum.

Michell A. G. M., "The limits of economy of material in frame structures", Philosophi-cal Magazine, (19040000), vol. 8, No. 47, pp. 589-597.

S. Kambampati, C. Jauregui, K. Museth, H. A. Kim, "Large-scale level set topology optimization for elasticity and heat conduction", Structural and Multidisciplinary Op-timization, (20200000), vol. 61, pp. 9-38.

P. Tanskanen, "The evolutionary structural optimization method: theoretical as-pects", Computer Methods in Applied Mechanics and Engineering, (20020000), vol. 191, No. 47-48, pp. 5485-5498.

J. Kato, S. Ogawa, T. Ichibangase, T. Takaki, "Multi-phase field topology optimiza-tion of polycrystalline microstructure for maximizing heat conductivity", Structural and Multidisciplinary Optimization, (20180000), vol. 57, doi: 10.1007/s00158-018-1965-8, pp. 1937-1954, XP036492594.

M. O. Bristeau; R. Glowinski; J. Periaux, "Numerical methods for the navier-stokes equations", Applications to the simulation of compressible and incompressible vis-cous flows, vol. 6, No. 1-6, pp. 73-187.

J. Betten, Kontinuumsmechanik, 1993, Springer-Verlag.

P. Gangl, Shape derivatives Topologie Optimierung, Sensitivity-based topology and shape optimization with application to electrical machines, Universität Linz, Dissertation 2016.

I. Steinbach, Ein Multi-Phasen-Feld-Modell für facettiertes Kristallwachstum, Diss. RWTH Aachen 2000.

Provatas N., Elder K.: Phase-Field Methods in Materials Science and Engineering, 2010, Wiley-VCH, Berlin.

P. Knabner, L. Angerman, Numerik partieller Differentialgleichungen, Springer-Verlag, Berlin/Heidelberg, 2000.

C. D. Hansen, C. R. Johnson—Visualization Handbook, Elsevier Science, 2005.

U Fred Kocks, Carlos Norberto Tome, H-R Wenk; Texture and anisotropy: preferred orientations in polycrystals and their effect on materials properties, Cambridge Uni-versity Press, 2005, Chapter 7.3, pp. 290-324.

* cited by examiner

DETERMINATION OF PROPERTY VALUES OF A SEGMENT OF A MANUFACTURING PRODUCT MADE OF A PLURALITY OF LAYERS OF A CONSTRUCTION MATERIAL

TECHNICAL FIELD OF THE INVENTION

The invention relates to a method and a device for determining or approximating property values of a segment of a manufacturing product (hereinafter also referred to as "component") constructed from multiple layers of a construction material in an additive manufacturing process. The invention further relates to a method and a testing device for testing such a manufacturing product. In addition, the invention relates to a method for setting up a basic property database and to a property database system comprising such a basic property database, which can be used in the aforementioned methods. Lastly, the invention relates to a control data generation device comprising an above-mentioned testing device, a control device for a production device comprising such a control data generation device and a production device comprising such a control device.

BACKGROUND OF THE INVENTION

Additive manufacturing processes (also known as "additive manufacturing processes") are becoming increasingly relevant in the production of prototypes and now also in series production. In general, "additive manufacturing processes" are those construction processes in which the manufacturing product is usually built up on the basis of digital 3D design data by depositing material (the "construction material"). The construction usually, but not necessarily, takes place in layers. The term "3D printing" is often used as a synonym for additive manufacturing; the production of models, samples and prototypes using additive manufacturing processes is often referred to as "rapid prototyping" and the production of tools as "rapid tooling".

One basic way of realizing an additive manufacturing process involves the selective solidification of the construction material, wherein this solidification can take place in many manufacturing processes with the help of radiant energy, e.g. electromagnetic radiation, in particular light and/or heat radiation, but possibly also with particle radiation, such as electron radiation. Such processes using irradiation are also known as "beam melting processes" (also abbreviated as BMP). Examples of this are so-called "laser powderbed fusion processes" (also known as "selective laser sintering" or "selective laser melting") or "electron powderbed fusion processes". In this case, thin layers of a mostly powdered construction material are repeatedly applied on top of each other, and in each layer the construction material is selectively solidified by spatially limited irradiation of the points that are to be part of the manufacturing product to be manufactured after production in a kind of "welding process", in which the powder grains of the construction material are partially or completely melted with the help of the energy introduced locally by the radiation at this point. After cooling, these powder grains are then bonded together to form a solid.

When solidifying the construction material, the energy beam is guided along predetermined scan paths, usually taking into account a defined irradiation strategy, usually a so-called "hatching strategy", within the contours of the region to be solidified in the respective layer over the layer located on the construction field in order to melt and solidify the material in a desired spatial and temporal sequence. In addition, further process parameter values, such as an intensity, a focus extent and a form of the intensity distribution (or the intensity profile) as well as a feed rate (or scanning speed) of the energy beam, a thickness of the layers, etc. are specified and should be adhered to as closely as possible. All of these process variables generally have an influence on the component properties and thus the quality of the component, in particular whether it fulfils certain quality requirements. Furthermore, the process variables also have an influence on the construction speed and therefore on productivity, energy consumption and construction costs.

Since the construction of a component is associated with time, the consumption of raw materials and energy and therefore also with corresponding costs, it would be desirable if at least certain properties of a component could be determined in advance, if possible, without the component actually having to be manufactured. This could make a construction test with unsuitable combinations of process variables unnecessary and thus avoid rejects.

Similarly, in other additive manufacturing processes, e.g. processes in which material is only applied at the desired points by means of a material application head, which is subsequently solidified or consolidated, various process variables, in particular the choice of material consolidation paths (in the following, such consolidation paths are also generally referred to as "scan paths") and the feed rate, etc., can have a considerable influence on the component properties and quality of the component on the one hand and the productivity on the other, which is why the process variable values must be selected skillfully. This also applies in principle to additive manufacturing processes such as powder deposition (laser cladding) and wire deposition (direct energy deposition (DED) or wire-based arc-light additive manufacturing (WAAM)).

SUMMARY OF THE INVENTION

It is an object of the present invention to provide a method and a device which make it possible to determine property values of a manufacturing product made of a plurality of layers in an additive manufacturing process already in advance, i.e. before the component is actually constructed.

This object is achieved by a method and by a device for determining property values.

The method according to the invention can firstly serve for ascertaining property values of a segment of the manufacturing product constructed from multiple layers of the construction material. As will be explained later, a component can be virtually divided into so-called "segments", wherein the manufacturing product comprises at least one such "segment". Generally speaking, a segment is a region in the component, which extends over several layers, wherein the same parameter set for constructing the layers is used within the segment, as will be explained later. A segment preferably comprises here a partial section/region of the manufacturing product, wherein the sum of the segments of the manufacturing product then results in the manufacturing product. However, it is also possible—particularly in the case of small objects—for the complete manufacturing product to be formed from just one segment. More complex components, however, usually comprise several segments.

As part of the method, property values of the component can also be determined correspondingly by determining the property values of an individual segment or even several, preferably all, segments of the component. The determination of property values of a segment or a manufacturing product is generally understood to mean an approximation of the property values that are to be expected if the segment or the manufacturing product were actually manufactured using the process variables, in particular the parameter set, with which production is intended. The method therefore makes it possible to determine or approximate property values of a component or at least a segment from the process variables, wherein in particular the material properties of the component or segment resulting from the construction process can be determined or approximated.

It should already be mentioned briefly that in an optimization method, which will be explained later, in order to use the invention to arrive at optimized process variables for the construction process of a component which has certain desired properties, an "area" (which could also be referred to as a "calculation area" or "design space") can preferably also be defined, which comprises the component to be produced and which can be (virtually) divided into segments. For example, the outer contour of the component itself could form the area. However, it would also be possible to draw any kind of box around the component, i.e. that the unconsolidated regions around the component or on certain sides of the component are also included in the area, wherein some of the segments can then belong to the component and other segments lie outside the component. These segments in the area outside the component are later also referred to as "powder segments", because in a powder-based manufacturing process, unconsolidated powder initially remains in these segments. As no energy needs to be introduced into these segments, the energy beam or laser power can simply be set to 0 during production, for example.

The method according to the invention has at least the following method steps:

On the one hand, at least one parameter set (which can also be referred to synonymously as a "process parameter set") is determined, which comprises a defined group of process parameter values for the construction process of at least one layer of the segment, i.e. a tuple of individual process parameter values with which the machine is later controlled or is to be controlled in order to manufacture the layer of the component. In particular, the process parameter values can be predetermined, discrete (i.e. not continuous) values, such as the intensity, focus extent and form of the intensity distribution or intensity profile, power of the energy beam (e.g. the laser power in a laser melting process), scanning speed of the energy beam, thickness of the layers, the material type of the construction material, etc. According to the invention, at least one process parameter value of the parameter set comprises a "layer scanning direction arrangement" explained below.

The term "scanning" is generally understood to mean the movement of the unit responsible for solidifying the material at the respective points along the specified "scan path", for example a material application head that dispenses material, which then solidifies, and/or an energy beam for solidification, etc. For example, in the beam melting processes mentioned at the outset, "scanning" refers to the movement of the impact point of the energy beam (i.e. the movement of the laser focus in selective laser melting and similar processes) on the current working plane along the specified "scan path". The current "scanning direction" is the current direction along the currently travelled scan path. The speed of movement of the impact surface of the energy beam or the unit responsible for solidifying the material at the respective points on the construction field is the scanning speed, which can also be modified depending on the location, i.e. it does not have to be constant. The "working plane" is generally the plane that is perpendicular to the construction direction of the component at the respective point. In the "laser powderbed fusion process" described above, this is the plane in which the powder layers are applied, i.e. the scan paths of a layer generally lie in a plane that does not tilt during the solidification of a layer. For other additive manufacturing processes such as laser cladding, direct energy deposition (DED) and wire-based arc-light additive manufacturing (WAAM), a working plane could also be defined by the so-called tangential plane without limiting the generality. Such a tangential plane has its origin in the point of impact of the beam energy on the material.

It should be mentioned at this juncture that a scan path does not have to be continuous, but can also comprise several spaced-apart scan path sections, in particular also in one plane. For example, the individual "hatching-lines" explained below, along which an energy beam is moved over the material layer in the working plane in accordance with a "hatching direction arrangement" (generally also referred to as a "hatching strategy" for short) in order to solidify the cross-section of the component in the plane, can each be seen as individual "scan path sections".

The selective irradiation or the movement of the impact surface of the energy beam on the construction field in a beam melting process is usually carried out according to a suitable irradiation strategy, as mentioned above. As a rule, larger two-dimensional regions, i.e. larger areas on the construction field, are to be irradiated during a solidification process. Irrespective of how the energy beam is generated and the exact point of impact on the construction field, it has proven to be advantageous to first virtually "divide" at least such larger regions to be irradiated according to a selected pattern, for example into virtual "strips", a diamond pattern, a chequerboard pattern or similar. The individual areas of this pattern, i.e. defined sub-regions, for example geometrically standardized surface sections such as stripes or fields, are then usually scanned with the energy beam in the form of a so-called "hatching" (generally also called a "hatch"). In a stripe pattern, the construction material—viewed macroscopically—is gradually solidified along parallel stripes and in detail—viewed microscopically—the movement of the impact surface of the energy beam on the construction field takes place along closely spaced hatching lines, which run back and forth across the direction of extent of the respective irradiation stripes within the boundaries of the irradiation stripe. A hatching direction arrangement or hatching strategy can define, for example, whether alternating hatching directions (alternating irradiation) or constant hatching directions (unidirectional irradiation, i.e. with a return from one hatching line end to the beginning of the subsequent adjacent hatching line in the irradiation strip) are used. A hatching direction can therefore also be regarded as a localized set of scanning directions. In the contour areas of the component, the scan paths generally run along the contour so that the surface is as smooth as possible.

The "layer scanning direction arrangement" generally defines the fundamental strategy of the course of the scan paths, i.e. the irradiation strategy in the case of beam melting, in a respective layer, i.e. in which way or direction the scan paths in a layer run relative to each other, and possibly also in which order the scan paths in the layer are run in order to melt and solidify the material in the desired spatial and temporal sequence. The "layer scanning direction arrangement" thus defines the relevant scanning directions that are or were specified within a layer in the construction process for the main part of the surface of the layer. As already mentioned above for the hatching strategy, the layer scanning direction arrangement can therefore also have a significant influence as a process variable on the locally resulting microstructure in the component. It should be noted here that a rotation of the orientation of the layer scanning direction arrangement from layer to layer—as will be explained later—is not to be understood here as a change in the layer scanning direction arrangement. This means that layers can be regarded as having been created with the same layer scanning direction arrangement, even if the orientation has been changed (by rotation about the main build direction in which the layers are superimposed). Changes to individual scan path sections, in particular along the component contours in the respective layers, which are caused, for example, by this change in orientation or by the change in the component contour from layer to layer, etc., are not regarded as significant changes to the layer scanning direction arrangement in this sense, i.e. the layer scanning direction arrangements of the layers can be regarded as identical in the sense of the invention, since such changes would generally not lead to a significant change in the "intralayer scanning direction distribution" (which is substantially determined by the layer scanning direction arrangement) and thus also not to a significant change in the property values of the segment. A typical example of a "layered scanning direction arrangement" therefore comprises the previously explained hatching direction arrangement or hatching strategy or can be defined thereby. Preferably, at least one process parameter value of the parameter set also comprises a track width between two solidification paths, i.e., for example, which hatching distance is selected. This track width can be defined in the parameter set independently of the layer scanning direction arrangement.

In principle, it is also possible with the method according to the invention to determine property values of an already constructed component, or at least a segment of the component, wherein the parameter set used is then fixed. This would be useful, for example, if a subsequent testing of a component is to be carried out but it is not possible to measure the property on the component itself, for example because it would then be destroyed.

However, since in most cases production has not yet taken place, but the parameter set should ultimately also be tested by the method for its suitability to produce a component with certain desired properties, the parameter set is sometimes referred to below—without limiting the generality—as a "candidate parameter set".

For different types of construction material, for example different types of powder, preferably types of metal powder, several candidate parameter sets can also be permanently stored in a data memory, for example. As mentioned, a parameter set or candidate parameter set can also include the type of the associated construction material as a "process parameter value", i.e. with the selection of a candidate parameter set, the material type is then determined by this process parameter value. This is ultimately a question of the organizational structure of a database for the candidate parameter sets.

Different types of powder can be distinguished in particular according to a) material, wherein there is also a difference between pure material or alloys,
b) other powder parameters, such as particle size distribution, sphericity of the particles, chemical properties, etc.

Since different powder batches of the same material can already have different combinations of the aforementioned parameters, each powder batch could also be regarded as a separate powder type, if this is desired and appropriate.

In practice, only a few candidate parameter sets, e.g. 4 to 20 candidate parameter sets, may initially be available for a particular material. In principle, however, the number of candidate parameter sets is only limited by the technical possibilities for the size of the database, i.e. how much storage space and how much computing time is available (in advance) to create the database. When determining the number of candidate parameter sets, the required computing time can also be taken into account, as limiting the number can reduce the computing time in an optimization process.

It should also already be mentioned that a candidate parameter set, for example using the invention, can also be assigned one or more parameter set suitability values (later also referred to more briefly as "PS score"="parameter set score"), each of which can indicate a measure of the suitability that the candidate parameter set in question fulfils certain requirement data. These can be scalar values, preferably between 0 and 1. These PS scores can be used to advantage in the optimization process explained later. A candidate parameter set can also be assigned several requirement-specific parameter set suitability values (i.e. requirement-specific PS scores) for different requirement data.

On the other hand, in addition to the parameter set, according to the invention at least one "segment scanning direction distribution" is determined for the (planned) construction process of the segment, i.e. a segment scanning direction distribution that is to be used in the construction process in the region of the segment (or has been used if the component has already been created). The "segment scanning direction distribution" is a distribution of the scanning directions within the segment formed from several layers and therefore depends, among other things, on the layer scanning direction arrangement selected in the construction process, as explained above, because in each layer there is an "intraslice scanning direction distribution", which is substantially determined by the layer scanning direction arrangement. More specifically, the segment scanning direction distribution can result as a combination of the rotations of the orientations of the layer scanning direction arrangement between the layers in the segment. These rotations in turn result from the control commands with which the production device is controlled during the construction of the component. This means that a segment can be defined precisely by the fact that exactly one set of parameters applies within the boundaries of the segment and that this segment has a specific "segment scanning direction distribution", which is explained later. The parameter set and/or the segment scanning direction distribution then change at the boundaries of the segment to another segment. As described above, the parameter set contains a tuple of individual process parameter values with which the machine is later controlled or is to be controlled in order to produce the individual layers of the segment, and the control commands with which the rotations of the layers in relation to each other are achieved in order to achieve the desired segment scanning direction distribution during construction can conversely be determined—with a known parameter set (in particular the layer scanning direction arrangement) —using the desired optimum (target) segment scanning direction distribution. The parameter set and the segment scanning direction distribution are therefore independent of each other in this respect.

In the optimization method already briefly mentioned above and explained later, the segment scanning direction distribution can preferably also form a steady, particularly preferably continuous, optimization variable. Here, a segment scanning direction distribution can also be defined as "quasi-continuous", e.g. by a sufficient number of discrete, closely spaced values, such as 360 sampling points to define a segment scanning direction distribution over an angular range of 360° in a plane.

Lastly, according to the invention, at least one so-called "macro property value" of the respective segment is determined on the basis of the parameter set assigned to the segment in question and the segment scanning direction distribution. Such a "macro property value" describes a property value on a macroscopic level or from a macroscopic perspective, i.e. which property the complete segment has, such as thermal conductivity, breaking strength, etc.

The invention makes use of the realization that in additive manufacturing some of the above-mentioned process variables, such as the aforementioned process parameter values including the layer scanning direction arrangement, in particular the hatching strategy, have a significant influence on the locally resulting microstructure in the component. As will be explained later, this microstructure also leads to "basic property values" that can be assigned to the individual layers. This can be the case, not only, but above all, with metals as a construction material. The invention now further utilizes the fact that the microstructures in the individual layers can in turn be used to determine properties of a segment of the component constructed from multiple layers with the same parameter set on a macroscopic level, provided that the segment scanning direction distribution for the (planned) construction process of the segment is known, since this is substantially correlated with the orientation of the layers relative to each other or is determined by this. One possibility, as will be explained later, is to use the "basic property values" of the layers to determine the macro property values of the segment built up from the layers. Since, as described, the macro property values can also be linked to a segment scanning direction distribution in addition to a parameter set, e.g. with a pair of parameter set and segment scanning direction distribution, the macro property values achieved in this way can be determined much more quickly, e.g. can be searched for in a property database system, which will be explained later, using a "segment scanning direction distribution" search parameter, than would be the case, for example, with methods that involve a much more complex assignment of the property values to the individual scanning directions in the segment. The use of the segment scanning direction distribution as an additional, independent parameter can also lead to a reduction in the effort required to create and store suitable databases.

Preferably, several macro property values of the segment or several segments of the component are determined as part of the process. A macro property value can comprise a tensorial value, such as an elasticity tensor, but also a categorical value, such as corrosion resistance or not, the nature of a lattice structure, e.g. face-centred cubic (fcc), body-centred cubic (bcc) or hexagonal close-packed (hcp). Various macro property values will be explained later.

If the properties of the individual segments of the component are known on a macroscopic level, i.e. the "macro property values", this can also provide information on the component properties and the quality of the component as a whole, in particular whether it fulfils certain quality requirements. It is clear that the "macro property values" of the component are also determined immediately in the method if it only consists of one segment. However, it makes sense to divide the component into segments and initially determine the macro property values for the individual segments separately, as different parameter sets and segment scanning direction distributions can be used for different segments.

Using the method according to the invention, a method for (virtually) checking a manufacturing product of an additive manufacturing process can advantageously also be realized. This verification method can be used to check whether the component would fulfil or fulfils the desired quality requirements, preferably in advance, i.e. before construction, but also after construction if it is not practical to determine the property values in any other way.

For this purpose, the manufacturing product must first be divided virtually into a number of segments, wherein the manufacturing product comprises at least one such "segment" as mentioned above. These segments each extend over several layers, wherein the same parameter set is used within the segment to build up the layers. This information can be derived from the control data with which the structure is planned, if such control data is already available. However, the division into segments can also be carried out "manually" in advance by a user, i.e. the component can be divided according to certain functionally essential construction sections (i.e. which function the construction sections primarily have), e.g. into strut, pressure plate, flange part, etc., for example.

Similarly, the segments (or the segment boundaries) can be automatically set or optimized in an optimization process explained later in order to achieve optimized process variables for the construction process of a component using the invention, which has the desired properties, in particular fulfils the quality requirements. The contour of the component can also be optimized, provided that segment boundaries between segments of the component and surrounding "powder segments" are optimized in a calculation area surrounding the component.

It should already be pointed out at this juncture that, as part of the optimization process, as will be explained later using an exemplary embodiment, an optimized or optimum parameter set can also be selected for each segment from the available candidate parameter sets, which then also forms part of the optimized process variables.

Once the segments have been defined, the desired macro property values can be determined for at least some of the segments, preferably all segments, using the above-mentioned method according to the invention.

Using these macro property values of the segments, a state description of the manufacturing product can then be determined in a state determination step. For this purpose, the state of the current system can preferably be simulated (i.e. how the relevant segment of the—still virtual—manufacturing product would behave under a certain load, for example, if it were produced with the process variable values). The state determination step could therefore also be referred to as the "state simulation step". Particularly preferred simulation methods include, for example, a finite element method or finite volume simulation. For example, a load simulation or a vibration simulation can be carried out with the (virtual) component and the result is then the possible load or the natural frequency of the system or component, assuming the current configuration of the process variable values.

Preferably, the state description is compared with predefined quality requirements for the manufacturing product. This can be used to check whether the manufacturing product fulfils the predefined quality requirements. The state simulation step can be performed as a (quality) requirement simulation for this purpose, i.e. using quality requirement data that specify how the component may or should behave under certain loads or the effects of certain forces.

If the state description does not fulfil the predefined quality requirements, it makes sense to search for more suitable process variable values or parameter sets for a component that has not yet been constructed in order to manufacture the component. If the component has already been constructed, it should at least be subjected to further tests before it is (further) used under the defined quality requirements or it should be used in a form so that the relevant quality requirements are lower, if this is feasible.

In a preferred method for controlling a production device for additive manufacturing of a manufacturing product, control data for controlling the production device could initially be provided as usual.

Before this control data is used, however, the aforementioned verification process is first used to perform a virtual verification of the manufacturing product that would be produced using this control data. For this purpose, the information required for the verification process, namely the segments and the parameter sets and segment scanning direction distributions assigned to the segments, can be easily taken directly from the control data or easily determined from it. After all, the control data specifies at which location of a layer with which process parameters (such as laser power, etc.) and how precisely scanning is to be performed (e.g. in what direction and at what speed). Any process parameters that are not present in the control data, such as the type of material, are also known and can, for example, simply be recorded via a user interface or transferred from an electronic construction order or similar, as can, for example, the geometric data and other requirements, in particular quality requirements, for the component.

The production device in the manufacturing process is only controlled using this control data if the quality requirements for the manufacturing product are met according to the result of this virtual check. Otherwise, the process is cancelled and other, more suitable control data must be sought or other process variables modified, such as the type of material. If necessary, the check can also lead to the geometry of the component being optimized.

Preferably, this data is control data for a production device (i.e. the production device is then also designed suitably for this), with which, as described at the outset, construction material, preferably powder, is built up and selectively solidified in a, preferably powder-bed-based, beam melting process, wherein the construction material is irradiated with at least one energy beam for solidification on a construction field, wherein an impact surface of the energy beam is moved along predetermined scan tracks on the construction field in order to melt the construction material in a target area in and around the impact surface. A "movement" of the energy beam or the impact surface of the energy beam can be understood to mean the usual deflection of the energy beam, e.g. by galvanometer mirrors, but also a movement of the complete beam delivery unit, e.g. in the form of a diode bank, in particular a laser diode bank, or by a moved beam shaping. A "target region" is understood here to mean on the one hand the impact area, i.e. the region at which the energy beam strikes the surface, but also the region below it, i.e. into the depth of the material or the layer, and possibly also an environment around this impact area in which the energy beam still acts, e.g. through thermal conduction in the construction material. For the sake of completeness, it should be mentioned once again that the energy beam can be both particle radiation and electromagnetic radiation, such as light or preferably laser radiation.

Accordingly, the control data can preferably be exposure control data, such as scan data that defines or specifies the movement of the energy beam on the surface, control data for setting the level of energy or laser intensity, control data about the "shape" of the beam or the beam profile and/or the focus or the extent of the beam perpendicular to the beam direction. Furthermore, this control data can also include other control information, such as coating control data that specifies how thick a current layer is, or information for controlling pre- or post-heating with other energy input means, for injecting inert gas, etc.

A device according to the invention for determining property values of at least one segment of a manufacturing product of an additive manufacturing process made of a construction material comprises at least the following components:

- a parameter set interface unit for determining a parameter set comprising a defined group of process parameter values for the construction process of at least one layer of the segment in question,
- a scanning direction interface unit for determining at least one segment scanning direction distribution for the segment construction process,
- a macro property value determination unit for determining at least one macro property value of the segment on the basis of the parameter set and the segment scanning direction distribution.

The macro property value determination unit can, for example, comprise suitable computing units and/or—as briefly mentioned at the outset—a property database system. The parameter set can, for example, simply be taken over by the parameter set interface unit from other components of the system as described, e.g. also partly in the form of planned control parameters. The scanning direction interface unit can also use this to determine the rules for the rotations of the orientation of the layer scanning direction arrangement or hatching strategy between the layers, from which the segment scanning direction distribution can then also be determined with knowledge of the layer scanning direction arrangements. The parameter set interface unit and the scanning direction interface unit can also be combined in one interface, A suitable testing device for testing a manufacturing product of an additive manufacturing process comprises at least the following components:

- a segmentation unit for ascertaining segments of the manufacturing product,
- the device described above for determining macro property values for the at least some of the segments or an interface to such a device,
- a state determination unit or state simulation unit for determining a state description of the manufacturing product using the determined macro property values of the segments, as already described above,
- optionally a comparison unit for comparing the state description with predefined quality requirements for the manufacturing product.

The segmentation unit can be designed in different ways. For example, it can include a user interface to virtually "manually divide" the component as described above, or an interface to take over the information about the segments of the component from another unit, or even a unit that automatically segments the component virtually itself, e.g. based on information from the control data or similar, at which position in the component which parameter set should be used, to name just a few possibilities.

A control data generation device according to the invention for generating control data for a production device for additive manufacturing of a manufacturing product in an additive manufacturing process, preferably in a beam melting process as mentioned above, comprises at least the following components:

- a data generation unit for generating the control data for the production device,
- a previously described testing device or an interface to such a testing device for testing a manufacturing product which would be produced in an additive manufacturing process by means of the generated control data,
- optionally, a decision unit that accepts or rejects the generated control data on the basis of a test result of the testing device. In the latter case, new control data could then be generated by the data generation unit if necessary.

It is noted that the decision unit could optionally also be part of the testing device and the testing device could in turn be integrated into the data generation unit.

The control data generation device can, for example, be part of a control device of such a production device for additive manufacturing of a manufacturing product. However, it can also be realized independently on another computer in order to then transfer the data to the control device.

Accordingly, a control device according to the invention for a production device for additive manufacturing of a manufacturing process has a control data generation device according to the invention and/or an interface to such a control data generation device for transferring the relevant control data from the control data generation device. Such an interface in turn comprises the possibility of accessing a memory, e.g. with a database, in which the control data was previously stored, e.g. by the control data generation device. The control device is designed to control the production device using this control data, e.g. to irradiate the construction material with the energy beam.

The production device can be controlled with the control data in such a way that the optimized process variable values are sufficiently achieved or maintained during the production process in accordance with the given evaluation criteria.

A production device according to the invention for additive manufacturing of manufacturing products in an additive manufacturing process or manufacturing process has at least one such control device in addition to the components that are usual depending on the type of manufacturing process (for example for a preferred beam melting process a feed device for introducing construction material—for example in the form of a layer of construction material—into a process chamber and an irradiation device for selectively solidifying the construction material by irradiation by means of an energy beam).

It should be noted at this juncture that the device can also have several irradiation devices, which are then controlled in a coordinated manner with the control data in order to sufficiently achieve the optimized process variable values in accordance with the given evaluation criteria or to maintain them during the production process.

The device according to the invention for determining property values, the testing device and the control data generation device can each be implemented largely in the form of a computer unit, also in the form of a shared computer unit, with suitable software. The computer unit may, for example, have one or more co-operating microprocessors or the like for this purpose. In particular, it can be realized in the form of suitable software program parts in the computer unit of a control device of a production apparatus according to the invention. A largely software-based realization has the advantage that previously used computer units, in particular control units of production devices for additive manufacturing, can also be easily retrofitted by means of a software or firmware update in order to work in the manner according to the invention.

In this respect, the object is also achieved by a corresponding computer program product with a computer program which can be loaded directly into a memory device of a computer unit, in particular a device for determining property values of a segment, a testing device, a control data generation device or a control device, with program sections in order to execute all steps of the method according to the invention when the program is executed in the computer unit or control device. In principle, the required software components or program sections can also be distributed over several interconnected computer units, which in this sense can also be regarded as a common, only evenly distributed computer unit.

In addition to the computer program, such a computer program product can include additional components such as documentation and/or additional components, including hardware components such as hardware keys (dongles, etc.) for using the software. A computer-readable medium, for example a memory stick, a hard disk or another transportable or permanently installed data carrier, on which the program sections of the computer program that can be read and executed by a computer unit, in particular the control device, are stored, can be used for transport to the computer unit or control device and/or for storage on or in the computer unit or control device.

Further, particularly advantageous embodiments and developments of the invention can be found in the dependent claims and the following description, wherein the independent claims of one claim category can also be developed analogously to the dependent claims and exemplary embodiments of another claim category and, in particular, individual features of different exemplary embodiments or variants can also be combined to form new exemplary embodiments or variants.

As already mentioned, there are various options for ascertaining the macro property value of a segment.

Preferably, at least one macro property value of at least one segment is determined using a basic property database provided. Such a basic property database can contain at least one basic property value for various defined parameter sets. In such a database, the individual parameter sets are therefore each assigned at least one basic property value, preferably a group of basic property values, which a layer of the segment or component would have if the respective layer were manufactured using the assigned parameter set. The parameter sets can each comprise here, as process parameter values, in particular also a layer scanning direction arrangement or hatching direction arrangement or the type of construction material. Methods for setting up and for utilizing such a basic property database will be explained later. In particular, these basic properties of the layers can then be used to determine macro properties of a segment or even an entire component formed from the layers.

Preferably, the basic property database for a plurality of different parameter sets can each comprise a “texture” of a layer as a basic property value, which was produced using the respective parameter set (i.e. also using a specific construction material) in an additive manufacturing process. The term “texture” refers to the entirety of the orientations of the crystallites within a structure, i.e. it is a crystallographic texture that should not be confused with a surface texture, such as the roughness of a surface. The texture is particularly preferably described in the form of the so-called "orientation distribution function" (ODF), as will be explained later.

The texture or ODF can be determined, for example, in a measurement under a scanning electron microscope using an EBSD method (EBSD=Electron Backscatter Diffraction) or other methods, which will also be explained later.

Alternatively or particularly preferably additionally, the basic property database can also comprise further basic property values, which can also be determined, for example, on the basis of the texture, in particular the orientation distribution function, of the layer for the parameter set. The other basic properties can be calculated from the texture or ODF using the known properties of the single crystals of the construction material (e.g. by averaging or homogenization methods, as will be explained later). For example, such basic properties may include the yield point, tensile strength in any direction, etc., to name but a few. Conversely, the texture could also be derived from other basic property values or macro property values, such as the elasticity tensor.

Preferably, the basic property database can in each case comprise basic property values for a reference orientation of the respective layer scanning direction arrangement, in particular hatching direction arrangement. The reference orientation or reference alignment can be selected arbitrarily here.

A basic property value can then be determined or calculated from the corresponding basic property value stored for the reference orientation for a layer of which the layer scanning direction arrangement, and thus also its "intralayer scanning direction distribution", is rotated by at least one rotation angle (in any direction around the main build direction, i.e. around the direction perpendicular to the layer planes) compared to the reference orientation, using the rotation angle. This is possible using simple angle conversions. A rotation of the layer scanning direction arrangement, in particular the hatching direction arrangement, from layer to layer is common in beam melting processes, for example. A 67° rotation angle from layer to layer would be typical here, for example.

In a layer-by-layer construction, as mentioned above, the main build direction is generally considered to be the direction perpendicular to the layers, in which the layers are gradually built up on top of each other. In a beam melting process, in particular laser melting, a Cartesian coordinate system x, y, z is generally defined as the reference system, wherein the x-direction and the y-direction run parallel to the layer planes or span the plane of the construction field and the "z-direction" points vertically upwards from the construction field, i.e. corresponds to the main build direction.

In the method according to the invention, a macro property value is to be determined for a segment made of multiple layers.

In a preferred approach, as mentioned above, a macro property value of a segment with several superimposed layers is to this end determined or combined from the basic property values of the individual layers. This is preferably done using a mathematical "homogenization process".

The homogenization process can preferably use at least one of the following homogenization steps:

- Calculation of a mean value of the basic property values of the individual layers. This mean value can then form the macro property value. (According to Voigt's method, which will be explained later).
- Calculation of a mean value of the reciprocals of the basic property values of the individual layers and formation of the reciprocal of the mean value. In this case, this reciprocal of the mean value can then form the macro property value. (According to the Reuss method explained later).
- Calculation of a mean value by an additive mixture or additively weighted mixture or additively directionally weighted mixture of the above-stated combinations.

It is particularly preferable here to select which of the aforementioned homogenization steps is used depending on a quality requirement to be tested and/or a microstructure of the layer. The "microstructure" is determined by the morphology and average size of the grains in the layers. The microstructure can also be determined, for example, during a measurement under a scanning electron microscope in an EBSD process.

Alternatively or additionally, depending on the parameter set of the layers of the segment and the segment scanning direction distribution of the segment, at least one macro property value for the segment in question can also be selected from a "macro property database" provided for this purpose. At least one macro property value, preferably in each case a group of macro property values, of segments (consisting of several layers) can be stored in this database for various combinations of segment scanning direction distributions and parameter sets (that is to say also depending on the construction material), which would be or have been created with the segment scanning direction distribution and the assigned parameter set assigned in the database.

To determine a macro property value for a segment, the first step is to check whether a macro property value is already stored in the macro property database for a specific combination of segment scanning direction distribution and parameter set. If this is the case, this macro property value can simply be assigned to the segment. Otherwise, a macro property value for the segment can be determined, for example, using the methods described above by homogenizing the basic property values of the layers.

On the one hand, determining macro property values for complete segments by querying a macro property database is much easier and faster than determining the macro property values for the segment from the basic properties of the individual layers. On the other hand, the creation and storage of a large number of macro property values cost considerable computing time and memory space.

The macro property database therefore preferably contains at least macro property values, preferably groups of macro property values, for the most frequently used construction strategies, in particular "standard exposure strategies" or so-called "standard hatching strategies", which are regularly used in the beam melting process. Typical standard hatching strategies in the beam melting process are so-called 67° hatching or x-y hatching (=90° hatching). In these processes, the orientation of the hatching strategy is rotated by 67° or 90° from layer to layer, wherein, as said, the hatching strategy remains substantially unchanged.

If certain queries occur more than once, it makes sense to include them in the entries of the "standard construction strategies", in particular "standard hatching strategies" of the macro property database. A database system could therefore preferably be created in such a way that it registers which combinations of segment scanning direction distributions and parameter sets are used particularly frequently and then creates new entries in the macro property database accordingly, i.e. the database system "machine learns", so to speak.

As mentioned, in addition to the texture or ODF, there are a number of other property values (especially basic or macro property values) that may be of interest. These can usually be calculated from the texture or ODF using the known properties of the single crystals of the construction material (e.g. by averaging).

Particularly preferably, at least one of the property values, especially the basic or macro property values, comprises at least one value of one of the following material parameters:

Elasticity tensor.

"Tensile strength tensor" (this specifies the mechanical stress at which a specific yield criterion exists at a location in the workpiece; a definition of the entries of the tensor variables for the respective yield criterion can be found, for example, in J. Betten, Kontinuumsmechanik, 1993, Springer-Verlag).

Yield point distribution (for example in the form of the Hill tensor, as can also be found in the book by J. Betten).

Solidification coefficient.

Thermal conductivity

Break resistance.

Preferably, such a property value for at least one material parameter can comprise several direction-dependent partial values, i.e. the property values can also be anisotropic. In general, a property value can therefore be defined as a tensor, e.g. as a vector (1st level tensor) or a matrix (2nd level tensor) in order to take three dimensions or directions into account, or also as a 4th level tensor in order to take properties in the crystal system into account.

An example of this would be the 4th level elasticity tensor, wherein the elasticity tensor entries of the various crystal space directions contain values for a general three-dimensional stress state, from which the Young's-Moduli can be calculated by conversion, for example in a layer in the x-direction and in the y-direction.

A similar anisotropic behaviour can also be present, for example, in the yield point distribution or the tensile strength tensor. Without limiting the generality, other common forms of visualization can also be used, such as Voigt notation.

A basic property database used in the methods described above can preferably be set up using a method in which at least the following steps are carried out in each case to determine at least one basic property value and/or a microstructure of a material layer for a specific parameter set (comprising, in particular, the construction material type and a layer scanning direction arrangement or hatching direction arrangement/hatching strategy):

Firstly, at least one test specimen, preferably a set of optimally oriented test specimens, is produced layer by layer from the selected construction material in a test production process, wherein the parameter set for which the database entry is to be determined is used in at least one layer of the test specimen (preferably in all layers of the test specimen). Tensile specimens, such as round or square tensile bars for testing according to ASTM 1876-15 [2] or the like, are the preferred test specimens.

At least one basic property value and/or a microstructure is then determined in a test procedure using the manufactured test specimen.

This basic property value is lastly linked to the parameter set and stored or saved as an entry in the basic property database.

In particular, the texture can be determined as a basic property value for the basic property database. Preferably, a group of basic property values can also be determined in each case, wherein some of the basic property values can also be derived from the texture and/or the microstructure as mentioned.

Various test procedures can be used, wherein the selection of the suitable test procedure can depend on various conditions, but in particular on the basic property value to be determined.

If, for example, a texture and/or microstructure is to be determined, the following methods are preferably considered, wherein the test specimen is optionally prepared appropriately for the respective test procedure:

Electron backscatter diffraction (EBSD): This is preferably carried out using a scanning electron microscope. In preparation, the test specimen is cut, e.g. sliced, and optionally ground and/or polished in a measuring plane in which the texture and/or microstructure is to be measured with the scanning electron microscope.

X-ray diffractometry: Here too, the test specimen should be cut through in a measuring plane beforehand, e.g. cut, and optionally ground. Polishing is usually not necessary here, but can lead to a better result.

Measurement with neutrons: No preparation, in particular no cutting, of the test specimen is required here. The measuring plane can be any plane in the test specimen, preferably so that the test specimen is thinner than 10 mm in a direction perpendicular to the measuring plane.

The measuring plane can lie exactly in the layer of the test specimen for which the basic property value is to be determined, i.e. perpendicular to the main build direction in which the layers lie on top of each other. However, the measuring plane can also lie transverse to this, in particular can extend in the main build direction, in order to measure a layer profile through several layers of the component and thus simultaneously determine a macro property value of the segment of the test specimen through which the layer profile extends and/or basic property values for several layers at the same time.

However, it is also possible to carry out at least one tensile test or preferably a vibration test (for example using a pulse excitation technique in accordance with ASTM 1876-15 [2]) on the test specimen within a test procedure in order to determine at least one basic property value and/or macro property value. An example of this would be the determination of an elasticity tensor in a tensile or vibration test and the derivation of further basic property values and/or macro property values from this.

Preferably, for example, a property database system according to the invention can also be created which comprises a basic property database and/or a macro property database which contains at least one macro property value for various combinations of segment scanning direction distributions and parameter sets, preferably a group of macro property values in each case.

Many of the statements made above relate to observations and phenomena that apply to metallic materials—such as the derivation of properties from the crystallographic texture. The methods are therefore particularly suitable for metallic materials and are preferably used for this purpose. In principle, however, a correlation between selected production parameters and resulting component properties can also be established in the same or a similar way for polymeric or ceramic materials, and the methods can therefore also be extended to this material class through appropriate adaptations.

BRIEF DESCRIPTION OF THE DRAWINGS

The invention is explained in greater detail below with reference to the appended figures using exemplary embodiments. In the various figures, identical components are provided with identical reference numerals. In the figures.

DETAILED DESCRIPTION OF THE EMBODIMENTS

The following exemplary embodiments are described with reference to a production device 1 for additive manufacturing of manufacturing products in the form of a laser sintering or laser melting device 1, wherein it is explicitly pointed out once again that the invention is not limited to laser sintering or laser melting devices. The production device 1 is therefore also referred to in the following—without limiting the generality—as "laser melting device" 1.

Figure 1:
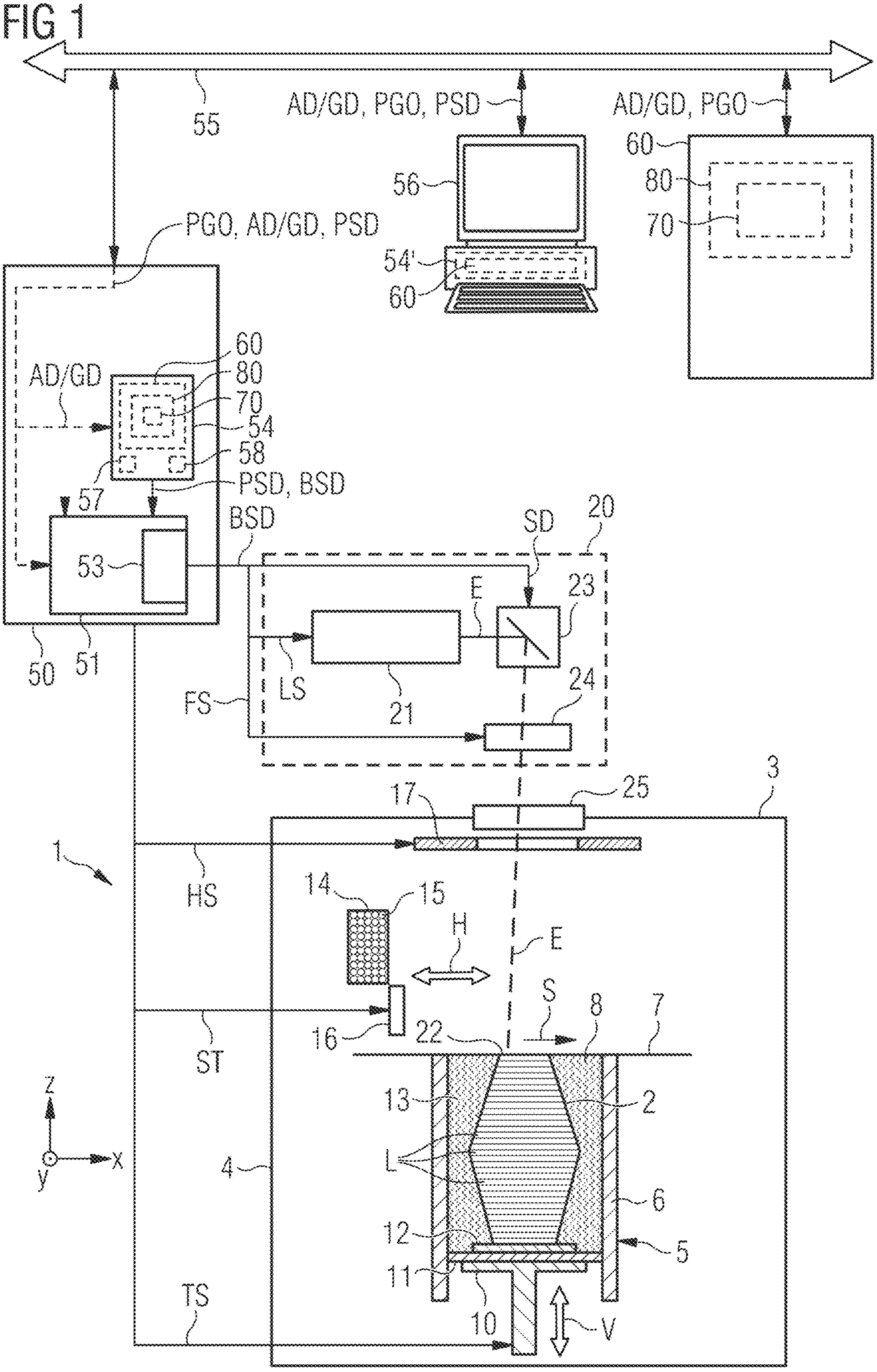
FIG. 1 shows a schematic view, partially shown in section, of an exemplary embodiment of an additive manufacturing device for realizing the invention with a control data generation device and a device for generating optimized process variable values as well as with a testing device and a device for determining property values.

Such a laser melting device 1 is shown schematically in FIG. 1. The device has a process chamber 3 or a process space 3 with a chamber wall 4, in which the manufacturing process fundamentally takes place. In the process chamber 3 there is an upwardly open container with a container wall 6. The upper opening of the container 5 forms the current working plane 7. The region of this working plane 7 inside the opening of the container 5 can be used to construct the object 2 and is therefore referred to as the construction field 8.

The container 5 has a base plate 11 that moves in a vertical direction V and is arranged on a carrier 10. This base plate 11 closes the container 5 at the bottom and thus forms its base. The base plate 11 can be formed integrally with the carrier 10, but it can also be a plate formed separately from the carrier 10 and attached to the carrier 10 or simply mounted on it. Depending on the type of specific construction material, for example the powder used, and the manufacturing process, a construction platform 12 can be attached to the base plate 11 as a construction substrate on which the object 2 is constructed. In principle, however, the object 2 can also be built on the base plate 11 itself, which then forms the construction substrate.

The basic construction of the object 2 is carried out by first applying a layer of construction material 13 to the construction platform 12, then—as explained later—selectively solidifying the construction material 13 with an energy beam E at the points which are to form parts of the object 2 to be manufactured, then lowering the base plate 11, thus the construction platform 12, with the aid of the carrier 10 and applying a new layer of construction material 13 and selectively solidifying it, and so on. In FIG. 1, the object 2 built up in the container on the construction platform 12 is shown below the working plane 7 in an intermediate state. It already has several solidified layers, surrounded by unsolidified construction material 13. Various materials can be used as construction material 13, preferably powders, in particular metal powder, plastic powder, ceramic powder, sand, filled or mixed powders or even pasty materials.

Incidentally, the working plane 7 here defines the x/y plane of a Cartesian reference coordinate system. The z direction points vertically upwards from this x/y plane and forms the main build direction, as the layers L (layers) of the component 2 are gradually built up on top of each other in this direction as the base plate 11 is successively lowered.

Fresh construction material 15 is located in a storage container 14 of the laser melting device 1. The construction material can be applied in the working plane 7 or within the construction field 8 in the form of a thin layer with the aid of a coater 16 movable in a horizontal direction H.

Optionally, there is an additional radiant heater 17 in the process chamber 3, which can be used to heat the applied construction material 13 so that the irradiation device used for selective solidification does not have to introduce too much energy. This means, for example, that a quantity of basic energy can already be introduced into the construction material 13 with the aid of the radiant heater 17, which is of course still below the energy required for the construction material 13 to melt or sinter. For example, an infrared radiator can be used as the radiant heater 17.

For selective solidification, the laser melting device 1 has an irradiation device 20 or specifically an exposure device 20 with a laser 21. This laser 21 generates a laser beam E (as an energy beam E for melting the construction material in the construction field 8). The energy beam E is then deflected by a subsequent deflection device 23 (scanner 23) in order to scan the exposure paths or tracks in the layer to be selectively solidified in accordance with the exposure strategy and to selectively introduce the energy. In other words, the scanner 23 is used to move the impact surface 22 of the energy beam E on the construction field 8, wherein the current movement vector or the direction of movement S (or scanning direction S) of the impact surface 22 on the construction field 8 can change frequently and rapidly. This laser beam E is suitably focused on the working plane 7 by a focusing device 24. The irradiation device 20 is preferably located here outside the process chamber 3, and the laser beam E is guided into the process chamber 3 via a coupling window 25 attached to the top of the process chamber 3 in the chamber wall 4.

The irradiation device 20 can, for example, comprise not just one but several lasers. Preferably, these can be gas or solid-state lasers or any other type of laser such as laser diodes, in particular VCSEL (Vertical Cavity Surface Emitting Laser) or VECSEL (Vertical External Cavity Surface Emitting Laser) or a row of these lasers.

The laser melting device 1 may further comprise devices etc. (not shown, known to a person skilled in the art) in order to apply methods such as melt pool monitoring or the like in order to compensate for any disturbances occurring in the manufacturing process in order to remain as close as possible to the target process control specified by the control data created in accordance with the invention.

The control device 50 here has a control unit 51, which controls the components of the irradiation device 20 via an irradiation control interface 53, namely transmits laser control data LS to the laser 21, scan control data SD to the deflection device 23, and focus control data FS to the focusing device 24.

The control unit 51 also controls the radiant heater 17 using suitable heating control data HS, the coater 16 using coating control data ST, and the movement of the carrier 10 using carrier control data TSD, thus controlling the coating thickness.

The control device 50 is coupled, here for example via a bus 55 or another data connection, to a terminal 56 with a display or the like. Via this terminal 56, an operator can control the control device 50 and thus the entire laser melting device 1, for example by transmitting process control data PSD.

In order to optimize the production process, the process control data PSD, in particular the exposure control data BSD of the process control data PSD, (both also abbreviated synonymously simply as "control data") are generated or modified by means of a control data generation device 54, 54' in the manner according to the invention in such a way that the control of the production device 1 takes place in such a way that, during the additive manufacturing process, certain optimized process variable values PGO are sufficiently achieved in accordance with a predetermined evaluation criterion and are maintained accordingly, as already mentioned above. For this purpose, the control data generation device 54 may also comprise a suitable device 60 for generating the optimized process variable values PGO—in particular in the form of suitable software or the like. This can, in turn, have as sub-units (e.g. software modules, routines, objects, etc.) a testing device 80 for checking the (probable) compliance with property requirements by a component which was constructed using certain process variable values, and a device 70 for determining property values of segments of such a component. Preferred approaches for determining optimized process variable values PGO and preferred exemplary embodiments of suitable devices will be explained later with reference to FIG. 4 ff.

The control data generation device 54 can, for example, be part of the control device 50 and can be realized there, for example, in the form of software components. Such a control data generation device 54 integrated in the control device 50 can, for example, accept requirement data AD (including geometric data GD) for the component to be manufactured and, on this basis, can generate the optimized process variable values PGO and, based thereon, the appropriate control data PSD and can transmit them to the control unit 51. In particular, the control data PSD comprises exposure control data BSD, but possibly also other control data, such as coating control data ST or carrier control data TS, in order to select a suitable layer thickness.

However, it would also be possible for the control data generation device 54' to be realized on an external computer unit, for example the terminal 56 in this case, and to generate, in advance, optimized process variable values PGO and the corresponding process control data PSD (in particular exposure control data BSD) for the component to be manufactured based on requirement data AD (including the geometric data GD), which are then transferred to the control device 50. In this case, the internal control data generation device 54 present in the control device 50 could also be dispensed with.

A variant is also possible in which, based on the requirement data AD (including the geometric data GD) for the component to be manufactured, the optimized process variable values PGO are determined in a separate device 60 (e.g. on a separate computer unit connected to the bus 55) and are then made available to the respective control data generation device 54, 54', for example, so that the latter only has to determine the appropriate control data PSD, BSD for this purpose. The control data generation device 54, 54' then no longer requires a device 60 for generating the optimized process variable values PGO (or a testing device 80 or a device 70 for determining property values of segments of a component).

Several of the above-mentioned possibilities for arranging the various devices 54, 54', 60, 70, 80 in a suitable topology of computing units and the control device 50 are shown as alternatives in FIG. 1. In addition, further variants can also be realized, for example in order to distribute the tasks for carrying out the invention to different computer units or the like The process control data PSD, in particular exposure control data BSD, generated by the control data generation device 54, 54' can also be regarded as set values, which are then used in the control unit 51 for a control process.

It is also pointed out once again at this juncture that the present invention is not limited to such a laser melting device 1. It can be applied to any other method for generatively or additively producing a three-dimensional object by applying and selectively solidifying a construction material, in particular layer by layer. Accordingly, the irradiation device can also comprise not only a laser, as described here, but any device could be used with which energy can be selectively applied to or into the construction material as wave or particle radiation. For example, another light source, an electron beam, etc. could be used instead of a laser.

Even if only a single object 2 is shown in FIG. 1, it is possible and generally also common to produce several objects in parallel in the process chamber 3 or in the container 5.

The following explanations to illustrate the invention relate primarily to metallic materials, which usually have a crystallographic texture. Therefore, many mechanisms and relationships can be explained more simply using these materials. However, even if the relationships can be more complex, the invention can in principle also be used for polymeric or ceramic materials, since a correlation between selected production variables and the resulting properties of the component can also be established there.

Figure 2:
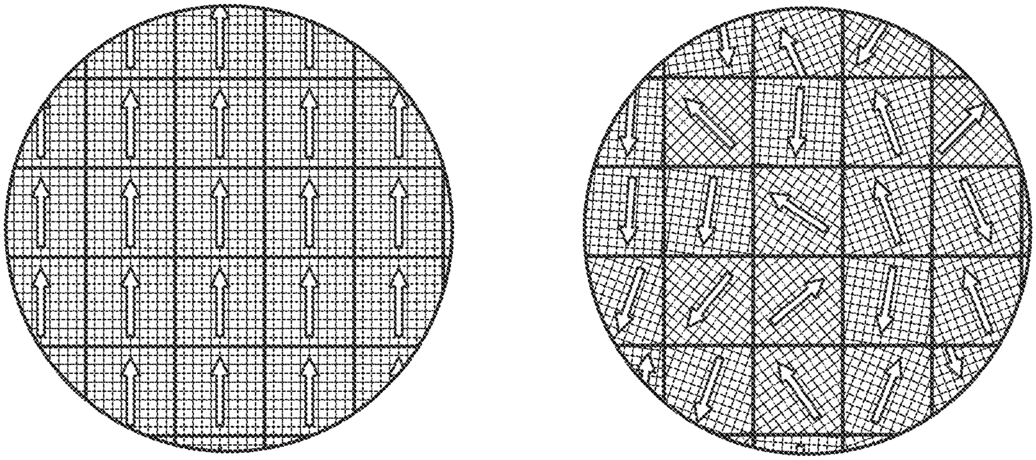
FIG 2 Prior Art
FIG. 2 shows a schematic representation of two different textures in a crystalline solid.

In crystalline or semi-crystalline solids, such as metallic components that have been additively manufactured using a laser melting process, the texture has a significant influence on the component properties, as already mentioned. This becomes relatively clear when looking at various idealized textures, as shown in FIG. 2.

The texture is defined as the totality of crystal orientations. An orientation can be described mathematically in many different ways; in crystallography, the most common way of describing it is by means of Euler angles, wherein the Euler angles describe the tilt of the crystallites in relation to a reference system.

If no preferred direction of the crystallites is formed in a solid, this is referred to as a statistically random or "grey texture". This is shown schematically on the right-hand side in FIG. 2. In the limiting case of a completely random texture, a component has isotropic properties at the macro level—even when using materials with anisotropic crystal properties.

The limiting case of directional solidification, as can occur in additive manufacturing, is the single-crystal texture. In the case of the quasi-single-crystal texture, all crystallites are present in the same or an equivalent orientation (a so-called crystallographic equivalent) due to the symmetry of the crystal, so that single-crystal properties also result for the polycrystalline component at the macro level. This is shown schematically on the left-hand side of FIG. 2. A fibre texture would look similar. This is also an idealized texture in which all crystallites are arranged within the structure with a defined crystal lattice direction along a component axis. The fibre texture differs from the quasi-single-crystal texture in that the crystal orientation still has the degree of freedom of rotation about the fibre axis.

The textures mentioned represent ideal textures. Real textures cover the entire spectrum between a highly oriented single-crystal texture or quasi-single-crystal texture and a completely random texture and can be described in good approximation as a weighted superposition of such arbitrarily rotated ideal textures. The macro properties of a textured sample, i.e. a sample within which different crystal orientations take up different proportions of the volume, therefore no longer correspond to those of the single crystal, but still exhibit anisotropic behaviour. This means that real components with real textures generally exhibit direction-independent properties at the macro level. As has been shown in the context of the invention, conclusions can be drawn about the component properties or the component properties can be estimated quite well from the information about the textures actually present in the individual layers of a component built up additively layer by layer.

A favoured and frequently used option for describing the texture is the so-called "orientation density function" (ODF for short). The ODF is usually defined in a selected "orientation space", wherein the Euler space is usually used, which is spanned by the three Euler angles as coordinate axes. The ODF then describes for each possible crystal orientation within the Euler space its volume fraction within a considered sample volume. Since each orientation in a statistically random grey texture occupies the same volume fraction in the microstructure, the ODF has a constant value for this, the volume integral of which is usually normalized to 1 in Euler space. In the case of an ideal quasi-single-crystal texture, the value is equal to 0 for the entire orientation space and only unequal to 0 for a single orientation. In the case of a real texture, the ODF describes a continuous distribution of the orientation within the orientation space, wherein the values lie between 0 and 1 and the integral of all volume fractions over the Euler space is 1. It can therefore also be employed to use textures in a mathematical context, for example as a weighting function or for other purposes, such as in the subsequent optimization process. As will be explained later using an example, the texture and thus the ODF of a sample can be determined metrologically, for example by X-ray, neutron or electron diffraction methods, or can also be determined experimentally on samples in other ways.

If the texture, in particular the ODF, within a sample is known from a measurement or an approximate solution for the texture or ODF is available from simulation results, an approximate determination of the effective macro properties of the textured poly crystal, i.e. the component, can be made using so-called mathematical homogenization methods. It is assumed here that the macro properties of a microstructure are to be understood as the superposition—usually a weighted linear combination—of the properties of the individual crystallites within its microstructure. The properties of the individual crystallites can, for example, be calculated from the single-crystal properties of the underlying phase, its chemical composition and its orientation and then added together in a weighted manner according to their volume fraction described by the ODF. The homogenization methods according to Voigt, Reuss or Hill should be mentioned in particular for determining the elasticity of a polycrystal, and are explained, for example, in Chapter 7.3f of U Fred Kocks, Carlos Norberto Tomé, H-R Wenk; Texture and anisotropy: preferred orientations in polycrystals and their effect on materials properties, Cambridge University Press, 2005, wherein Hill's method combines the methods of Voigt and Reus. Numerous other methods are already known to a person skilled in the art.

For additive manufacturing techniques, as mentioned at the outset, there is a correlation between certain process variables, such as the scanning speed, laser power and scanning strategies in a laser melting process in particular, and the resulting microstructure within the component. The cooling conditions during solidification are an important point for the development of a texture within a component. Critical influencing variables here are the temperature gradient that occurs and the feed rate of the solidification front. In laser-based additive manufacturing, where a three-dimensional melt pool is always present locally, which gradually moves in the scanning direction, both the scanning speed and the laser power density have an influence on the texture, as they are also the main factors influencing the shape and size of the melt pool that forms. For example, at very low scanning speeds, an approximately spherical melt pool is formed, resulting in a heat dissipation inclined by approximately 45° to the construction direction. If the scanning speed is increased while the power remains the same, the length of the melt pool increases, while the width and depth (in the z-direction) decrease, which is why the heat dissipation is oriented in a good approximation along the construction direction (i.e. in the z-direction).

Figure 3:
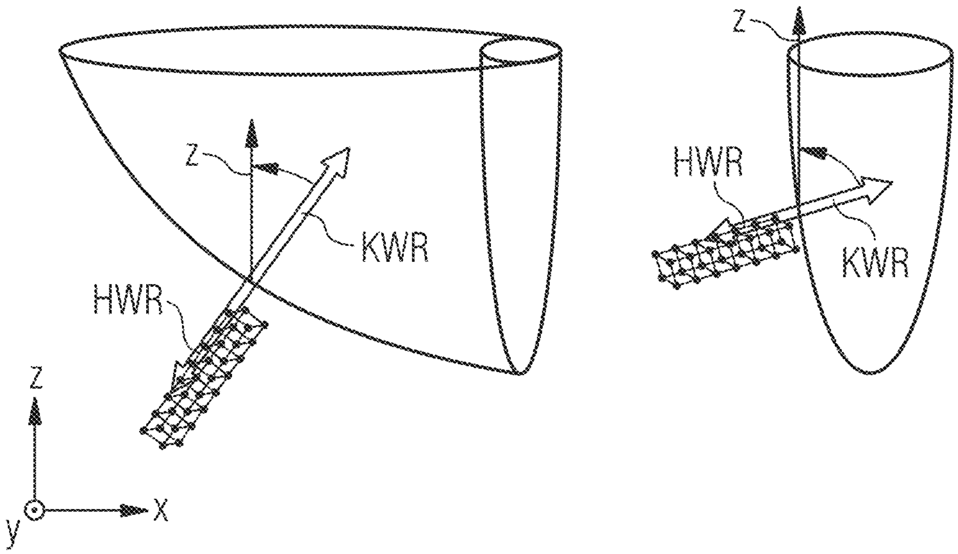
FIG. 3 shows a schematic representation of the possible influence of the movement of the energy beam on the formation of the crystal growth direction and thus the texture of a component manufactured in a beam melting process.

FIG. 3 schematically illustrates a process for modelling the texture formation during laser-based additive manufacturing, with the situation at a relatively slow scanning speed shown on the left and the situation at a relatively high scanning speed shown on the right. From the idealized melt pool geometry, a mean radius of curvature could thus be determined in the direction of advance, in this case in the scanning direction x, as well as perpendicular thereto. Normal to this approximated interface, a three-dimensionally directed dominant heat flow then results, which is represented here by the main heat flow direction HWR. The favoured crystal growth direction KWR lies in the opposite direction. This means that a primary growth of the energetically most favourable crystal orientation can be assumed to be antiparallel to the main heat flow direction HWR. FIG. 3 therefore clearly shows that the texture in a component layer or in a manufactured component depends on the aforementioned process parameter values, such as scanning speed, laser power density etc., but also on the exposure strategy, i.e. how the scanning directions or scan paths run within the respective layers, as the orientation of the melt pool in space also influences local crystal growth at every point in the component.

Furthermore, the texture in a component does not only depend on the exposure strategy, i.e. the layer scanning direction arrangement, within the respective layers. The layer scanning direction arrangement initially only significantly (co-)determines an “intraslice scanning direction distribution” in a single layer. However, since a segment of the component or the entire component is made up of several layers, the relative position of the intralayer scanning direction distributions of the individual layers to each other also plays a significant role for the overall resulting texture of the segment or in a component, since a different orientation of the layer scanning direction arrangements or intralayer scanning direction distribution would also lead to a different segment scanning direction distribution, which defines a frequency of occurrence of the respective scanning directions in the segment or component as a whole.

FIGS. 4 to 8 are used as examples to illustrate how different segment scanning direction distributions SSV2, SSV3 result for two different segments SG2, SG3 of a very simple component 2" created from several layers L, wherein a different layer scanning direction arrangement HS2, HS3 (hatching strategy) was used in each of the segments SG2, SG3. The layer scanning direction arrangements HS2, HS3 remain the same across all layers of the respective segment SG2, SG3 and are only rotated by a defined angle (which is different here in the segments SG2, SG3) from layer to layer.

The component 2" is a simple square bar 2" and the build direction z runs in the longitudinal direction of the square bar 2", i.e. the individual layers L are each oriented in the x/y plane. In the centre region within this square bar 2" there is an elongate round bar-shaped segment SG2. The entire outer region of the square bar 2" apart from this round bar-shaped segment SG2 in the centre (which forms a kind of core of the square bar 2") is a second segment SG3. This is shown on the left-hand side in FIG. 4.

Figure 4:
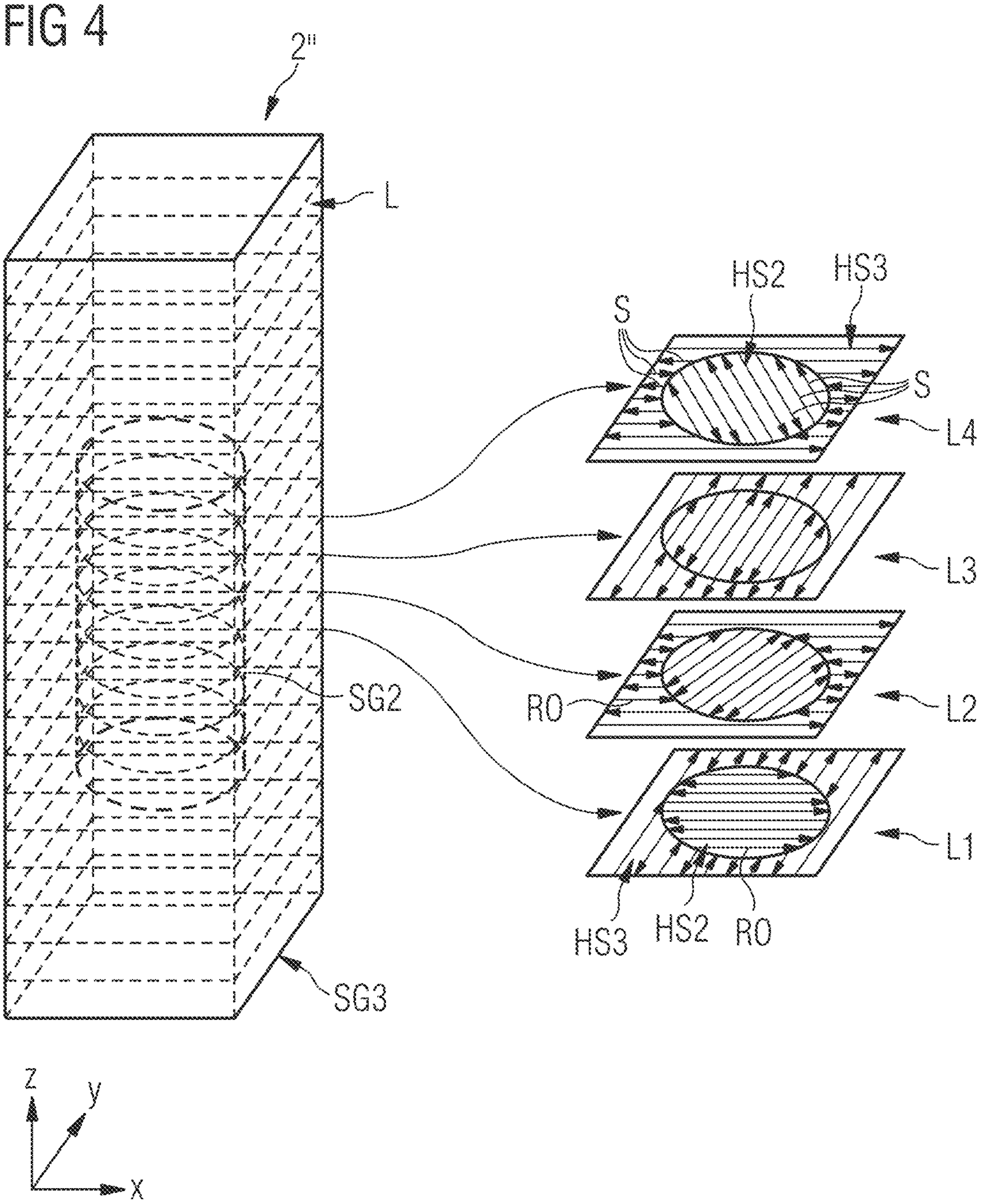
FIG. 4 shows a schematic representation of a rod-shaped sample component with two segments and a schematic representation of possible layer scanning direction arrangements and their orientations in different layers.
Figure 5:
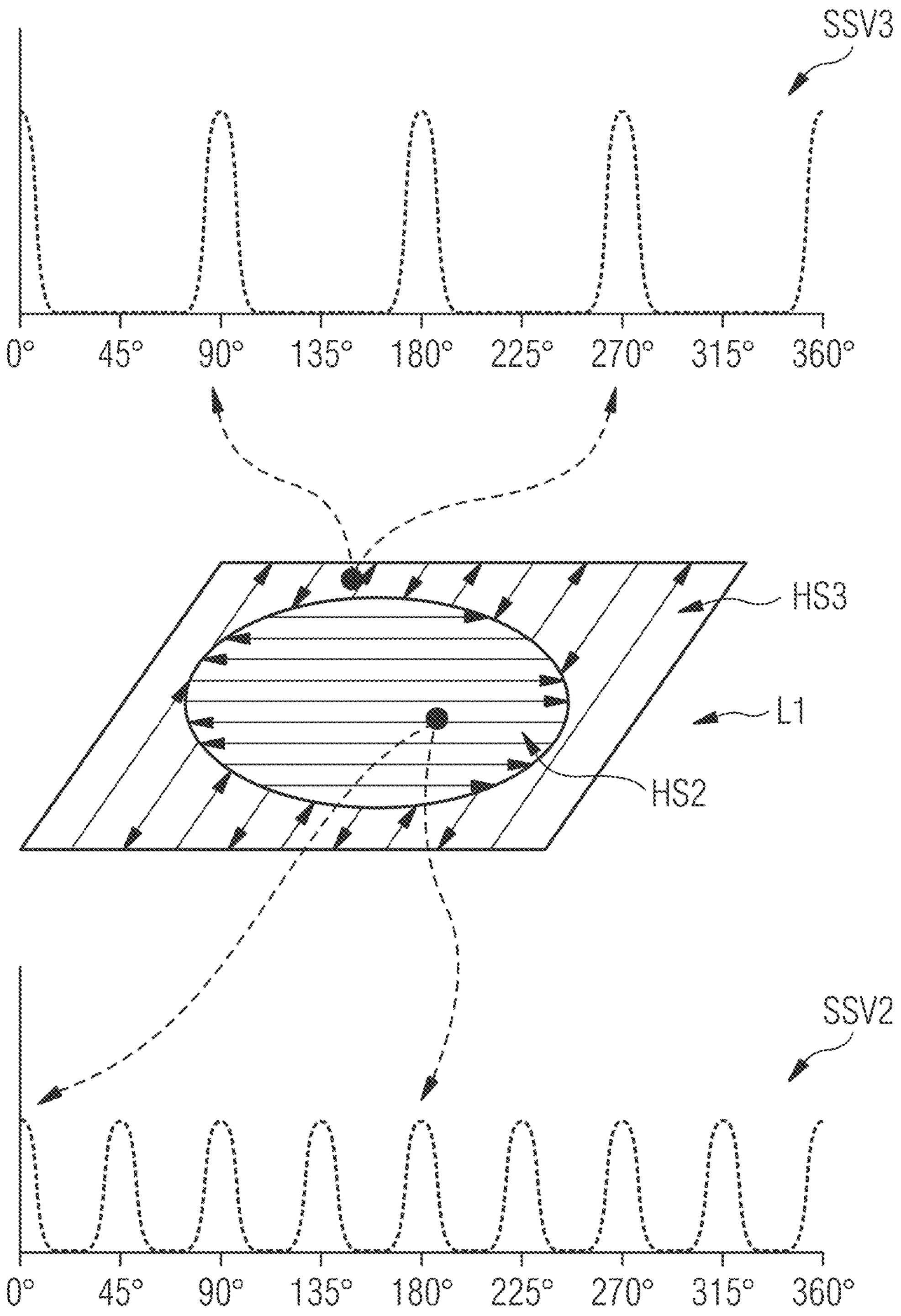
FIGS. 5 to 8 show schematic illustrations to explain how the layer scanning direction arrangements and their orientations of the different layers of the sample component from FIG. 4 can lead to different segment scanning direction distributions of the two segments.

On the right-hand side in FIG. 4, the hatching directions in four arbitrarily selected layers L1, L2, L3, L4 (also called layers) of this component 2" are shown to illustrate that different layer scanning direction arrangements HS2, HS3 are used in the respective segments SG1, SG2. In the present case, the layer scanning direction arrangements HS2, HS3 correspond to very simple hatching strategies HS2, HS3, which are used to scan or fill the entire surface of the respective segment SG2, SG3. Normally, components are divided into different regions, wherein the core region, for example, is travelled along wide tracks, each of which has a specific hatching pattern transverse to the track direction, i.e. the hatching strategies are considerably more complicated. In addition, in regions at the edges of the component, regardless of whether these are outer edges or cavities in the component, a contour mode is usually used in which an energy beam is continuously moved along the contour so that no hatching pattern is visible on the surface of the finished component. However, the simplified hatching strategies HS2, HS3 in FIG. 4 are better for clarifying the overall principle.

As shown here using the lowest layer L1 (the layers shown separately at the side), the inner segment SG2 has a hatching strategy HS2 in which two tracks are always travelled in parallel in one direction and then two adjacent tracks are travelled in parallel in the opposite direction and so on. In contrast, the hatching strategy HS3 in the outer segment SG3 is selected in such a way that one track always runs alternately in the forward direction and a second track in the reverse direction and so on. This means that the tracks run in a meandering form.

In addition, as mentioned above, different strategies of the re-orientation or rotation about the z-axis (main build direction) of the hatching strategy HS2, HS3 are followed from layer to layer for the two segments SG2, SG3. In the inner segment SG2, for example, the orientation of the layer scanning direction arrangement HS2, HS3 is always rotated by 45° from layer to layer. By contrast, the outer segment SG3 is always rotated by 90°. If a segment SG2, SG3 is then made up of several such superimposed layers, a different segment scanning direction distribution SSV2, SSV3 results for the segment SG2, SG3 as a whole, as shown in FIGS. 5 to 8.

In these figures, a diagram of the segment scanning direction distribution SSV3 for the outer segment SG3 is shown at the top and a diagram of the segment scanning direction distribution SSV2 for the inner segment SG2 is shown at the bottom. In these and all other diagrams for the segment scanning direction distributions SSV1, SSV2, SSV3, SSV4, a frequency of occurrence of the scanning direction at the relevant angle is plotted over an angle of 0 to 360°. The reference angle (e.g. where the angle 0° lies in the layer plane) can be chosen arbitrarily, as this is only a distribution. For example, the orientation of the hatching directions that run in the x-direction could always be selected as the reference orientation RO for the segment. If the component—as is usually the case—comprises several segments, the same reference orientation should be selected for all segments of the component, i.e. a reference orientation is defined for the component. In addition, the frequency of the occurrence of the scanning direction can be plotted in arbitrary units.

Since the individual scan paths according to the defined layer scanning direction arrangements HS2, HS3 are adhered to relatively precisely here, relatively narrow Gaussian lines also result in the segment scanning direction distributions SSV2, SSV3 at the corresponding degrees of the orientation of the layer scanning direction arrangement HS2, HS3.

Figure 6:
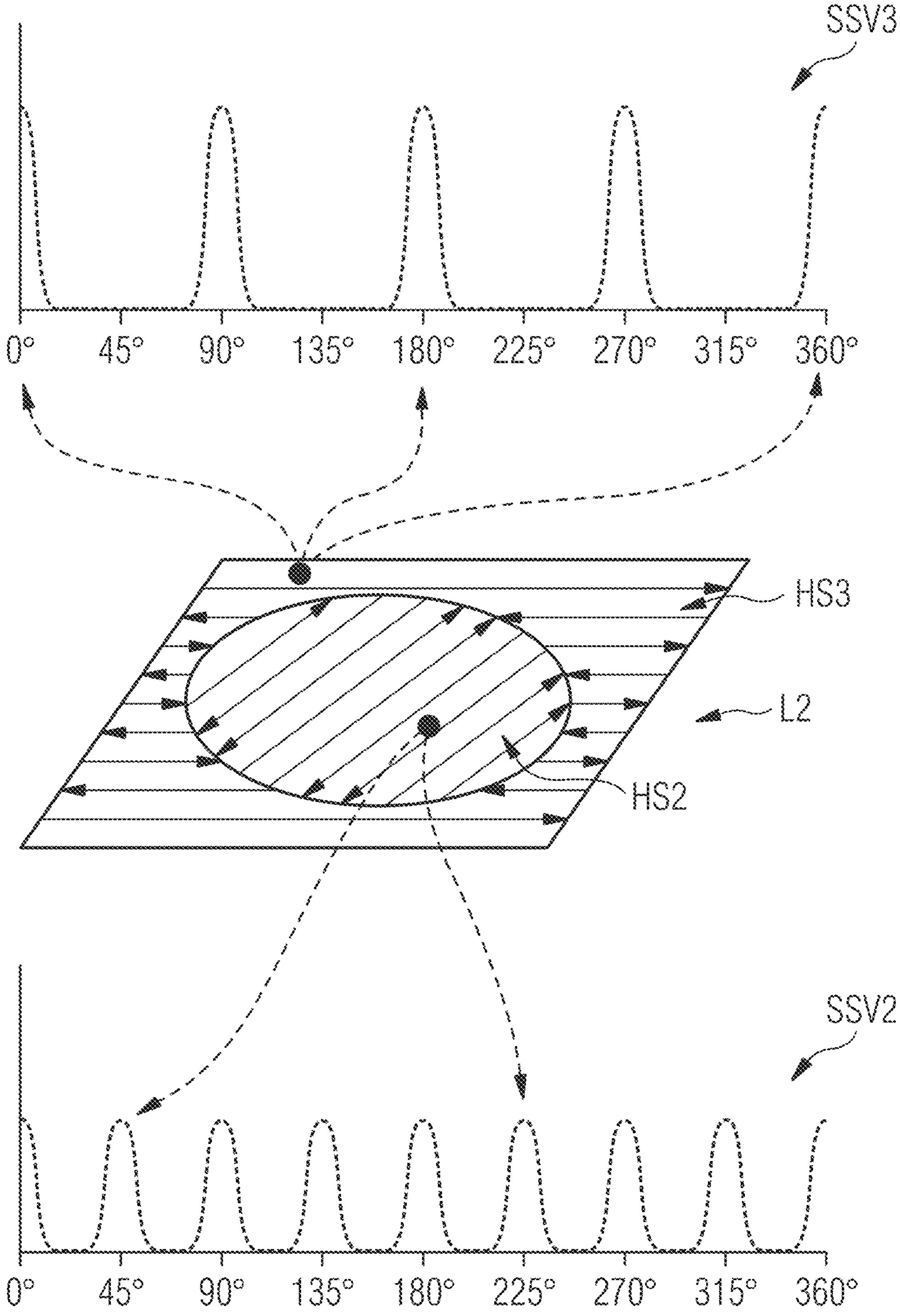
Figure 7:
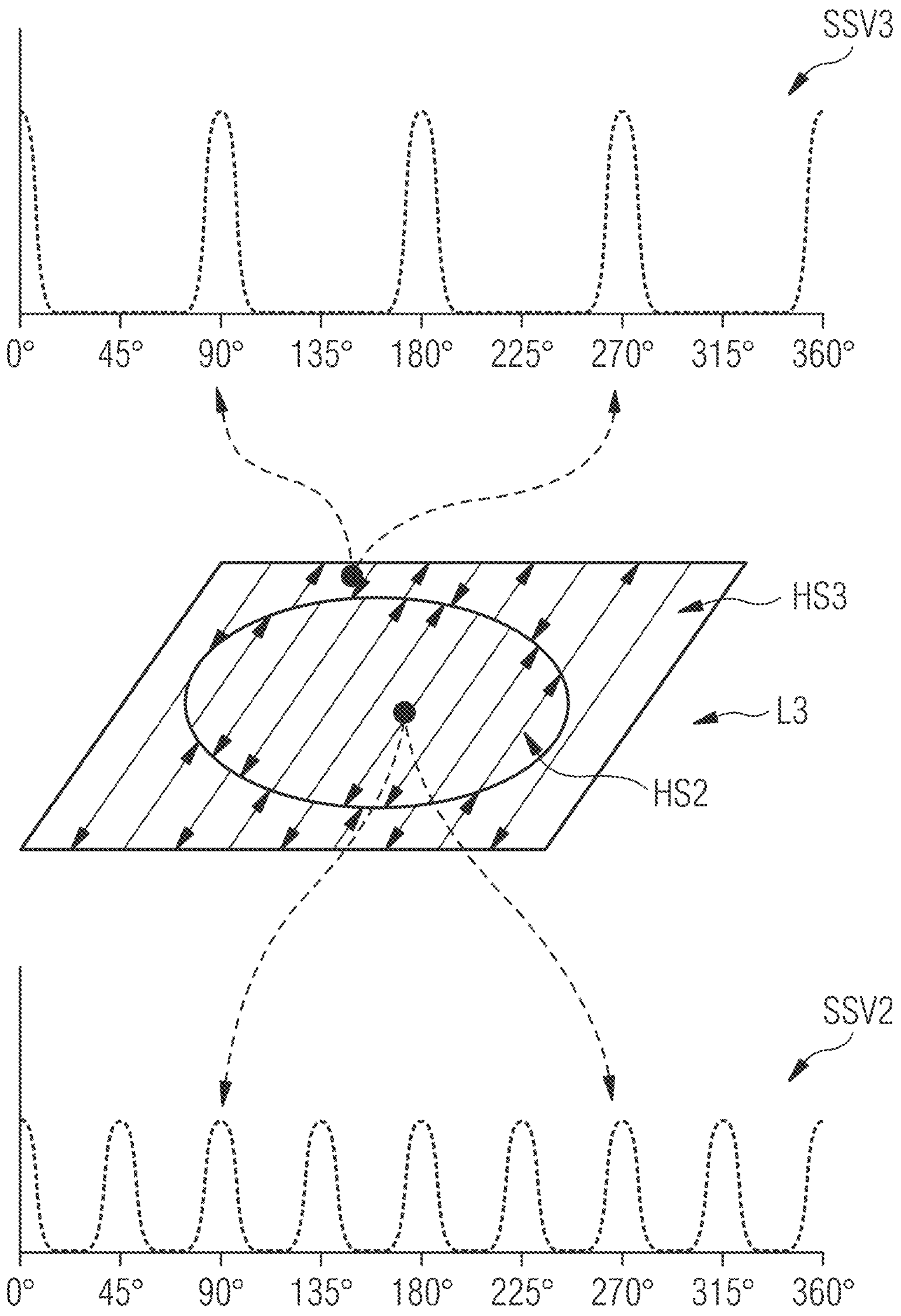
Figure 8:
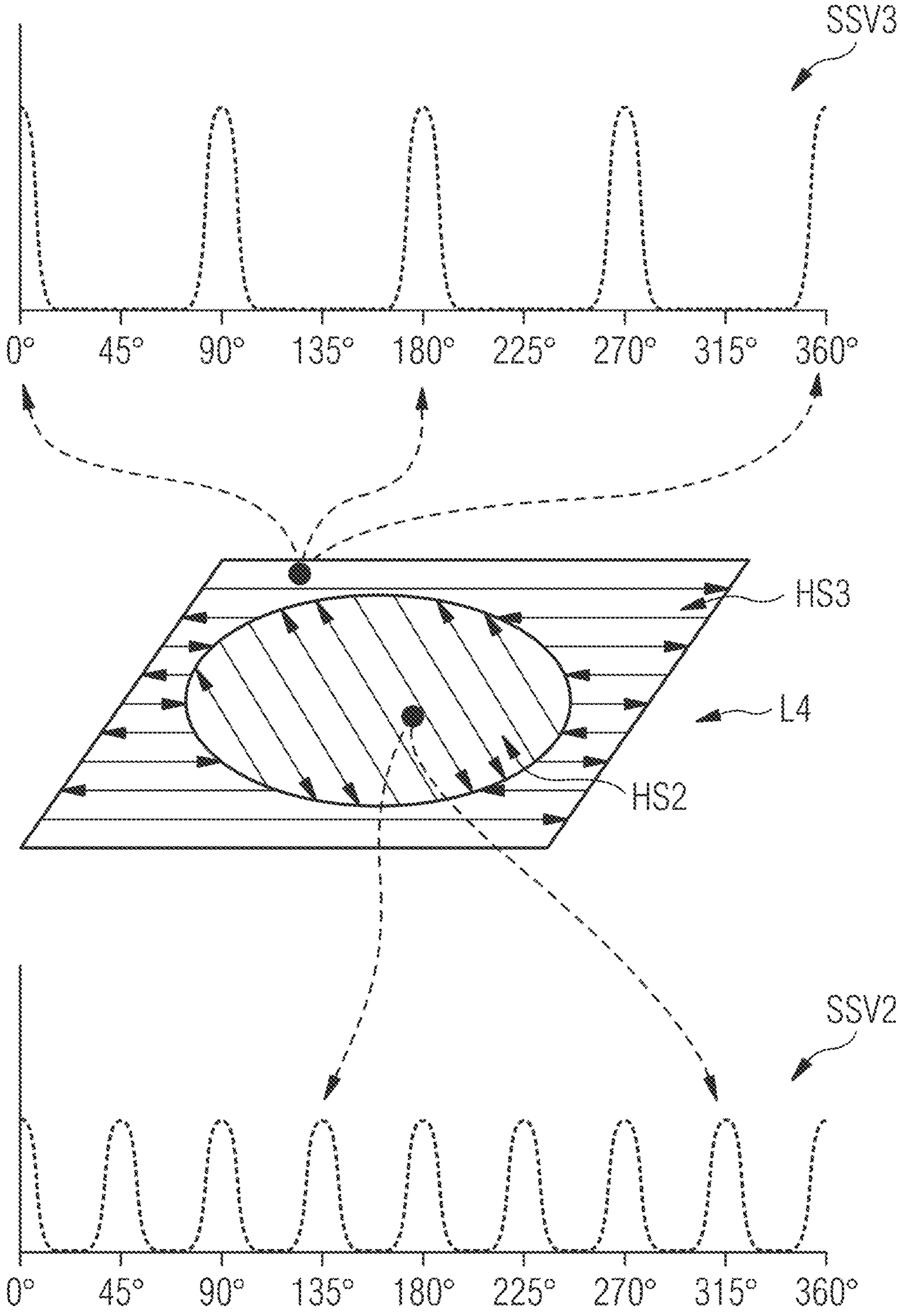

Between the upper segment scanning direction distribution SSV3 for the outer segment SG3 and the lower segment scanning direction distribution SSV2 for the inner segment SG2, the respective layer (in FIG. 5 the lowest layer L1) is shown again in each of FIGS. 5 to 8, and arrows mark how the individual scanning directions of the hatching strategy HS3 in the outer segment SG3 of the lowermost layer L1 contribute to the peaks in the upper segment scanning direction distribution SSV3 and how the individual scanning directions of the hatching strategy HS2 in the inner segment SG2 of the lowermost layer L1 contribute to the peaks in the lower segment scanning direction distribution SSV2. For example, the first layer L1 for the outer segment SG2 leads to a peak at 90° and another peak at 270°. By contrast, the hatching strategy HS2 for the inner segment SG2 in the first layer L1 leads to a peak at 0° and a further peak at 180°. FIGS. 6, 7 and 8 then show how the overlying layers L2, L3 and L4 contribute to further peaks in the segment scanning direction distributions SSV2, SSV3 for the outer segment (see the upper curve in each case) and the inner segment (see the lower curve in each case). It can be clearly seen here that not only are the hatching strategies HS2 and HS3 responsible for the segment scanning direction distribution SSV, but in particular also the strategy for the orientation of the respective hatching strategies from layer to layer. For example, the segment scanning direction distribution SSV3 for the outer segment SG3 only has peaks at 0°, 90°, 180°, 270° and 360°, whereas the segment scanning direction distribution SSV2 for the inner segment SG2 covers considerably more angles.

In principle, however, it would also be possible and in reality also preferable to use considerably more complicated or smoother segment scanning direction distributions in which the scanning directions do not run within such narrowly defined angles as is the case in the simple exemplary embodiment presented above.

Figure 9:
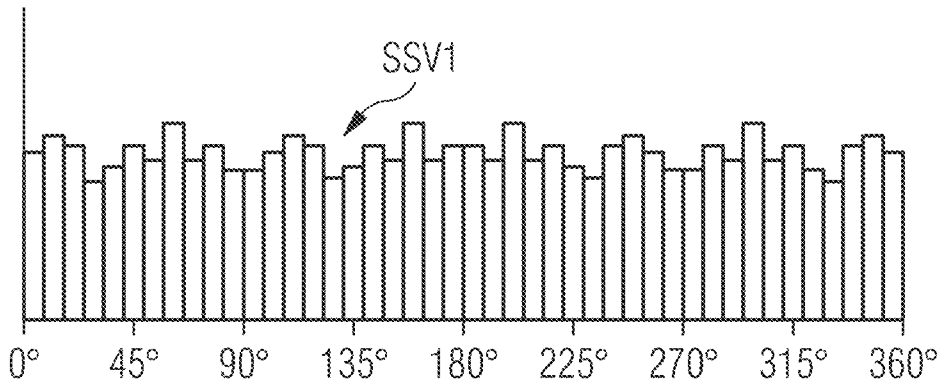
FIG. 9 shows a schematic representation of a further example of a segment scanning direction distribution, which describes a nearly uniform distribution.

FIG. 9 shows an example of a nearly uniformly distributed segment scanning direction distribution SSV3, wherein the distribution function is approximated by the probabilities achieved in each individual degree direction. Since most machines can usually resolve 1° exactly, the distribution function could be approximated by 360 individual steps.

Such a uniform distribution can be achieved in the construction of the product if a segment consists of many layers and the same layer scanning direction arrangement (hatching strategy) is used in each layer of the segment, but from layer to layer the orientation of the layer scanning direction arrangement is always rotated by an angle (e.g. the frequently used angle of 67°) that is not a divisor of 360°. In this case, virtually all angles occur in the segment scanning direction distribution.

Figure 10:
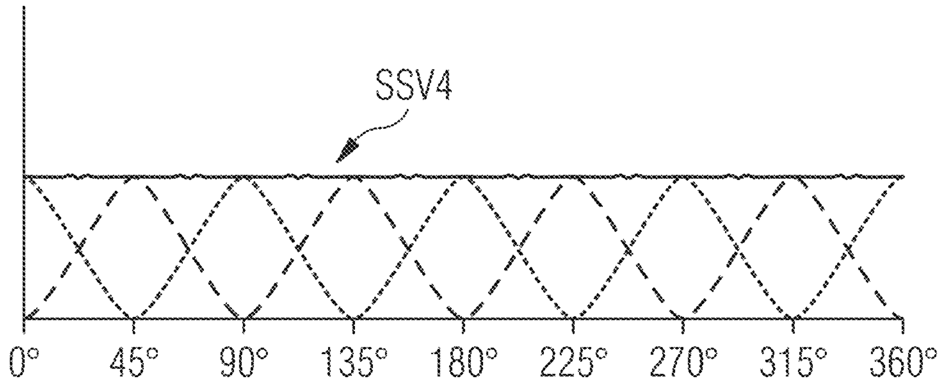
FIG. 10 shows a schematic representation of a further example of a segment scanning direction distribution, which describes an approximated uniform distribution.

FIG. 10 also shows a segment scanning direction distribution SSV4 with an almost equally distributed angle. Such a segment scanning direction distribution SSV4 can also be approximated from basis functions, e.g. radial basis functions, as shown. This has the advantage that the entire segment scanning direction distribution can be parameterized, i.e. it can be described by a relatively limited number of free angular distribution parameters, which can reduce the computational effort involved in finding the optimum segment scanning direction distribution (see also the explanations later on for equation (9)).

It is therefore always possible to change the segment scanning direction distribution, for example by selecting other layer scanning direction arrangements (i.e. a correspondingly modified parameter set, as the layer scanning direction arrangement—unlike the segment scanning direction distribution—is also specified as part of the parameter set), in particular other hatching strategies, and/or by modifying the orientation or rotation of the layer scanning direction arrangements in consecutive successive layers lying, for example by rotating them by 45° instead of 90°, etc. Just like the choice of other process parameters during production, this has an influence on the texture and therefore also on other properties of a component.

The invention can utilize all of these above-mentioned relationships in that at least one macro property value of the relevant segment can be determined or approximated on the basis of a known parameter set which was or is to be used to build up a layer of a segment of a component, as well as a segment scanning direction distribution which results over the entire segment composed of several layers. In addition, based on the relationships between the process parameter values and the segment scanning direction distribution on the one hand and the desired properties of the manufacturing product created on the other, optimized process variable values, in particular an optimum parameter set and an optimized segment scanning direction distribution in the respective segment, can be determined for the individual segments of the manufacturing product so that the component ultimately fulfils certain (quality) requirement data particularly well.

Figure 11:
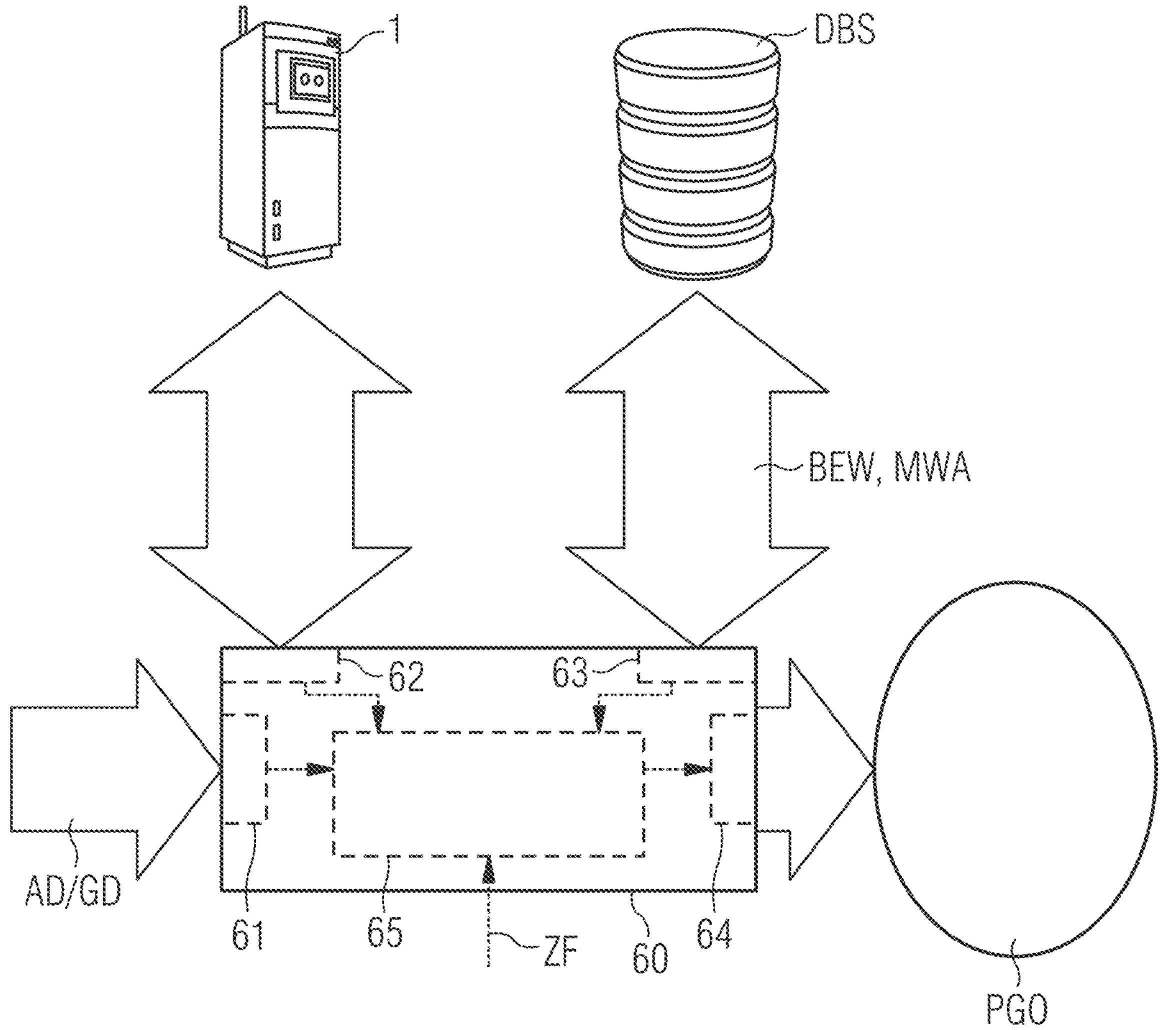
FIG. 11 shows a schematic diagram of an exemplary embodiment of a device for generating optimized process variable values.

A simplified diagram of a suitable device for generating optimized process variables is shown in FIG. 11. At the heart of this device 60 is an optimization unit 65 ("optimizer" for short), for example in the form of software.

This optimizer 65 can be supplied with requirement data AD of the desired manufacturing product via a requirement interface unit 61, for example by a user. The requirement data AD comprises at least geometric data GD of the manufacturing product, wherein this geometric data GD can, for example, in the most general case also comprise only permitted maximum dimensions for the component, or only maximum or minimum dimensions in certain directions, but on the other hand also very specific dimensions over certain exact lengths or even the CAD data defining the complete contours of the component.

The optimizer 65 is also supplied via an interface 62 with data regarding the hardware properties of the machine used (i.e. the production device 1), in particular regarding the possible process parameters with which the production device 1 can be controlled at all.

Via an interface 63, the optimizer 65 can access a property database system DBS (hereinafter also referred to as "database system" for short), which will be explained in greater detail later: In the database system DBS, certain parameter sets, with which the production device 1 can be controlled during the construction process of a layer (in particular the scanning speeds, the laser power density, etc.), are assigned property values of the respective layer or segment depending on various information about the scanning directions, for example the layer scanning direction arrangements within a layer and/or the segment scanning direction distribution within a segment consisting of several layers. As will be explained later, this can include basic property values BEW of the individual layers, such as the texture as a mathematical description by means of ODF in the respective layer or its elasticity tensor, but also macro property values, which describe the texture or ODF from a macroscopic perspective in the entire segment, for example, and/or macro property values derived therefrom, such as stiffness or strength, to name just a few examples.

The optimizer 65 can then determine optimized process variable values PGO from all of this data, e.g. in the approach explained below with reference to FIG. 14, and can make them available for further purposes via an interface 64.

The entire device 60, i.e. not only the optimizer 65, but also all interfaces 61, 62, 63, 64 can be implemented in the form of software on a suitable computer unit. The database system DBS can also be part of the device 60 and can also be realized on the relevant computer unit. In principle, the interfaces (i.e. the requirement interface 61, the other interfaces 62, 63 and the process variable value interface unit 64) can also be designed as a common interface unit in order to accept data, process it in the optimizer 65 and output it again.

The optimized process variable values PGO can be provided, for example, by storing them in a suitable memory or by sending them to another unit, which then generates the optimized control data for the production device based on them, for example in one of the control data generation devices 54, 54', as shown schematically in FIG. 1.

For the optimization process, the optimizer 65 also receives information about a desired target function ZF, wherein this target function ZF can also result at least in part from the requirement data and/or can be adopted from another program and/or can be specified or configured by means of a user interface.

Such a target function ZF can have a large number of sub-functions TF1, . . . , TFi, . . . , TFn (also called “sub-functionals”), each of which serves to take different requirements into account. This is shown graphically in FIG. 12.

Preferably, a sub-function TF1 can, for example, basically comprise the maximization of the construction rate and preferably there is also a sub-function TFn, which is aimed at minimizing the changes of the parameter set within the overall structure of the component. This means that the component should contain as few different segments as possible, as the individual segments are defined in such a way that the same parameter set is used within the segment to build up the layers of the segment in question. This can be realized, for example, by a sub-function for minimizing the number of segment boundaries (see equation (10) later). In addition, there are a large number of other optional sub-functions TFi that can take a wide variety of criteria into account, such as minimizing the use of materials (see equations (14a) and (14b)), optimizing a safety indicator factor (see equations (16a) and (16b)), minimizing the entropy of the segment scanning direction distribution (see equation (18), i.e. that the dead load of the component or the mass is reduced as far as possible, a depowderability etc. of the component (see equation (11)) and/or other arbitrary criteria.

Figure 12:
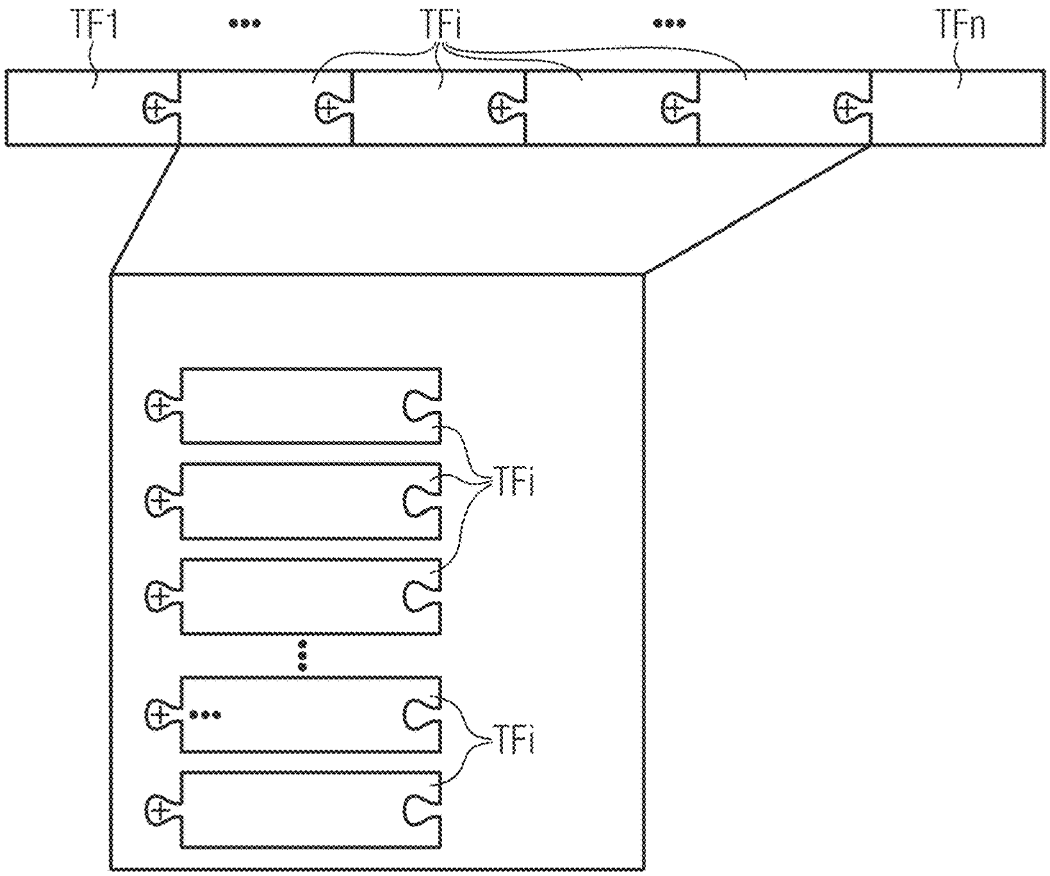
FIG. 12 shows a block diagram for setting up a possible target function for an optimization process, e.g. according to FIG. 14.

In FIG. 12, the target function ZF is shown as a chain with a (preferably obligatory) first chain link representing the sub-function TF1 for maximizing the construction rate, and with a last chain link (preferably obligatory for the preferred optimization process with moving segment boundaries explained later) representing the sub-function TFn for minimizing the number of segments and thus changing the parameter set (if—as preferred—exactly one optimum parameter set is selected for each segment). Some optional sub-functions TFi are shown in between. However, this only serves to illustrate the various possibilities. In fact, the sub-functions TF1, . . . , TFi, . . . , TFn can be concatenated in any suitable order and manner in a target function. In order to prioritize the individual criteria, the various sub-functions TF1, . . . , TFi, . . . , TFn can also each be considered with a weighting factor in the target function ZF. The choice of optional sub-functions depends on the user and their optimization problem and can be extended as required. Through a sequential coupling with the boundary value problems or mechanical loads or property requirements, the shape of the component is optimized in an area selected by the user for specified applications.

A target function F that can be used as part of the optimization process (which can also be referred to as a “quality functional” or “functional” for short), with which the optimum parameter sets and optimized layer scanning direction arrangements of the segments of a previously defined area D can be determined, can be mathematically defined as follows, for example:

$$F = \int F_{Seg} d\Omega \tag{1}$$

$$F = \int F_{Seg} d\Omega$$

$F_{Seg}$ are the segment target functions of the individual segments in the area Ω. The integration corresponds here to a summation of the segment target functions in the area Ω.

These segment target functions can be defined as follows:

$$F_{Seg} = \sum_i W_i f_i^U \tag{2}$$

$$F_{Seg} = \sum_i W_i f_i^U$$

The segment target functions $F_{Seg}$ can thus be described, without limiting the generality, as a weighted sum of sub-functionals $$f_i^U$$

(the sub-functions), each of which is multiplied by a weighting factor $W_i$. Here, i is a running index for numbering the sub-functions and the U in $f^U$ is only a placeholder for a specific name of the sub-function, for example U=build for the sub-function (the sub-functional) $f^{build}$ to minimize the construction time or maximize the construction rate.

In principle, all sub-functionals $f^U$ (and thus also the segment target functions $F_{Seg}$ and ultimately the target function F) are in some way dependent on a selected parameter set $\phi_\alpha(x)$ $$f^U(\phi_\alpha(x)) \tag{3}$$

x represents here the spatial coordinates in the area Ω, in which optimization takes place (i.e. in the component and in the powder segments). This means that each location in the area $\Omega$ is assigned a specific parameter set $\phi_\alpha(x)$, wherein this corresponds to the parameter set currently valid for the segment in which the point is located for the construction of the layers of the segment in question. As part of the optimization process, a suitable parameter set is selected for each point or segment from a number of candidate parameter sets, as mentioned above. $\alpha$ is here—and in the following—an index variable that denotes the various parameter sets $\phi_\alpha(x)$ of the candidate parameter sets.

For example, the sub-function $f^{build}$ for minimizing the construction time can be defined as follows:

$$f^{build} = -B_\alpha(\phi_\alpha(x)) \tag{4b}$$

This sub-function $f^{build}$ of the target function can be used to consider the contribution of the individual parameter sets $\phi_\alpha(x)$ on the construction speed. The sub-functional $f^{build}$ is intended to ensure that under all possible configurations of parameter sets $\phi_\alpha(x)$, depending on the location x, those with the highest volume construction rate are taken into account. Accordingly, $B_\alpha$ denotes the "volume construction rate" that can be achieved at the respective location x by the process parameter set $\phi_\alpha(x)$. Other definitions of the sub-function $f^{build}$ to minimize the construction time are also possible, as will be shown later.

In addition, many sub-functionals $f^U$ still depend on the segment scanning direction distribution $\Psi(x)$:

$$f^U(\phi_\alpha(x), \Psi(x)) \tag{5}$$

The segment scanning direction distribution $\Psi(x)$ is dependent on the location x insofar as it depends on the segment in which the current location under consideration is located.

A concrete example of a sub-function dependent on the segment scanning direction distribution $\Psi(x)$ is the sub-function $f^{st}$, which serves to adapt the location-dependent stiffness as well as possible to the stiffness requirements:

$$f^{st} = \left\| C^{\alpha}_{ijkl}(\phi_\alpha(x), \Psi(x)) - C^{soll}_{ijkl} \right\|_2 \tag{6b}$$

The location-dependent stiffness is determined here by the stiffness tensor $$C^{\alpha}_{ijkl}(\phi_\alpha(x), \Psi(x))$$

dependent on the parameter set $\phi_\alpha(x)$ and the segment scanning direction distribution $\Psi(x)$, wherein i, j, k, l are common tensor control variables. The stiffness requirements are represented by the target value $$C^{soll}_{ijkl}$$

that can be specified by the user or in another way. As can be seen, equation (6) "penalizes" excessive deviations from the target value. To express the deviation in the form of a scalar, the $L^2$ norm is used. This arithmetic operation is represented by the expression in $\| \ldots \|_2$.

As shown in equation (2), a user can use a higher weighting factor $W_i$ to emphasize certain requirements within their multiphysical requirement profile and thus ensure that this aspect is given greater consideration when finding a Pareto optimum. In principle, the weighting factors can be any number greater than 0. A sensible option would be to always choose numbers between 0 and 1, wherein the sum of the weighting factors can also be normalized to 1. If, for example, three sub-functions are to be taken into account in the target function, namely one for the safety factor, one for the construction rate and one for the number of segment boundaries, wherein the safety factor is to have a higher importance, the sub-function for the safety factor could be weighted with 0.5 and the other two sub-functions with 0.25 each.

The target function to be finally minimized in the optimization process can therefore be defined by combining equations (1) and (2) as follows:

$$\arg \min_{\phi_\alpha^{Opt}(x) \in \phi_\alpha(x)} \left( \min_{\Psi(x)}(F) \right) \text{ with } F = \int \sum_i W_i f_i^U \, d\Omega \tag{7}$$

$$\arg \min_{\phi_\alpha^{Opt}(x) \in \phi_\alpha(x)} \left( \min_{\Psi(x)}(F) \right) \text{ with } F = \int \sum_i W_i f_i^U \, d\Omega$$

The functional F has integral form here and always assumes a scalar value for the entire area $\Omega$. A higher value of the quality functional F therefore describes a less desirable state in relation to the stated requirement profile and a lower value a more desirable state. By minimizing this function (7), the optimum can therefore be found, i.e. the optimum parameter set $$\phi_\alpha^{Opt}(x)$$

is determined from the available (candidate) parameter sets $\phi_\alpha(x)$ for the respective optimal segment scanning direction distribution $\Psi(x)$.

Various optimization processes can be used for this purpose, wherein two basic cases can be distinguished:

a) Optimization with fixed segment boundaries.

b) Optimization with movable segment boundaries, i.e. the shape of the segments (and therefore also of the component) can be varied.

In both cases, the optimization can preferably be carried out in an iterative, sequential process, wherein all method steps can also be run through several times in iteration loops (in particular in nested loops) in order to take into account the influence of the optimizations in the respective steps on the other steps. A more detailed example of this specific preferred approach will be explained later with reference to FIG. 14.

First, however, the following section provides an overview of optimization processes that can be used in principle with fixed segment boundaries or with movable segment boundaries:

a) Optimization with Fixed Segment Boundaries:

A variety of, in particular numerical, methods for linear and non-linear local or global optimization with and without constraints can be used for this purpose, wherein, depending on the form of the target function F, methods that are derivative-free (e.g. interval bisection methods, downhill simplex methods, etc.), that require the first derivative (such as secant methods, gradient methods and conjugate-gradient methods, quasi-Newton methods, etc.) or that require the second derivative (such as Newton methods or Newton-Raphson methods) are particularly suitable. Depending on the method selected, the sub-functionals must then be formulated in such a way that they are optimized with regard to the variables to be optimized (i.e. the process parameter sets $\phi_\alpha(x)$ and/or the segment scanning direction distributions $\Psi(x)$) are continuous, once continuously differentiable or even twice differentiable. Preferably, methods with high convergence are used, i.e. those that require the highest possible derivative, as such methods are faster.

Examples of the technical implementation of suitable optimization processes can be found in basic works such as C. Richter, Optimierung in C++: Grundlagen und Algorithmen, 2016, Wiley-VCH, Berlin, wherein the proposed work uses the quality functional with $f(x)$ instead of F and the variables to be optimized are denoted by x.

b) Optimization with Variable Segment Boundaries:

There are also various methods for realizing optimization with movable segment boundaries. As mentioned, it is possible to simultaneously optimize the shape, i.e. the geometry, of the segments (and thus the component) and the segment scanning direction distributions, wherein the parameter sets applicable at the individual locations can inevitably also be varied by shifting the boundaries of the segments, as the location in question may be assigned to another segment by the boundary shift, in which a different parameter set applies. In principle, without limiting the generality, all methods that are used for topology optimization can be used to minimize the target function F. These methods include, inter alia:

- discrete topology optimization, Michell A. G. M. The limits of economy of material in frame structures. Philosophical Magazine 8(47):589-597, 1904
- Shape derivatives topology optimization, P. Gangl, Sensitivity-based topology and shape optimization with application to electrical machines, University of Linz, Dissertation 2016
- Level set, S. Kambampati, C. Jauregui, K. Museth & H. A. Kim, Large-scale level set topology optimization for elasticity and heat conduction, Structural and Multidisciplinary Optimization volume 61:9-38, 2020
- Evolutionary structural optimization, P. Tanskane, The evolutionary structural optimization method: theoretical aspects, Computer Methods in Applied Mechanics and Engineering, 191(47-48): 5485-5498, 2002
- Phase field, J. Kato, S. Ogawa, T. Ichibangase & T. Takaki, Multi-phase field topology optimization of polycrystalline microstructure for maximizing heat conductivity, Structural and Multidisciplinary Optimization volume 57: 1937-1954, 2018

For this purpose, a so-called "interface dynamic" must be derived from the target function F, wherein a numerically solvable differential equation is created, in which the target function F is derived according to the parameters to be optimized. These approaches are generally known to a person skilled in the art.

In the following, however, this principle is explained in a little more detail using the example of the so-called "multi-phase field method", which is particularly favoured in conjunction with the invention, as described in a similar way, for example, in I. Steinbach, Ein Multi-Phasen-Feld-Modell für facettiertes Kristallwachstum, Diss. RWTH Aachen 2000. Another explanation of the principle can be found in Chapter 7 of N. E. Ken: Phase-Field Methods in Materials Science and Engineering, 2010, Wiley-VCH, Berlin. However, the invention should not necessarily be limited to this preferred method.

The multi-phase field method (as a phase field method) is actually a method for the numericalsimulation of processes in which two or more phases and the interfaces between them, the phase boundaries, are to be described. The phase field method can be used to determine how structures and the course of the interfaces change over time. To describe the structure or the distribution of the phases, the phase field method therefore uses a so-called "phase field function", which is continuous in time and space and which can assume values between zero (first phase) and one (second phase) when describing two phases, for example. In the context of the present optimization process, this principle is advantageously used to describe the shifting of the interfaces between adjacent segments in which different process parameter sets $\phi_\alpha(x)$ and/or segment scanning direction distributions $\Psi(x)$ should apply. The different process parameter sets $\phi_\alpha(x)$ and/or segment scanning direction distributions $\Psi(x)$ therefore correspond to the different "phases" in the present case. Otherwise, the approach can be largely adopted in principle.

In order to carry out an optimization with moving segment boundaries using such a multi-phase field method, usually non-linear, partial differential equations are derived from the target function F, each of which describes the movement of the segment interface positions (i.e. the positions of the individual points or locations x of the segment boundaries).

Since, at a boundary between two adjacent segments on the one hand, there is a change from one parameter set $\phi_\alpha(x)$ to another parameter set $\phi_\beta(x)$ ($\beta$ is simply another index variable here, not equal to $\alpha$), but on the other hand no sharp transitions (interfaces) or jumps are permitted when using the required differential equations, the parameter sets $\phi_\alpha(x)$ at the location x are, to this end, each represented by their "proportions" $\overline{\Phi}_\alpha(x)$ in the technical realization of the optimization algorithm. The value of the proportion can be between 0 and 1, wherein $\overline{\Phi}_\alpha(x)=1$ means that the parameter set $\phi_\alpha(x)$ is present at a location x and a proportion of $\phi_\alpha(x)=0$ means that it is not present. This means that locations x in a boundary region (hereinafter also referred to as "interface region", the width of which can be defined by a user) between two segments in the optimization can simply represent a proportion $\overline{\Phi}_\alpha(x)$ of a first parameter set $\phi_\alpha(x)$ that applies in the first segment and a proportion $\overline{\Phi}_\beta(x)$ of a second parameter set $\phi_\beta(x)$ that applies in the adjacent second segment. If more than two segments meet in an interface region, then at one location x there may also be proportions of more than two parameter sets. In any case, the sum of the proportions of all parameter sets present at each location must equal 1. In order to cover the entire area $\Omega$ with proportions $\overline{\Phi}_\alpha(x)$ of parameter sets $\phi_\alpha(x)$, for all locations x in a centre region of a segment, i.e. outside a boundary region to another segment, the proportion $\overline{\Phi}_\alpha(x)$ of the parameter set $\phi_\alpha(x)$ valid in the segment is simply set to 1 in the optimization.

The target function F or the individual sub-functionals $f^U$ must then be adapted accordingly for the phase field method, so that it mathematically considers the proportions $\phi_\alpha(x)$ of the parameter sets $\phi_\alpha(x)$. This is done individually for the various sub-functionals $f^U$. For example, the equation (6b) explained above for the sub-function $f^{st}$ can be modified to adapt the location-dependent stiffness to the stiffness requirements by simply summing up the stiffness tensors $$C^{\alpha}_{ijkl}(\phi_{\alpha}(x), \Psi(x))$$

(dependent on the parameter sets), each multiplied by the parameter set proportions $\overline{\Phi}_{\alpha}(x)$ of the parameter sets $\phi_{\alpha}(x)$ possible at the location x:

$$f^{st} = \left\| \sum_{\alpha} \Phi_{\alpha}(x) \cdot C^{\alpha}_{ijkl}(\phi_{\alpha}(x), \Psi(x)) - C^{soll}_{ijkl} \right\|_2 \quad (6a)$$

Similarly, the sub-function $f^{build}$ according to equation (4b) can also be generalized by summing, at the location x (in an interface region), all parameter set proportions $\overline{\Phi}_{\alpha}(x)$ of the parameter sets $\phi_{\alpha}(x)$ possible here, correspondingly.

$$f^{build} = -\sum_{\alpha=1}^{N} \overline{\phi}_{\alpha}(x) B_{\alpha} \quad (4a)$$

In the numerical realization presented here, the phase field method thus describes the transition between two or more parameter sets (corresponding to the phases of the other application of the phase field method) via the proportion of the parameter sets at the locations in a "diffuse" interface region (which can be defined or predefined by the user).

A first partial differential equation is used to describe the dynamic of how the segment boundaries must shift in order to reach a minimum of the target function F. Such a differential equation can, for example, be formulated for a parameter set $\phi_{\alpha}(x)$ as follows, wherein, as explained above, the target function F depends on the proportions $\overline{\Phi}_{\alpha}(x)$ of the parameter sets $\phi_{\alpha}(x)$ in the respective segments:

$$\frac{\partial \Phi_{\alpha}(x)}{\partial \tau} = \sum_{\beta=1;\beta\neq\alpha}^{N} \frac{M\eta}{\pi^2} \left( \frac{\delta F}{\delta \Phi_{\alpha}(x)} - \frac{\delta F}{\delta \Phi_{\beta}(x)} \right) \quad (8)$$

In this partial differential equation α and β are again the indices of the various parameter sets in segments for which the common boundary region is being considered. If N different parameter sets are to be considered (as is the case in particular at a location x, where N different segments meet, as exactly one parameter set is assigned to each segment here), this equation (8) is to be solved for each parameter set $\phi_{\alpha}(x)$ with α=N, i.e. N times.

On the left-hand side, the differential equation describes the change in the parameter set proportions $\overline{\Phi}_{\alpha}(x)$ at a location x as a function of the change in a virtual "relaxation time" τ. In the usual use of the phase field method to describe phase transitions, this relaxation time corresponds to a real time during which the phases change. In the context of the present use, the relaxation time is adopted as a corresponding purely virtual parameter in order to be able to track the change in the segment boundaries in the numerical process. In other words, the virtual relaxation time is required to iteratively determine the spatial segment configuration with the parameter sets associated with the segments and the segment scanning direction distribution using the phase field equation, for which the value of the target function F is minimal.

The right-hand side of equation (8), on the other hand, represents the "driving force" that acts on the segment boundaries to move them into the optimum spatial configuration and thus minimize the target function F.

The driving force is determined by a pairwise comparison of the variation of the target function SF as a function of the parameter set proportions $\overline{\Phi}_{\alpha}(x)$ and $\overline{\Phi}_{\beta}(x)$. Here, α and β are again the indices of the various parameter sets in adjacent segments of which the interface region is being considered in order to form the pairwise differences. Since, at one location x, more than two segments can meet in an interface region, all pairwise comparisons are summed, wherein in the above example the index β is again run through for all parameter sets from 1 to N except for the index α.

In a pre-factor before the difference of the derivatives of the target function F according to the parameter set proportions $\overline{\Phi}_{\alpha}(x)$ and $\overline{\Phi}_{\beta}(x)$, analogously to the phase field method, a value M is recorded for the "mobility" of the segment boundaries, more precisely the diffuse interface region (i.e. the region on or in the immediate vicinity of the interface), and a value η is recorded for the width of the diffuse interface region. These variables must be determined for the respective numerical method, as described later on the basis of an exemplary embodiment for the numerical realization. However, they have no physical meaning, as in the original phase field method.

Since, as explained above, the target function F also depends on the segment scanning direction distributions Ψ(x), a second partial differential equation must be set up for these. This can be formulated as follows, for example:

$$\frac{\partial \tilde{\Psi}_i(x)}{\partial \tau} = \sum_{i=1;j\neq i}^{N} \frac{M_s \eta_s}{\pi^2} \left( \frac{\delta F}{\delta \tilde{\Psi}_i(x)} - \frac{\delta F}{\delta \tilde{\Psi}_j(x)} \right) \quad (9)$$

As the comparison with equation (8) shows, the partial differential equations for the parameter sets and the segment scanning direction distributions are in principle similar. Nevertheless, there are differences, since the segment scanning direction distributions Ψ(x) for the individual segments are parameters that can be optimized in the method and are not, like the parameter sets $\phi_{\alpha}(x)$, selected from a number of discrete candidate parameter sets.

In equation (9), therefore i and j are each variables which can denote the free angular distribution parameters to be optimized $\tilde{\Psi}_i(x)$ of the segment scanning direction distributions Ψ(x).

For example, in equation (9), the free angular distribution parameters $\tilde{\Psi}_i(x)$ for a non-parametric description of the segment scanning direction distribution Ψ(x) can be the proportions of the individual discrete scanning direction angles in the respective segment scanning direction distribution Ψ(x), wherein i and j are each control variables representing the different scanning direction angles. The segment scanning direction distribution Ψ(x), for example, can thus be broken down into 360 discrete scanning direction angles of one degree each, wherein the control variables i and j then assume the values 0-359 and each value of the control variable can be assigned to a scanning direction angle (see the explanations above for FIG. 9). A free angular distribution parameter $\tilde{\Psi}_i(x)$ is then the proportion of exactly the i-th scanning direction angle in the segment scanning direction distribution Ψ(x) (for j the corresponding applies). The value of the segment scanning direction angle components $\tilde{\Psi}_i(x)$ is between 0 and 1, wherein a value between 0 and 1 does not indicate a segment boundary, but only describes a proportion of the scanning direction angle in the segment scanning direction distributions Ψ(x). The rule here is that at each location x the sum of all segment scanning direction angle components $\tilde{\Psi}_i(x)$ must be equal to 1.

If the segment scanning direction distribution $\Psi(x)$ can be defined parametrically, e.g. as a Gaussian distribution, the free angular distribution parameters $\tilde{\Psi}_i(x)$ can alternatively also be the individual parameters of the segment scanning direction distribution $\Psi(x)$ according to which optimization is to take place, wherein i and j stand for the individual parameters (e.g. i for the mean value and j for the standard deviation).

This second partial differential equation (9) now describes on the left-hand side the change in the free angular distribution parameters $\tilde{\Psi}_i(x)$ (e.g. the segment scanning direction angle components $\Psi_i(x)$ for a non-parametrically defined distribution or the usual free parameters for a parametrically defined distribution) at a location x as a function of the change in the virtual relaxation time $\tau$ already explained above.

Accordingly, the driving force on the right-hand side of the second partial differential equation (9) is determined by a pairwise comparison of the variation of the target function SF over the free angular distribution parameters $\tilde{\Psi}_i(x)$, very similarly to the approach in equation (8).

In the pre-factor $M_s\eta_s/\pi^2$, again analogously to the phase field method, a value $M_s$ is set for the mobility with which a change in the free angular distribution parameters $\tilde{\Psi}_i(x)$ can propagate in a segment, and a width $\eta_s$ is set for the diffuse interface region on which a variation of the free angular distribution parameters $\tilde{\Psi}_i(x)$ can take place. These variables must again be determined for the respective numerical method, as described later on the basis of an exemplary embodiment. They can correspond to the above-mentioned parameters M or $\eta$ but do not have to. They have no physical meaning as in the original phase field method. The values for $M_s$ and $\eta_s$ should preferably be selected here in such a way that the change in the free angular distribution parameters $\tilde{\Psi}_i(x)$ occurs quickly, i.e. an adjustment of the segment scanning direction distribution $\Psi(x)$ is quickly applied in the entire segment.

These partial differential equations (8) and (9) are usually, or in daily practice, not so easy to solve analytically for the entire area $\Omega$. Therefore, in practice, the solution is preferably carried out by numerical methods, i.e. the partial differential equations are converted into a system of equations that can be solved by numerical methods. This can be done using the finite element method, which is described, for example, in P. Knabner, L. Angerman, Numerik partieller Differentialgleichungen, Springer-Verlag, Berlin/Heidelberg, 2000. The transformation is performed by dividing the area $\Omega$ into discrete, finite sub-areas $\Omega_T$. In these discrete sub-areas $\Omega_T$, for example for each location-dependent parameter used in the differential equations (i.e. both the location-dependent constants and the optimization parameters), a value can be stored at each point in time of the above-mentioned virtual "relaxation time" $\tau$ (e.g. for each iteration step in the optimization routine). Various methods for discretization, i.e. for breaking down an area $\Omega$ into discrete sub-areas $\Omega_T$, are known to a person skilled in the art and therefore do not need to be explained in detail. Nevertheless, the frequently used method of breakdown into hexagonal finite elements of equal size is outlined below as a concrete example, wherein the individual elements are referred to as "voxels" in the following, as is also common in everyday language.

When performing the breakdown, it makes sense to minimize the number of voxels. To make this possible, the breakdown can depend on the task set or the optimization process. The breakdown can be carried out taking into account that each voxel is only assigned the values of the parameter set proportions (as defined above) $\overline{\Phi}_\alpha(x)$ and the free angular distribution parameters to be optimized (as defined above) $\tilde{\Psi}_i(x)$. If, in a voxel, the value of a parameter set proportion $\overline{\Phi}_\alpha(x)$ of a parameter set $\phi_\alpha(x)$ of a particular segment is equal to 1, this parameter set is applied in the relevant voxel, i.e. the voxel is clearly located in the segment. If, on the other hand, the value is 0, this parameter set $\phi_\alpha(x)$ is not used in this voxel, i.e. the voxel is clearly outside the relevant segment. If the value is between 0 and 1, the voxel is located in the region of a segment boundary, which must be reconstructed for a geometric representation. The transition between two or more segments usually extends over several voxels using the phase field method. Preferably, the transition should extend over as few voxels as possible.

For the phase field method, the voxel size can also preferably be selected so that the voxel edge length corresponds to a tenth or less of the width of the detail to be depicted in the component. In the actual realization, this width of the detail to be depicted in the component can be, for example, the minimum wall thickness that can be realized by the parameter sets, the smallest beam extent of the energy beam used for solidification, or any other value defined by the user.

To reduce the computational effort, the voxel size can also be controlled in such a way that it is only broken down to the required resolution near the current segment boundaries, whereas larger voxels are used in the regions that are clearly located in a segment anyway. Alternatively or additionally, to reduce the computational effort, only those parts of the system of equations resulting from the finite element method that are close to a segment boundary surface can be solved, i.e. a solution is only sought for the relevant voxels in the region of the segment boundaries (i.e. on the segment boundaries and in the vicinity of the segment boundaries).

Depending on the minimum voxel size defined as above, the width $\eta$ or $\eta_s$ of the diffuse interface region in equations (8) and (9) can also be selected, as the magnitudes of the numerically formed gradients, which can occur in the sub-functionals $f^U$, depend on the voxel size.

In practice, the value $\eta$ for equation (8) or width $\eta_s$ for equation (9) can preferably be selected in such a way that the value which the sub-functional $f^{int}$ described later in conjunction with equation (10) for minimizing the number of segment boundaries has the same order of magnitude as the other sub-functionals in the target function. To ensure this, possible values for $\eta$ and $\eta_s$ can be stored in a database or determined by evaluating the other sub-functionals in the start configuration. A typical value for $\eta$ and $\eta_s$ could be $10^{-6}$ mm for a voxel size of 1 mm, for example.

The value M for the mobility in equation (8) or the value $M_s$ for the mobility in equation (9) can preferably be determined in such a way that, in all sub-areas Dr, the maximum change in the parameter set fraction $\overline{\Phi}_\alpha(x)$ and the free angular distribution parameters to be optimized $\tilde{\Psi}_i(x)$ is less than 1 in each iteration step of the optimization process. As a rule, a value of 0.5 or less is preferred for many numerical methods so that the phase field method converges iteratively to the solution.

In practice, an existing program or program parts can simply be used to solve such tasks numerically for the optimization. For example, such programs are available in the software packages OpenPhase, OpenFoam or deal.II, etc.

Since the segment boundaries are defined by diffuse interface regions in the described phase field method, it is determined after optimization in which voxels in the interface region which process parameter set and which segment scanning direction distribution is ultimately to be used.

Among other things, this can also depend on what the data obtained in the optimization process is specifically intended to be used for.

If it is to be used directly to control the production device, use can also be made, in the interface regions, of the fact that the parameter set proportions $\Phi_\alpha(x)$ of different parameter sets $\phi_\alpha(x)$ which are assigned to the various adjacent segments are known for the voxels there. In this case, for example, the data for the process parameter sets together with their proportions can also be transferred voxel by voxel to the control device of the production device, and, during the production method, the process parameter sets are applied several times in an overlap region between two segments according to their proportions. In a laser powder-bed fusion process, for example, the laser can expose several times in the overlap region, each time with different process parameter sets.

By contrast, to reconstruct sharp segment boundaries again in order to visualize the component as a CAD model, this can be done using a suitable method, for example in the form of isosurfaces. Isosurfaces are surfaces that connect voxels that are adjacent in space and that have the same characteristics or values of a certain size, such as parameter set proportions or free angular distribution parameters. Since, as already mentioned, a segment is preferably also defined by the fact that the same process parameter set $\varphi_\alpha$ applies in the segment (in addition to the same segment scanning direction distribution) (and in this sense it could also be described as a "process parameter area"), the isosurfaces determined here are to be equated with the segment boundaries. In the voxels in which different parameter sets $\phi_\alpha(x)$ with their respective parameter set proportions $\Phi_\alpha(x)$ are present, a decision must be made as to which parameter set should apply there. Preferably, for example, this can be the parameter set with the largest proportion.

One method for generating isosurfaces is, for example, the Marching Cubes method, as described in C. D. Hansen, C. R. Johnson Visualization Handbook, Elsevier Science, 2005, among others. Other methods from this textbook could also be used.

A corresponding assignment of the voxels in the interface region to a segment scanning direction distribution is not absolutely necessary, as it is not only possible to define the process parameter set with the assignment to a segment, but also to assign the associated layer scanning direction arrangement to the respective segment in which the process parameter set is to be applied. This automatically results in the segment scanning direction distribution of the segment, which must be standardized for the entire segment.

In the following, some further sub-functions (=sub-functionals) are listed as examples in order to set up the target function according to equations (1) and (2), wherein $\alpha$ and $\beta$ are again the indices of the various parameter sets $\phi_\alpha(x)$ and $\phi_\beta(x)$ in the N different segments for which the common interface region is being considered, as explained above.

a) Sub-Functional for Minimizing Segment Interfaces:

A sub-function or a sub-functional, which can be used to minimize the number of interfaces between the segments, can be defined as follows:

$$f^{int} = \sum_{\beta=1,\alpha\neq\beta}^{N} \frac{4\mu_{\alpha\beta}(\gamma)}{\eta}\left(-\frac{\eta^2}{\pi^2}\nabla\Phi_\alpha(x)\nabla\Phi_\beta(x) + \Phi_\alpha(x)\Phi_\beta(x)\right) \tag{10}$$

The equation penalizes the presence of interface regions in the shape optimization, i.e. the more interface regions there are present in area $\Omega$, the higher the value of the target function F. This sub-functional thus ensures that the interface regions and the resulting segments in which the parameters vary are clustered, i.e. that the segments have a certain spatial extent and that a large number of segments that are too small are not formed. This ultimately also reduces the number of parameter set changes during the construction of the component.

$\nabla\Phi_\alpha(x)$ to this end denotes the spatial gradient of the parameter set proportion $\Phi_\alpha(x)$. This applies analogously for $\nabla\Phi_\beta(x)$. In the interior of a segment (i.e. not in an interface region), these gradients are 0 and one of the parameters set proportions $\Phi_\alpha(x)$ or $\Phi_\beta(x)$ must also be 0 (the other is then 1), which means, overall, that the proportion in the total sum is 0 there. In the interface regions, however, the value in parentheses is not equal to 0. $\eta$ again denotes the value that is assumed for the width of the diffuse interface region.

The variable $\mu_{\alpha\beta}(\gamma)$ denotes a type of interface energy that on the one hand can depend on the combination of parameter sets. This means that the interface between a parameter set that represents unsolidified material and another parameter set in which material is solidified can, for example, be penalized differently than an interface between two parameter sets in which material is solidified in each case. On the other hand, the interfacial energy $\mu_{\alpha\beta}(\gamma)$ as shown can be a function of a parameter $\gamma$ which can be used to make it anisotropic. In practice, it can be useful to calculate the interfacial energy for all interface regions for all combinations of parameter sets in which one of the parameter sets relates to a segment with unsolidified material and the other parameter set relates to a segment with solidified material, depending on an angle $\gamma$ between a vector of the gravity field and the direction of the orientation of the interface regions, i.e. the segment interface normal direction, which in turn can be calculated from the gradients of the parameter set proportion. This means that an anisotropic interfacial energy dependent on the angle $\gamma$ can be realized, for which, for example, overhangs are penalized more strongly, as excessively large overhangs would usually have to be supported by supports. This means that the number of supports can also be reduced.

b) Sub-Functional to Ensure that the Component can be Depowdered (Only with Movable Segment Boundaries):

A sub-function or a sub-functional which is used to penalize regions with powder inclusions within the component can be defined as follows for the multi-phase field method:

$$f^{clean} = p_R(x) A \sum_\alpha \Phi_\alpha(x) \tag{11}$$

In order to use this functional, a fluid simulation can be carried out in the entire area, as explained later using an example in FIG. 14. In such a fluid simulation, the powder is assumed to be a fluid that flows out of the area as a result of a pressure difference. The fluid simulation is designed so that a residual pressure $p_R$ remains in regions that cannot be depowdered and is represented by a number greater than 0. If an area can be depowdered, the value of the residual pressure is 0. Depending on the design of the fluid simulation, the maximum value for the residual pressure $p_R$ can vary. This is preferably scaled by the factor A so that the value of the sub-function is of the same order of magnitude as that of the other sub-functionals. The sum term $\Sigma_\alpha\Phi_\alpha(x)$ is only used in this equation to ensure that the sub-functional in the derivation of the target function F in equation (8) only becomes 0 if the residual pressure $p_R=0$. Since the value $p_R(x)A$ determined by means of the fluid simulation is a constant, without the sum term the sub-functional in equation (8) would always be 0 due to the derivative.

c) Sub-Functional to Ensure Correct Heat Treatment:

A sub-function $f^{WB}$ which penalizes segments that cannot comply with certain specified heat-treatment parameters can be generally defined as follows, e.g. for the multi-phase field method for moving segment boundaries:

$$f^{WB} = \sum_\alpha \overline{\phi}_\alpha(x)\cdot W\left(\dot{T}_{Soll}(\phi_\alpha(x), t), \dot{T}_{Ist}(x, t)\right) \tag{12a}$$

$W(\dot{T}_{Soll}(\phi_\alpha(x),t), \dot{T}_{Ist}(x),t)$ describes herein a function that calculates the deviations between a parameter set-specific target heat-treatment-temperature-time profile $\dot{T}_{Soll}(\phi_\alpha(x),t)$ and an actual heat-treatment-temperature-time profile $\dot{T}_{Ist}(x,t)$ resulting from a heat-treatment simulation (see also the later explanations on FIG. 14) into a scalar value. Here, t describes the time. Equation (12a) therefore means that any deviation between the target and actual heat-treatment-temperature-time profile leads to an increase in the value of the target function.

The simplest exemplary embodiment of the function W can be stated here as the sum of the squares of the differences:

$$W\left(\dot{T}_{Soll}\left(\overline{\phi}_\alpha(x), t\right), \dot{T}_{Ist}(x, t)\right) = \frac{1}{t}\int_{\overline{t}}\left(\dot{T}_{Soll}\left(\overline{\phi}_\alpha(x), \overline{t}\right) - \dot{T}_{Ist}(x, \overline{t})\right)^2 dt \tag{13}$$

$\overline{t}$ represents here the integration variable of time. A person skilled in the art can also use any metric that is suitable for their material, e.g. the difference to the critical cooling rate.

The sum term $\Sigma_\alpha\overline{\Phi}_\alpha(x)$ in equation (12a), as in equation (11), again only serves to ensure that the sub-functional in the derivation of the target function F in equation (8) only becomes 0 if the value of the function W is also 0. If the optimization were carried out without shifting the segment boundaries, this term could also be omitted and, instead of equation (12a), a simplified form for the sub-function $f^{WB}$ could be used:

$$f^{WB} = W\left(\dot{T}_{Soll}(\phi_\alpha(x), t), \dot{T}_{Ist}(x, t)\right) \tag{12b}$$

e) Sub-Functional to Reduce the Material Use:

A sub-function $f^M$ which penalizes segments depending on their mass input can be defined as follows, e.g. for the multi-phase field method for moving segment boundaries:

$$f^M = \sum_\alpha \overline{\phi}_\alpha(x)\cdot \rho^\alpha(\phi_\alpha(x)) \tag{14a}$$

$\rho^\alpha(\phi_\alpha(x))$ herein is the mass density at the respective location x, which is present there with the parameter set $\phi_\alpha(x)$ used on account of the segment present at this location x. It is multiplied by the parameter set proportion $\overline{\Phi}_\alpha(x)$ at the location x and the product is summed over all parameter set proportions $\overline{\Phi}_\alpha(x)$ present at the location x.

If the optimization were carried out without shifting the segment boundaries, a simplified form for the sub-function $f^M$ could be used instead of equation (14a), since only one parameter set $\phi_\alpha(x)$ can be present definitively at each location (there are then no diffuse interfaces):

$$f^M = \rho^\alpha(\phi_\alpha(x)) \tag{14b}$$

f) Sub-Functional to Optimally Ensure a Safety Factor:

In practice, structures are designed taking into account a "safety factor" with regard to their load. A safety factor S is specified by means of a numerical value and indicates the factor by which the failure limit of a material state or of an entire component is designed to be higher than it should be based on theoretical determination. The safety factor is usually determined on the one hand from the state of the material of the component and the resulting theoretical state variables, e.g. strength, and on the other hand from the states of the field variables acting in the component, e.g. the mechanical stresses.

In order to depict this situation in a development of the method according to the invention, a "safety indicator factor" $Ss_\alpha(\phi_\alpha(x))$ is preferably introduced, which describes the difference between the specified safety factor and the current state of the component or its segments from the simulation. The difference is preferably represented here by a number. This representation can be arbitrary, but should preferably represent at least three states:

i) the sought safety factor is undershot, ii) the sought safety factor is exactly fulfilled iii) the sought safety factor is exceeded.

For this purpose, a definition can preferably be made in such a way that the value 0 of the safety indicator factor expresses that the desired safety factor S is exactly fulfilled, that a value less than 0 expresses that this safety factor is undershot, and that a value greater than 0 expresses that this safety factor is exceeded. The value of the safety factor S is generally always greater than or equal to 1, otherwise the component would very probably fail under the planned load. It usually depends on the field of application and, if applicable, its standards. Typical values for the safety factor S are, for example, 1.5 or 2 in the automotive industry and 1.5 to 6 in the aviation industry, depending on the safety relevance of the component.

A safety indicator factor $Ss_\alpha(O_\alpha(x))$ for a parameter set $\phi_\alpha(x)$ at the location x can be defined as follows, for example:

$$Ss_\alpha(\phi_\alpha(x)) = \frac{1}{S} - g(\sigma_{ij}, \phi_\alpha(x)) \tag{15}$$

$g(\sigma_{ij}, \phi_\alpha(x))$ herein represents a material-specific yield function which is to be scaled in such a way that $g(\sigma_{ij}, \phi_\alpha(x))=1$ applies when the mechanical stress $\sigma_{ij}$ reaches the yield point of the material, i.e. the component begins to deform plastically. If the value of $g(\sigma_{ij}, \phi_\alpha(x))$ is less than 1, the component is deformed purely elastically. The safety indicator factor $Ss_\alpha(\phi_\alpha(x))$ is therefore only greater than or equal to 0 in the "permissible" range if a parameter set $\phi_\alpha(x)$ is selected during optimization so that the resulting value of the material-specific yield function $g(\sigma_{ij}, \phi_\alpha(x))$ is below the reciprocal value of the safety factor S.

There are various possibilities for defining suitable material-specific yield functions, which are known to a person skilled in the art. Some variants are presented, for example, in J. Betten, Kontinuumsmechanik, 1993, Springer-Verlag.

In principle, a suitable material-specific yield function or its parameters can also be defined, particularly in the isotropic case, with the aid of experiments on suitable samples, e.g. via tensile tests or the like.

A suitable sub-functional $f^S$ with use of this "safety indicator factor" $Ss_\alpha(\phi_\alpha(x))$ according to equation (15) can be designed in such a way that, for an optimal parameter set $\phi_\alpha(x)$ at the location x, particularly preferably the value for the safety indicator factor $Ss_\alpha(\phi_\alpha(x))$ equal to 0 is sought. It is very particularly preferable to ensure that exceeding the safety factor is penalized more than undershooting it, i.e. that the safety factor S is certainly fulfilled, but the effort required for this is nevertheless minimized.

An execution of such a sub-function $f^S$ can look like this:

$$f^S = \left(-\exp\left(-\sum \Phi_\alpha Ss_\alpha(\phi_\alpha(x)) + \frac{10^{12}}{\left(\sum \Phi_\alpha Ss_\alpha(\phi_\alpha(x)) + A\right)^6}\right)\right) \tag{16a}$$

The sub-function described here was selected in the form of the Leonard-Jones (exp, 6) potential. This function should show a minimum if the safety indicator factor $Ss_\alpha(\phi_\alpha(x))$ is equal to or close to 0. For a value less than zero, the sub-function should quickly assume a large value.

If the optimization were carried out without shifting of the segment boundaries, a simplified form for the sub-function $f^S$ could be used, since at each location x only one parameter set $\phi_\alpha(x)$ can be present definitively at each location (there are then no diffuse interfaces), so that the summation over the parameter set proportions $\Phi_\alpha(x)$ can be omitted again:

$$f^S = -\exp(-Ss_\alpha(\phi_\alpha(x)) + \frac{10^{12}}{(Ss_\alpha(\phi_\alpha(x)) + A)^6} \tag{16b}$$

The value of the variable A in equation (16a) or (16b) can be used to shift the value for the safety indicator factor $Ss_\alpha(\phi_\alpha(x))$ on the abscissa at which the sub-function $f^S$ has its minimum value. The sub-function $f^S$ in equations (16a) and (16b) is structured in such a way that, for the value A=0, this minimum value of the sub-function $f^S$ within the scope of the computational accuracy is $Ss_\alpha(\phi_\alpha(x))=0.025$. A realization of the sub-function $f^S$ by means of equation (16a) or (16b) and A=0 is often the preferred variant, since in practice a value for the safety indicator factor $Ss_\alpha(\phi_\alpha(x))$ of 0 can almost never be achieved anyway, but it can be ensured that the value comes very close to the value 0 from the safe side, i.e. greater than 0. However, this can also be realized in a similar way with other potential functions instead of equation (16a) or (16b).

In the case of a requirement that, for example, also allows the safety factor to be undershot in a certain region, but requires the component volume to be as low as possible, it can still make sense to achieve a safety indicator factor of 0 as well as possible, even if it is slightly undershot. If, for example, with the sub-function $f^S$ according to equation (16a) or (16b), with a value A=0, a safety factor S of 2 were sought, this could not be achieved, but the value for the safety factor would be at least 2.1. Due to a value A<0, this circumstance can be taken into account, however, which on the other hand means that the safety factor in the optimization can also be slightly undershot.

In such cases, however, it would also be possible to correct the safety factor beforehand, e.g. in accordance with $$S_{Korr} = \frac{S}{1 + 0.025\,S} \tag{17}$$

wherein simply the changed safety factor $S_{Korr}$ instead of the safety factor S is used in equation (15).

Incidentally, in the context of a numerical realization of the optimization, a negative value may occur for the sub-function $f^S$ because the term $Ss_\alpha(<_\alpha(x))$+A in equation (16a) or (16b) becomes negative. In this case, for example, when realizing the optimization with equation (16a) or (16), the value of the sub-function $f^S$ can simply be set to 109 so that the optimization process is forced to select the values differently and thus "correct" the invalid state.

Figure 13:
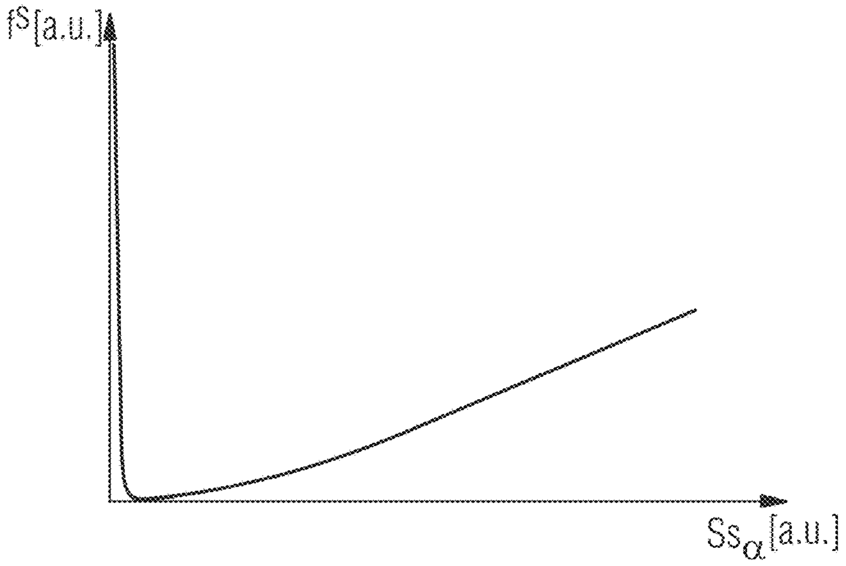
FIG. 13 shows a diagram for the progression of a sub-function $f^S$ in order to take a safety factor into account in a possible target function for an optimization process, e.g. according to FIG. 14.

An example of a suitable sub-function $f^S$, in this case the function according to equation (16b), is shown graphically in FIG. 13. Here, the value of the sub-function $f^S$ (in arbitrary units; a. u.=arbitrary units) is plotted against the safety indicator factor $Ss_\alpha$ (in arbitrary units). It can be clearly seen that the value of the sub-function, starting at the minimum of the sub-function $f^S$, increases slowly with increasing safety indicator factor $Ss_\alpha$ (to the right), i.e. in the case of overdimensioning. However, at the minimum of the sub-function $f^S$ with falling safety indicator factor $Ss_\alpha$ (to the left), the values of the sub-function $f^S$ increase sharply.

g) Sub-Functional to Maximize the Variation of the Scanning Direction Angle:

It is known a person skilled in the art that a greater variation of the scanning direction angles (the angles of the scanning directions in a layer relative to a freely selectable reference angle) has a positive effect on the quality of the structure. Excessive restriction of the scanning direction angles in the segment scanning direction distribution $\Psi(x)$ can therefore be disadvantageous. Therefore, optimal segment scanning direction distributions $\Psi(x)$ which contain many scanning direction angles (as in FIGS. 9 and 10, for example) are advantageous. In order to take this into account in the optimization process, a "segment scanning direction distribution entropy" can be formed (based on Shannon's information theory) as a further sub-function $f^E$:

$$f^E = \int \Psi(x)\log(\Psi(x))d\omega \tag{18}$$

This defines the segment scanning direction distribution entropy $f^E$ analogously to entropy in information theory. ω denotes here the scanning direction angle. The more scanning direction angles are used in the segment scanning direction distribution, the smaller the value of the sub-function $f^E$. In other words, this sub-function ensures that, of all the possible similarly optimal solutions, the one with the highest variation of scanning direction angles in the segment is selected.

In equation (18), the sub-function $f^E$ is described in general terms as a function of the segment scanning direction distributions $\Psi(x)$. For use in a numerical optimization process, this equation (18) would again have to be implemented in such a way that it depends on the free angular distribution parameters $\tilde{\Psi}_i(x)$ of the segment scanning direction distributions $\Psi(x)$ to be optimized. A person skilled in the art can easily realize this using standard numerical methods. The function can look different depending on the type of free angular distribution parameters to be optimized. $\tilde{\Psi}_i(x)$.

h) Sub-Functional to Avoid a Divergence of Segment Scanning Direction Distributions $\Psi(x)$ within a Segment:

As already explained above, a single segment should preferably always have exactly one segment scanning direction distribution $\Psi(x)$. In particular, it is preferable to follow exactly one layer scanning direction arrangement (or hatching direction arrangement or hatching strategy) in each layer in order to avoid a situation where the area of a layer can no longer be filled without gaps. In the case of optimization with moving segment boundaries, this can be realized using the following sub-function $f^{HD}$:

$$f^{HD} = \frac{4\mu\eta}{\pi^2} \cdot \left(\nabla \tilde{\Psi}_i(x)\right) \cdot H\left(\nabla \bar{\Phi}_\alpha(x)^2\right) \tag{19}$$

$H(\nabla\bar{\Phi}_\alpha(x)^2)$ describes the so-called "jump function". It is defined here in such a way that $H(\nabla\bar{\Phi}_\alpha(x)^2)$ either assumes the value 0 if the location x is located in an interface region, or it assumes the value 1 if the location x is not in an interface region, but clearly in a segment. Conversely, the gradient $\nabla\tilde{\Psi}_i(x)$ exactly at locations x which are clearly located in a segment and not in an interface region is 0. In an ideal, analytical solution, this sub-function $f^{HD}$ would therefore always be 0 and thus functionless. In a numerical optimization process, however, it is used to compensate for the unavoidable "discrepancies" caused by the discrete processing in the numerics, as it may be, in the context of numerical optimization, that a location x temporarily, for example during the execution of an optimization loop, on the one hand, is not yet clearly located in a segment with regard to the segment scanning direction distribution $\Psi(x)$, but, on the other hand, already is with regard to the optimal parameter set $\phi_\alpha(x)$, or vice versa. In this case, the sub-function $f^E$ takes effect and uses the gradient $\nabla\tilde{\Psi}_i(x)$ to ensure that the free angular distribution parameters to be optimized $\tilde{\Psi}_i(x)$ also apply at all locations x that belong to the respective segment in which the optimum parameter set $\phi_\alpha(x)$ currently applies. $\eta$ in equation (19) again denotes the value for the width of the diffuse interface region and the variable $\mu$ is a type of interfacial energy.

As mentioned, at least a minimum configuration of the target function is preferably required, which is particularly preferably composed of a sub-functional for minimizing the construction time or maximizing the construction speed and—if an optimization with moving segment boundaries is carried out—a sub-functional for minimizing segment boundaries (process parameter interfaces), i.e. for minimizing the segments in the component, as explained, for example, in conjunction with equations (4a) and (10). In addition, the target function may contain a number of other optional sub-functionals, such as the other sub-functionals mentioned above.

In the examples above, the simplest form of the sub-functionals is shown, which can be modified to include further constraints, provided that the constraint in question is not to be added to the optimization problem in the form of a separate sub-functional. Whether an optimization criterion is linked to another sub-functional, in particular one of the obligatory sub-functionals, or whether separate sub-functionals are defined depends on the complexity of the optimization problem.

An example of the coupling of an optimization criterion to an obligatory sub-functional is shown below using the coupling of the safety factor to the sub-functional for minimizing the construction time or maximizing the volume construction rate. This sub-functional for minimizing the construction time has already been presented above using equation (4a) for optimization with a shift in the segment boundaries and in equation (4b) without a shift in the segment boundaries. In both cases, the sub-functional can now be extended by a safety factor to obtain a sub-functional $f^{build\text{-}S}$ with construction rate-safety factor coupling:

$$f^{build-S} = -\sum_{\alpha=1}^{N} \bar{\Phi}_\alpha(x) B_\alpha(\phi_\alpha(x)) \mathrm{sign}(Ss_\alpha) \tag{4a'}$$

$$f^{build-S} = -\sum_{\alpha=1}^{N} \bar{\Phi}_\alpha(x) B_\alpha(\phi_\alpha(x)) \mathrm{sign}(Ss_\alpha) \tag{4b'}$$

$$f^{build-S} = -B_\alpha(\phi_\alpha(x)) \mathrm{sign}(Ss_\alpha)$$

$Ss_\alpha$ here again denotes the safety factor indicator, as can be defined above for example using equation (17). sign is the signum function, which only takes the sign into account and assigns a positive sign to the value 0. So, if a parameter set $(\phi_\alpha(x))$ would result in the safety factor being undershot (i.e. the safety factor indicator $Ss_\alpha$ would be negative), the volume construction rate would automatically no longer be subtracted from the target function, but added to it, because the sign in the sub-functional $f^{build\text{-}S}$ changes. This means that undershooting the safety factor is inevitably penalized.

If a sub-functional is used in which the safety factor is already integrated, it is not necessary to use, in addition, a separate sub-functional to maintain the safety factor.

A target function ZF defined in the manner described above can now be used (for example by the optimizer 65 according to FIG. 11) in an optimization process. An example of a possible optimization process is explained below with reference to FIG. 14. This is an iterative process. The target function can be used repeatedly in some of the method steps, wherein (only) certain sub-functions of the target function may also be used in various steps in order to initially process or optimize the optimization objectives underlying the sub-functions separately from one another. For example, the effect of certain sub-functions could be reduced or even deactivated in one step by setting certain parameters in this sub-function accordingly, or certain optimization parameters could initially be regarded as constant in certain steps.

Figure 14:
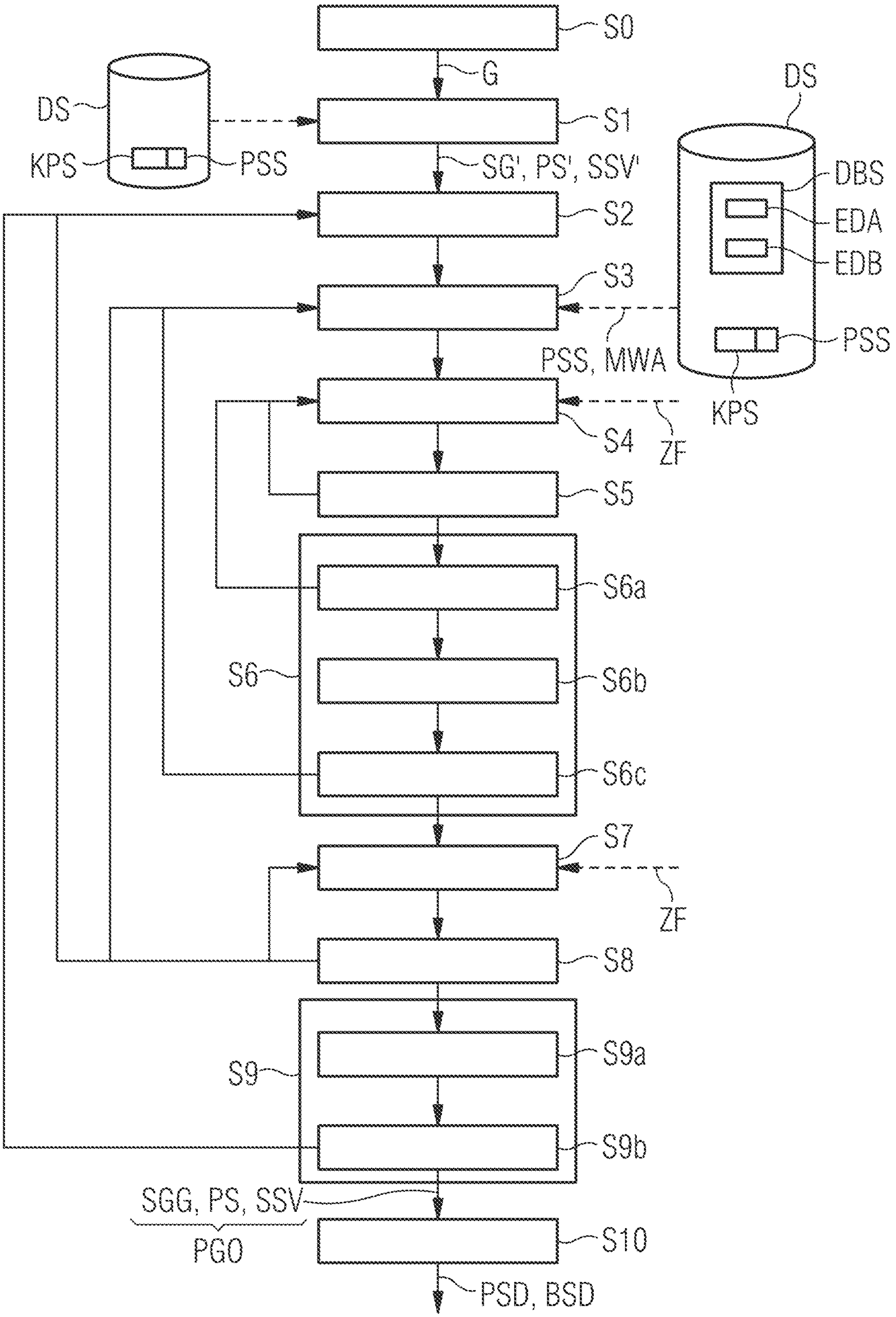
FIG. 14 shows a flow diagram of a possible process sequence of an optimization process of an exemplary embodiment of a method for generating optimized process variable values.

In the example in FIG. 14, a target function is used as an example, which contains the sub-functions according to equations (4a) for minimizing the construction time, (10) for minimizing the segment interfaces, (16a) for taking a safety factor into account, (11) for a possible depowdering of the component, (12a) for enabling a heat treatment, (18) for maximizing the variation of the scan angles, and equation (19) for avoiding a divergence of the segment scanning direction distributions. However, it is expressly pointed out once again at this juncture that the target function can also be structured in a different way, as explained above. The optimum target function depends on the range of requirements, the available computing power and the time available.

In step S0, an area G (the calculation area or design space) is first defined, which includes the component to be produced. If the outer dimensions of the component to be produced are not to change, i.e. the shape is to remain unchanged, the outer contour of the component itself could form the area, for example. However, it would also be possible to draw a box around the component in any way, i.e. the unsolidified regions around the component or on certain sides of the component are also included in the area. This area is then subsequently divided into several segments (in the further steps, see below), wherein some of the segments may belong to the component, but there may also be segments (e.g. powder segments) that lie outside the component, provided that the area is larger than the component, as mentioned above.

In step S1, start values are then set for the subsequent optimization, which runs iteratively here, namely specific start segments SG', as well as start parameter sets PS' and start segment scanning direction distributions SSV' associated with the start segments SG'.

Figure 15:
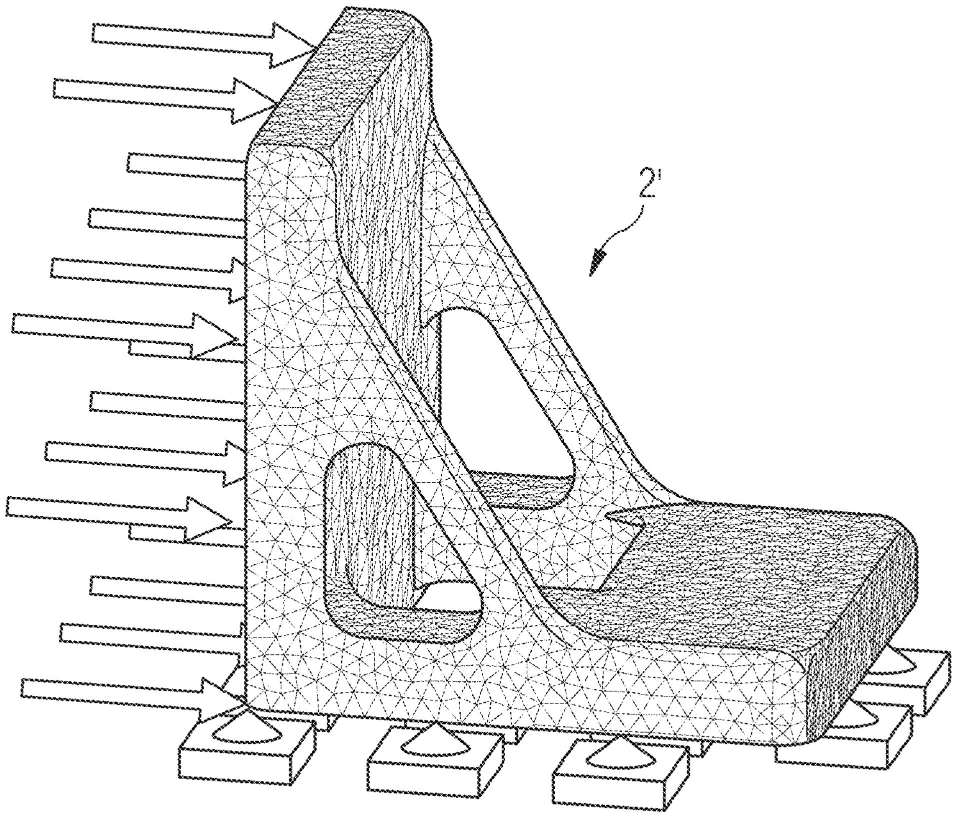
FIG. 15 shows a perspective view of an example of a component to be manufactured with a schematic representation of possible forces acting on the component.
Figure 16:
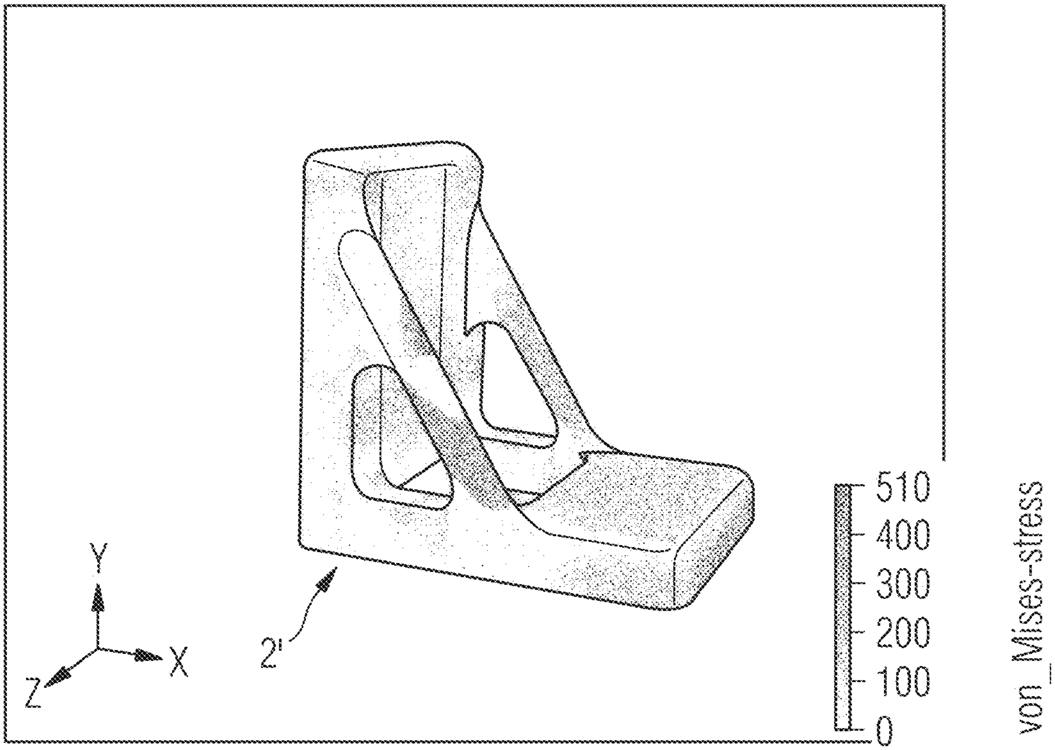
FIG. 16 shows the component according to FIG. 15 with a grey-scale representation of the loads acting on the component in the individual sections due to the external forces.
Figure 17:
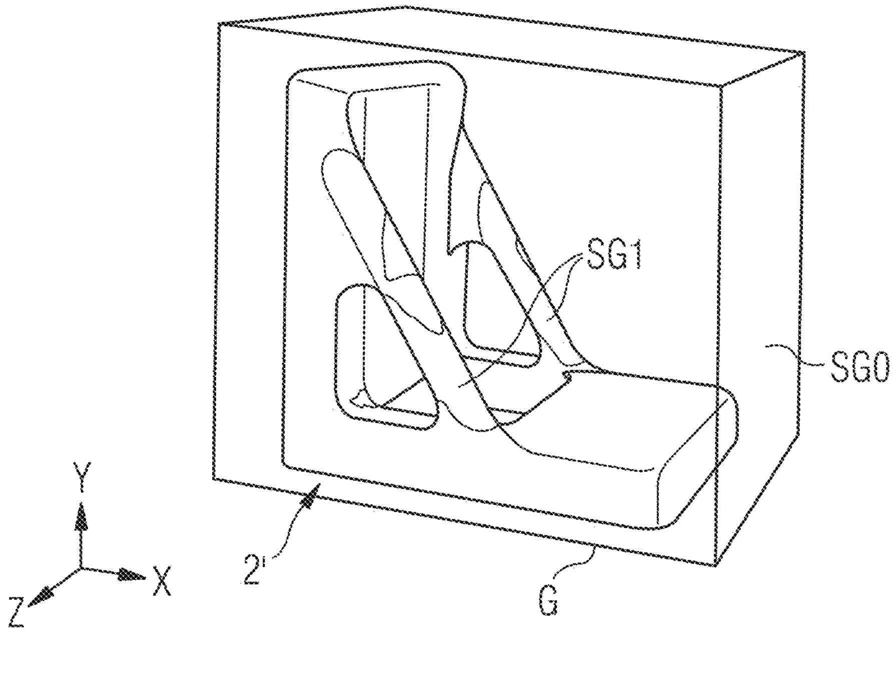
FIG. 17 shows the component according to FIGS. 15 and 16 with a representation of a possible (virtual) segmentation of the component and a possible definition of an area enclosing the component for the optimization process according to FIG. 14.

FIGS. 15, 16 and 17 illustrate how an area G can be defined for a specific component 2', in this case a buffer stop 2', and how segments SG0, SG1, e.g. as start segments, can be defined in area G.

In FIG. 15, the component is shown as a triangular mesh to visualize that the data is virtually available to carry out a finite element simulation for the buffer stop 2' for a load case in which external forces, which are shown as arrows in FIG. 6, act on the buffer stop 2'. Based on the simulation, a 3D load map can be created, which is visually represented in grey scale (or normally in colour) on the buffer stop 2' in FIG. 16. This representation shows, for example, that only a small part of the volume, namely less than 3% by volume of the entire buffer stop 2', is exposed to a load level above 200 MPa, with these higher-loaded areas being located primarily in the area of the cross struts of the buffer stop 2'.

Knowing the exact load information (which can also be requirement data, especially quality requirement data), such as information about the more heavily and less stressed regions, the component can then be advantageously divided virtually into individual segments.

In this case, the buffer stop 2' can be divided into individual segments based on the load information in such a way that the particularly loaded regions in the cross struts are regarded as separate segments SG1 and the remaining region of the buffer stop 2' can form a further segment. This is shown in FIG. 17. These segments can then, for example, initially be used as start segments SG' in the optimization process.

FIG. 17 also shows how the entire component 2' can be enclosed by a larger area G, for example, and the entire outer region around the component 2' forms a further segment SG0, wherein this is a "powder segment" or "empty segment" in which the powder is not solidified in the construction process. For such powder segments SG0, the start parameter set in the optimization process can simply be set so that the laser power here is 0. This start parameter set then no longer needs to be changed for the powder segment SG0.

For all other start segments SG', a suitable start parameter set PS' (for constructing the layers of the relevant start segment SG') and a start segment scanning direction distribution SSV' can then be selected in step S1, for example from a data memory DS, in which, among other things, various candidate parameter sets KPS can be stored, which are available for a construction with the production device 1 to be used. As a rule, a relatively limited number of candidate parameter sets KPS are involved here, although the number is of course limited only by the available memory space and by the computing time available for testing various candidate parameter sets KPS with regard to their effect on the property values of the manufactured component.

As a high level of efficiency of the component production is also an important criterion in many cases, it makes sense to select the start parameter set PS' and the start segment scanning direction distribution SSV' with which the highest construction rate can be achieved. In principle, however, another selection criterion can also be used.

It should be pointed out at this juncture that it would also be possible to choose the virtual division of the area G or the component 2' into the start segments SG' according to how the highest construction rate can be achieved and not to use a load simulation at this point, as shown in FIGS. 6 to 8. This applies in particular if the component is not to be subjected to high loads at all or if the load is more of a secondary consideration.

In the subsequent step S2, a requirement simulation is then first carried out for the (still virtual) component to be manufactured, assuming that the start configuration defined in step S1, i.e. the start segments SG', the start parameter sets PS' and start segment scanning direction distribution SSV', were used during manufacture. As will be explained in greater detail later, macro property values of the individual segments, such as the texture (in particular in the form of the orientation density function ODF) and/or other macro property values, such as an elasticity sensor, a yield point distribution, a solidification coefficient, a thermal conductivity, a breaking strength, etc., can be determined for a known configuration or combination of segments SG and associated parameter sets PS and segment scanning direction distributions SSV.

As part of such a requirement simulation, a load simulation can then be carried out, for example, using the macro property values (of the segments or the component formed therefrom), similarly to what was previously visualized for the buffer stop 2' with reference to FIG. 16, or a vibration simulation or the like. Such simulations are possible using standard numerical simulation methods such as finite element methods or finite volume methods. The result of this requirement simulation is then a state description with various state values of the current system or component with the individual segments, in particular what load these segments can withstand, the frequency of the entire system (component), specifically in each case for the current configuration in which the calculation is carried out in step S2.

As will be explained later, this step S2 is called up several times during the iterative process to check the current configuration. The first time it is called up, i.e. at the start of the optimization process, these state values or the state description for the start configuration from step S1 apply.

In the subsequent step S3, the state description or the state values etc. can then be compared with external specifications, in particular the requirement data for the component. These external specifications could also include, for example, load recordings that have been provided in advance as (quality) requirement data for the component, such as the load recordings from FIG. 16 for the example with the buffer stop 2'.

If, exceptionally, all the required variables are optimally fulfilled, it would be possible to construct the component with the start configuration, especially if this start configuration has already been selected so that the highest possible construction rate can be achieved. The start configuration would then be the optimal configuration and the optimized process variable values would already have been found. However, this case is very unlikely.

Normally, if not all requirements are met, the process variable values, namely the segments or their exact segment boundaries, as well as the parameter sets and the segment scanning direction distributions for the individual segments are further optimized in the subsequent process.

For this purpose, in step S3, new current parameter sets can be selected from the candidate parameter sets KPS for the current segments SG', if necessary. This selection can be made particularly preferably taking into account so-called "parameter set suitability values" PSS (referred to as PS scores, PSS for short).

Different requirement-specific PS scores can be assigned to each candidate parameter set KPS with regard to certain requirements, for example with regard to strength, rigidity, construction rate, etc., and can be partially stored in the data memory DS or can be recalculated for the current configuration. This depends on the specific requirement to which the requirement-specific PS score relates. For requirements that only depend on the selected parameter set, such as the construction rate, these requirement-specific PS scores can be stored together with the parameter set. For requirements that also depend on external field variables, in particular mechanical forces, on the other hand, the PS scores are preferably recalculated each time the loop runs through step S3. An easy-to-understand example of this would be the mechanical stress in a component under a given load. These stresses depend, for example, on the geometry of the component and therefore also on the current configuration of the segments. If the boundaries of the segments are changed during the optimization process, the stresses in the component will inevitably also change. Consequently, it is better to adapt the PS scores with regard to such stresses to the current configuration in each case.

By combining these requirement-specific PS scores, an overall PS score can then be determined for the respective candidate parameter set KPS.

In particular, for example, if the individual requirement-specific PS score values are between 0 and 1, i.e. indicate a kind of probability of how well the specific requirement is fulfilled with the respective candidate parameter set, these requirement-specific PS scores could simply be multiplied together to determine an overall PS score. For example, if a first candidate parameter set had a PS score of 0.8 for a first requirement and a PS score of 0.2 for a second requirement, whereas another candidate parameter set had a PS score of 0.6 for both the first and second requirement, the second candidate parameter set would preferably be selected because it has an overall PS score of 0.36, whereas the first candidate parameter set only has a PS score of 0.16.

However, this presupposes that the two requirements should be weighted equally. In principle, it could also be the case that particular weight should be given to a specific requirement. This could be taken into account by a weighting factor when determining the overall PS score.

At the end of step S3, the same segments SG' may still be present, but some of the segments SG' should preferably be assigned better current parameter sets that better fulfil the requirements.

Following step S3, the target function ZF can then be used in step S4 to optimize the boundaries of the segments, i.e. an attempt is made to achieve an even better result by shifting individual segment boundaries in certain regions. This explicitly includes not only shifting segment boundaries of segments within the component, but also possibly segment boundaries between segments at the edge of the component and outer powder segments in the area. This means that the outer contours of the component may also change under certain circumstances, for example that certain struts are thickened or thinned, depending on what is required for the specific case. In this way, the component geometry can be optimized at the same time.

Since step S4 involves optimization and thus shifting of the segment boundaries, at least the first partial differential equation (8) explained above must be solved to determine the minimum of the target function F within the scope of the phase field method, in which equation the change in the parameter set proportions $\bar{\Phi}_\alpha(x)$ at one location x (in an interface region) is taken into account in dependence on the change in the virtual "relaxation time" $\tau$.

Preferably, the segment scanning direction distribution can also be optimized at the same time in step S4 using the target function ZF. This is achieved by also simultaneously solving the above-explained second partial differential equation (9), in which the change in the free angular distribution parameters $\bar{\Psi}_i(x)$ at a location x is taken into account in dependence on the change in the virtual relaxation time $\tau$, in step S4 to determine the minimum of the target function F. Optionally, however, the optimization of the segment scanning direction distribution could also be shifted to subsequent steps, for example to steps S7 and S8, which will be explained later.

At the end of step S4, improved segments and optionally already improved segment scanning direction distributions could then be available to match the parameter sets selected in step S3 in terms of their geometry or segment boundaries.

In step S5, the approach from step S2 is repeated, i.e. a new state description (also referred to synonymously as a system description) is determined with the current process variable values, i.e. the current segments, the current parameter sets and the current segment scanning direction distributions, and it is checked whether all requirements, in particular the quality requirements, are sufficiently fulfilled.

If the requirements are not sufficiently fulfilled, the system returns to step S4. This loop between steps S4 and S5 is run through until a cancellation criterion is reached, i.e. until, for example, the changes between two iteration steps with regard to the specified quality criteria become very small. It can then be assumed that almost the best combination for the present load case is available.

In the following step S6, which comprises three sub-steps S6*a*, S6*b* and S6*c*, it is checked whether all regions in which powder is present also have a path out of the component. This is to ensure that no powder remains in the component after unpacking, for example in cavities that are not connected to the outer space, at least in cases where a cavity filled with powder is not deliberately desired in the component.

For this purpose, in step S6*a*, the powder can be assumed to be a viscous fluid that flows out of the cavities. This outflow can be described using the Navier-Stokes equations, which can usually be solved using numerical methods (an example of this is given in M. O. Bristeau, R. Glowinski, J. Periaux: Numerical methods for the navier-stokes equations, Applications to the simulation of compressible and incompressible viscous flows, VOL 6, NO 1-6, 73-187). In order to imitate a flow in the numerical simulation, the pressure at the surface of the area defined at the beginning of the process can be assumed to be 0 for the fluid-mechanics problem. By contrast, a pressure greater than 0 is defined in all regions containing powder. In addition, the flow velocity can be set to 0 in all solidified regions. The target function could then contain, for example, the sub-function according to equation (11), which penalizes a remaining pressure that is greater than 0, wherein the variable $p_R(x)$ for the pressure can be calculated using the Navier-Stokes equations.

By returning to step S4, in which the target function ZF is also used to modify the segment boundaries, the segment boundaries can then be changed so that the regions with powder inclusions can be minimized or completely removed. This can be done in a loop, which attempts for a certain number of iterations to either move the inclusions by changing the geometry of the segments so that they are finally located on the component surface, or the inclusions are filled with molten material, i.e. the powder-filled cavities are removed. Here, for example, the cancellation criterion can again be that no more relevant changes are made in the loop or that a maximum number of iteration steps have been completed.

Subsequently, in the optional step S6*b*, a so-called Minkowski subtraction can be carried out in those regions where powder inclusions may still be present in order to remove these regions from the computational grid by erosion, similarly to image processing methods. Minkowski subtraction is a standard method of applied image processing, and therefore it does not need to be explained further here. Only the voxels defined above need to be treated like the voxels in a Minkowski subtraction for processing 3D image data.

In a final step S6*c*, the system then checks whether there are still any powder inclusions. If this is the case, these regions are removed by returning to step S3. There, a new parameter set is selected for the region in question, which leads to the region being solidified, and the complete optimization is then carried out again with the new parameter set, starting from step S3.

It should be noted that the depowdering step S6*a* is deliberately carried out separately after the optimization of the other points within the target function in step S4. This is possible by setting the pressure to 0 everywhere during the first run and thus optimizing all other criteria first in the previous run of steps S4 and S5 and not already performing depowdering. With regard to the depowdering criterion, the target function ZF or the corresponding sub-function (11) is therefore initially inactive due to a skillful choice of parameters (as the entire sub-function $f^{clean}$ in the target function F is equal to 0 if the pressure $p_R(x)$ is set to 0 everywhere in the area). This approach can save computing time if, at the beginning of the optimization in a start configuration, a solution is initially available of which the form is even further away from the optimal form and therefore a large number of passes through the iteration loop between steps S4 and S5 are to be expected.

Steps S7 and S8 are purely optional and are only used if the segment scanning direction distribution has not already been taken into account in step S4, which is usually the case. In principle, as already mentioned, it would be possible to perform the previous optimization without optimizing the segment scanning direction distribution and to only perform this separately in steps S7 and S8. In step S7, the target function ZF is used again, but now only the second partial differential equation (9) is solved, which was not taken into account in step S4, for example. In this approach, step S8 corresponds to step S5 or S2, i.e. a state description and check is carried out here to determine the extent to which the system or component would fulfil the requirement with the current segments and the parameter sets currently assigned to the segments, and, if the requirements are not sufficiently fulfilled, a return to step S7 takes place. This loop between steps S7 and S8 is run through again until a cancellation criterion is reached, i.e. until, for example, the changes between two iteration steps become very small with regard to the specified quality criteria.

Lastly, step S9, which is also optional, deals with any planned heat treatment of the subsequently manufactured component. It comprises two sub-steps S9*a* and S9*b* here. In step S9*a*, a virtual heat treatment is carried out for the (still) virtual component to be manufactured and the characteristic temperature profiles from this simulated heat treatment are stored for each point. In the subsequent step S9*b* it is then checked whether the simulated temperature profiles are within the permissible boundaries of the necessary heat treatment, for example whether it has become too hot or not hot enough at some points in the component. If the limit values are exceeded, a return to step S2 can take place so that the entire optimization is ultimately carried out again with a new start configuration, wherein the start configuration is then selected in such a way that the heat treatment problem is likely to be eliminated. If, on the other hand, the requirements in the context of the heat treatment are met, the end of the optimization process is finally reached and the desired optimized process variable values PGO are available, namely in the form of optimum segment boundaries SGG, optimum parameter sets PS and optimized segment scanning direction distributions SSV.

The optimization of the segment boundaries SGG can also include an optimized orientation of the object in relation to the main build direction, i.e. the z-direction, in which the layers are stacked on top of each other. The segment boundaries can also be modified with the aim of achieving a reorientation or optimization of the orientation of the component relative to the main build direction. A suitable orientation in the build space can, for example, reduce or minimize overhangs and/or support. As already explained above in conjunction with equation (10), this is easily possible, for example, by including an angle-dependent interface energy in the sub-function for minimizing the segment boundaries. In particular, by changing the segment boundaries, the accessibility of all surface regions of the subsequently manufactured component for post-treatment or the like can also be optimized under certain circumstances.

Lastly, it should be noted that optimization is preferably carried out simultaneously for all segments of the component as part of the optimization process, i.e. not only are the start segment boundaries determined for all start segments SG' at the beginning in step S1, for example, but the other start parameter sets PS' and start segment scanning direction distributions SSV' are also set and always optimized together in the respective steps. This means that they can all be considered simultaneously in the target function ZF.

In the optimization process according to FIG. 14, the current configuration is evaluated in several steps as explained above, for example in steps S2, S5 and S8. This involves checking whether a constriction process in which the segments currently present in the optimization process (i.e. the current segment boundaries) and the current parameter sets and current segment scanning direction distributions SSV associated with the segments are used would result in a component that meets certain requirements. This means that a state description of the virtual component can be determined by means of a state simulation and the state description can be compared with predefined (quality) requirements in a further step, if necessary.

Macro property values of the individual segments can be used for state determination or for determination of the state description. Such macro property values can be, in particular, the texture in the segment, which can be described by the orientation density function ODF as mentioned above, but also other macro property values derived from this, such as the elasticity sensor, the yield point distribution, solidification coefficients, thermal conductivity, breaking strength, etc.

Figure 18:
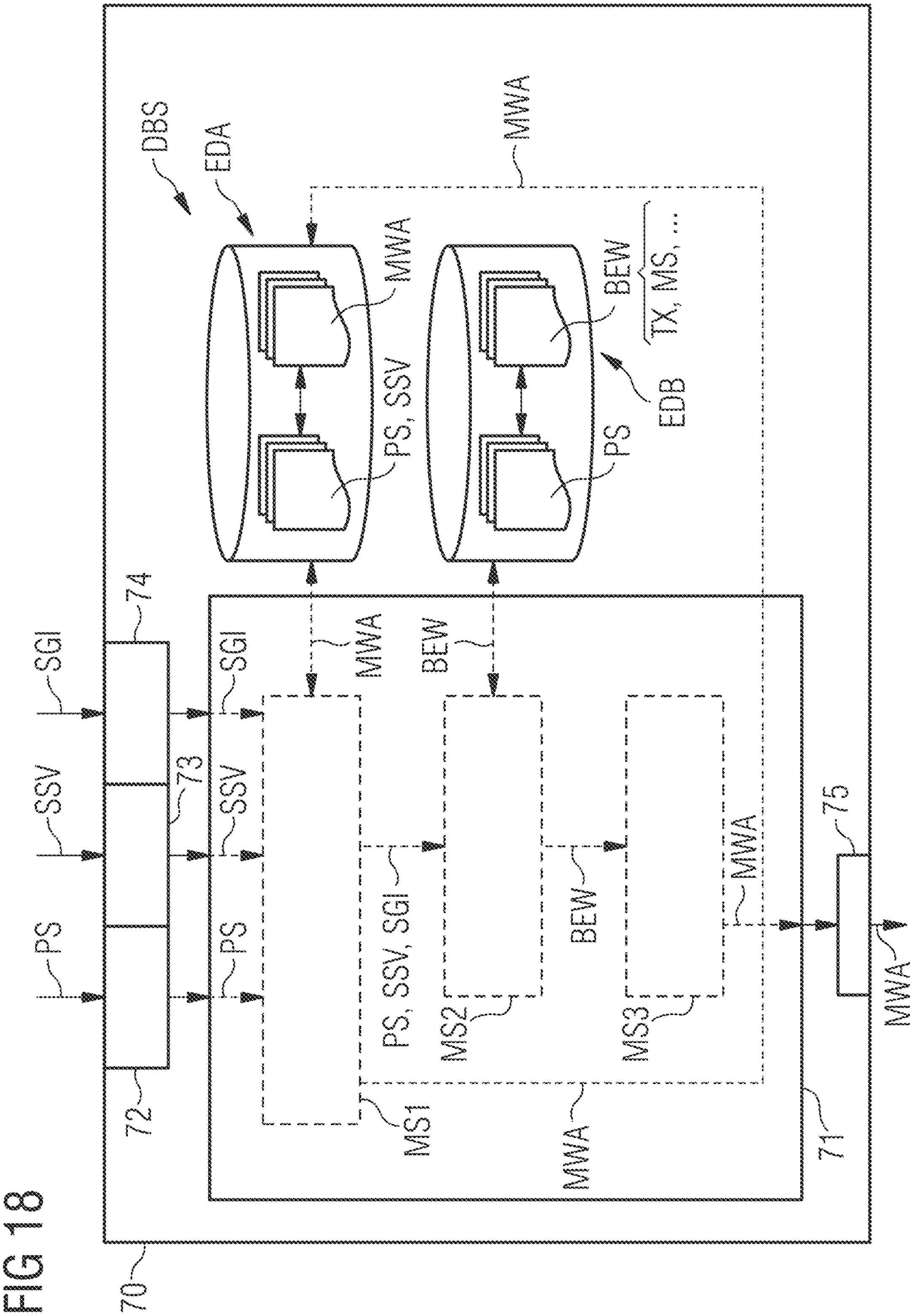
FIG. 18 shows a block diagram of an exemplary embodiment of a device for determining property values of a segment.

FIG. 18 is now used to explain how, with a known parameter set PS for the structure of the layers of a segment and a known segment scanning direction distribution SSV of the segment, a macro property value MWA of the relevant segment can be determined in a suitable device 70 or unit for determining macro properties.

It is explicitly pointed out that this device 70 can advantageously also be realized in the form of software on a suitable computer unit. In particular, it can therefore be integrated into the optimization process, for example as a software object or sub-routine. Similarly, all other components of the device 70 now described, such as the interfaces and the database system, can be realized in software. Furthermore, however, it is also possible, for example, to realize interfaces partly from hardware and partly from software and, for example, to realize the entire device 70 distributed on different computer units which are linked to each other in a suitable manner. This applies in particular to the database system DBS used by the device 70, which here comprises, for example, a macro property database EDA and a basic property database EDB, which can also be very easily outsourced to other computer and storage units. The functions and data content of the macro property database EDA and the basic property database EDB and options for setting up such databases EDA, EDB are explained below.

For example, the current parameter set PS can be transferred via a parameter set interface unit 72, and a current segment scanning direction distribution SSV for the segment construction process can be transferred via a scanning direction interface unit 73. Furthermore, the device 70 can have an interface 74 via which segment information SGI can be transferred, i.e. information about the segment, such as the number of layers, the current segment boundaries, etc., can be adopted.

All this information can then be used in a macro property determination unit 71 to determine the macro property value MWA or, better still, a whole group of macro property values for the segment in question, to which the current parameter set PS and the current segment scanning direction distribution SSV as well as the segment information are to be assigned. The mode of operation of this macro property determination unit 71 is shown in FIG. 18 within the macro property determination unit 71 in a very simplified manner in the form of a flowchart.

In a first step MS1, the macro property database EDA is first queried to determine whether a ready-made macro property value MWA is already stored for a specific combination of parameter set PS and segment scanning direction distribution SSV. If this is the case, then this macro property value MWA is simply adopted and this macro property value MWA can be returned by the macro property determination unit 71 via an interface 75 of the device 70, for example to a higher-level software component, which then continues to work with this macro property value MWA.

Preferably, macro property values MWA are stored in the macro property database EDA for those combinations of parameter sets PS and segment scanning direction distributions SSV that occur particularly frequently, i.e. that are standard combinations that are used repeatedly. Of course, this macro property database EDA can be expanded gradually.

If the query in the macro property database EDA was not successful, a new macro property value MWA must be determined for the current individual case based on the current parameter set PS and the current segment scanning direction distribution SSV. For this purpose, in a further step MS2, a current basic property value BEW for the individual layers is first queried in a basic property database EDB for the current parameter set PS. Such a basic property value BEW can be, for example, the texture and/or a microstructure MS of the layer, but also values derived therefrom that apply to the respective layer. Preferably, however, work continues with the texture TX, which is described by an ODF, and the microstructure MS is also used.

In a third step MS3, the basic property values BEW for the individual layers are then mathematically homogenized, i.e. the basic property values BEW of the individual layers of the segment are combined in a suitable manner in order to approximate the macro property value MWA of the complete segment. The information on the number of layers, the layer scanning direction arrangements in the layers and the rotations of the layers relative to each other, which lead to the current segment scanning direction distribution, is used here.

As part of this homogenization process in step MS3, for example, a mean value of the basic property values of the individual layers can easily be formed, wherein this mean value then forms the desired macro property value MWA. Alternatively, the reciprocal value of the mean values of the basic property values BEW of the individual layers can be determined first and then the reciprocal value of this mean value of the reciprocal values is formed. This reciprocal value of the mean value then forms the macro property value. Which of the two methods is used can depend on what the microstructure MS of the individual layers looks like and what the current load requirements are.

It should be noted at this juncture that, as already mentioned above, the basic property values BEW of the individual layers do not differ significantly, provided they were produced with the same parameter set PS (i.e. also the same hatching strategy), except for the fact that the orientation of the basic property values also changes with the change in orientation relative to the (in principle arbitrarily definable) reference orientation RO between the layers. This naturally leads to a change of orientation in the texture TX. Ultimately, this also has an influence on all property values in the form of direction-dependent material parameters, for example the elasticity tensor or the yield point distribution, for example in the form of the Hill tensor, which can be very different in different directions. However, it is sufficient to know the basic property values for one orientation, preferably the reference orientation. The basic property values for the other orientations can be calculated from this using simple operators, e.g. a simple rotation.

The macro property value MWA determined in step MS3 can then also be output again via the interface 75, e.g. to a higher-level unit, which then continues to work with it.

In addition, this macro property value MWA could also be stored in the macro property database EDA together with the parameter set PS on which the calculation was based and the associated segment scanning direction distribution SSV. If the macro property database EDA has sufficient space, any new macro property value MWA could in principle also be stored in the macro property database EDA. Preferably, however, this is not necessarily done for very rare parameter sets PS or segment scanning direction distributions SSV, for example. In principle, the system can also be designed to learn, i.e. that, for example, a list is used to note which parameter combinations PS, SSV occur particularly frequently, and the macro property database EDA is then gradually expanded for these parameter combinations, or vice versa, each macro property value MWA is initially stored in the macro property database EDA and then deleted again if it is no longer queried for a certain period of time, in order to create memory space for other combinations.

The creation of a basic property database EDB is explained in greater detail in the following figures.

Figure 19:
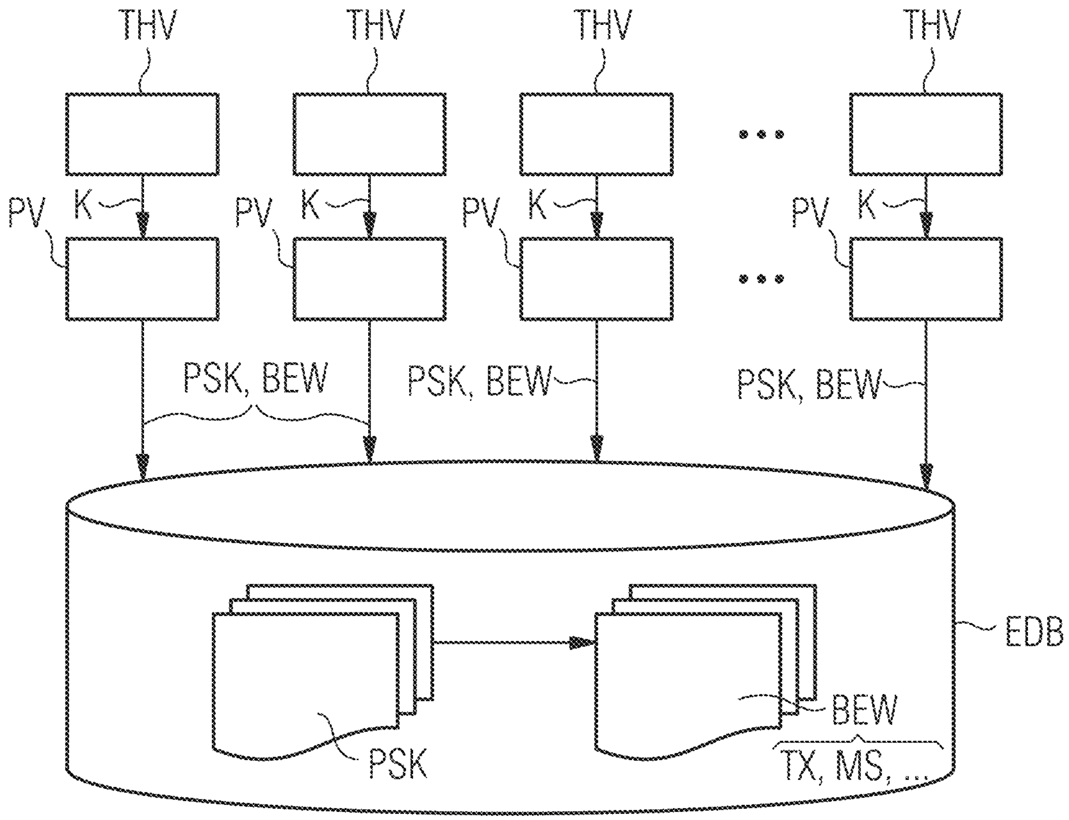
FIG. 19 shows a block diagram illustrating an exemplary embodiment of the structure of a basic property database of a property database system.

As shown in the block diagram in FIG. 19, the basic property database EDB is created by gradually producing various test specimens K, each with several layers LK (see e.g. FIG. 21), in various test manufacturing processes THV (the upper steps in each case). These can be tensile specimens, preferably round or square tensile bars. Each of these test specimens is produced with a different set of parameters PSK. Since several objects can usually be produced in parallel in the usual production devices, several test specimens K can of course also be produced in parallel here. It is also possible to use different parameter sets for the individual test specimens K, for example by orienting the test specimens K differently to the construction direction or using different hatching strategies or different scanning speeds, laser beam powers, etc. in the test specimens K. However, it makes sense to always use the same type of material for the construction, provided that the test specimens K are created in a parallel work step.

Each of the manufactured test specimens K is then subjected to a test procedure PV, which is explained in greater detail below with reference to FIGS. 21 to 23. In the test procedure, at least one basic property value BEW, but preferably a group or a tuple of basic property values BEW, is determined for one or more layers LK of the test specimen K.

The results of these test procedures PV are then combinations of the parameter set PSK used to construct the respective test specimen K and the basic property value BEW determined for this test specimen K in the test procedure PV. The parameter set PSK also contains the material type as a process parameter. The basic property value BEW can, for example, again be a tuple of individual basic property values BEW, which includes, among other things, the texture TX and the microstructure MS of the layer.

These are stored related to each other in the basic property database EDB, as shown in FIG. 19.

Figure 20:
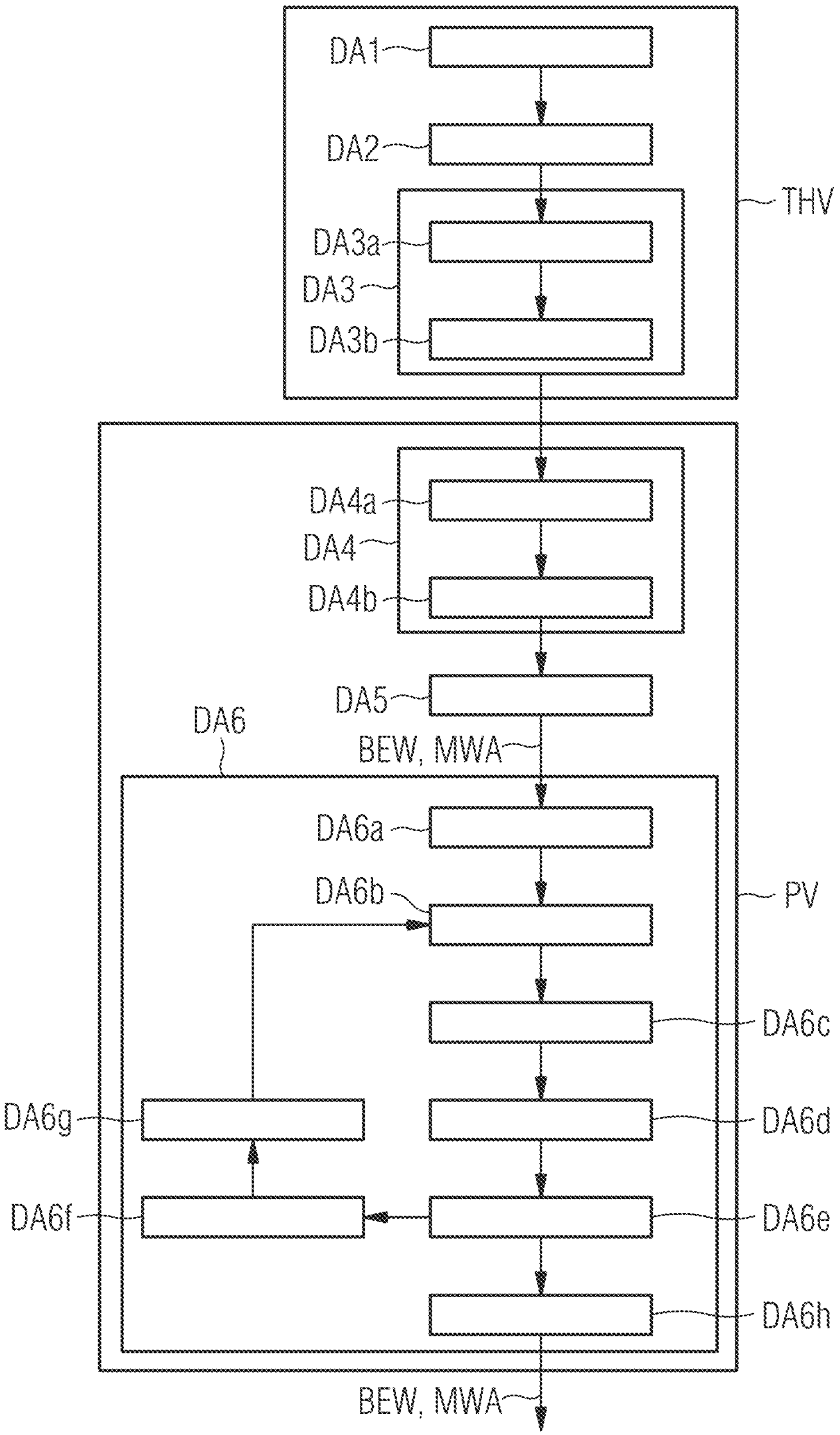
FIG. 20 shows a flow diagram of an exemplary embodiment of a process sequence for the creation of a basic property database.

A preferred exemplary embodiment for determining basic properties BEW of a layer of a segment or a simultaneous determination of basic properties BEW of several layers is shown in FIG. 20. For the sake of simplicity, it is assumed here that the basic property is to be a texture TX, which is described in the form of an ODF, for example. In principle, however, this method would also be possible for other basic properties BEW, although other basic properties can generally also be derived from the texture TX or ODF.

As already shown in FIG. 19, the process begins here with a test manufacturing process THV, which in turn comprises several steps DA1, DA2 and DA3. In a first step DA1, the test specimen K is first precisely defined and the process parameter set to be used for the construction of the test specimen K and the segment scanning direction distribution are determined. Based on this data, the actual test specimen is then created in step DA2. The generated test specimen K is then prepared for further measurements in a further step DA3.

This preparation step DA3 can be designed differently, depending on which test procedure is used in principle and how the subsequent test procedure PV is designed in detail. For example, a first preparation step DA3 could comprise a separation of the sample body along a predetermined measuring plane ME (see FIGS. 21 to 23), wherein the separation surface is then prepared for the subsequent measuring method in a further step DA3*b*. If, for example, an EBSD method (electron backscatter diffraction) is used as the measurement method, the test specimen should be cut and then the cut surface should be ground and polished in the next step. If an X-ray diffraction method is used, only grinding is required after cutting, but polishing is also preferred. If neutron radiation is used for the measurement, for example, no preparation at all is possible if the test specimen is sufficiently small. Such a neutron beam can be used to record a layer profile SP along any measurement plane ME, ME' inside the test specimen K. In this case, it is sufficient to ensure during production that the test specimen K is not too thick in an extent perpendicular to the measuring plane ME, ME' so that the neutron radiation can pass through the test specimen K.

Figure 21:
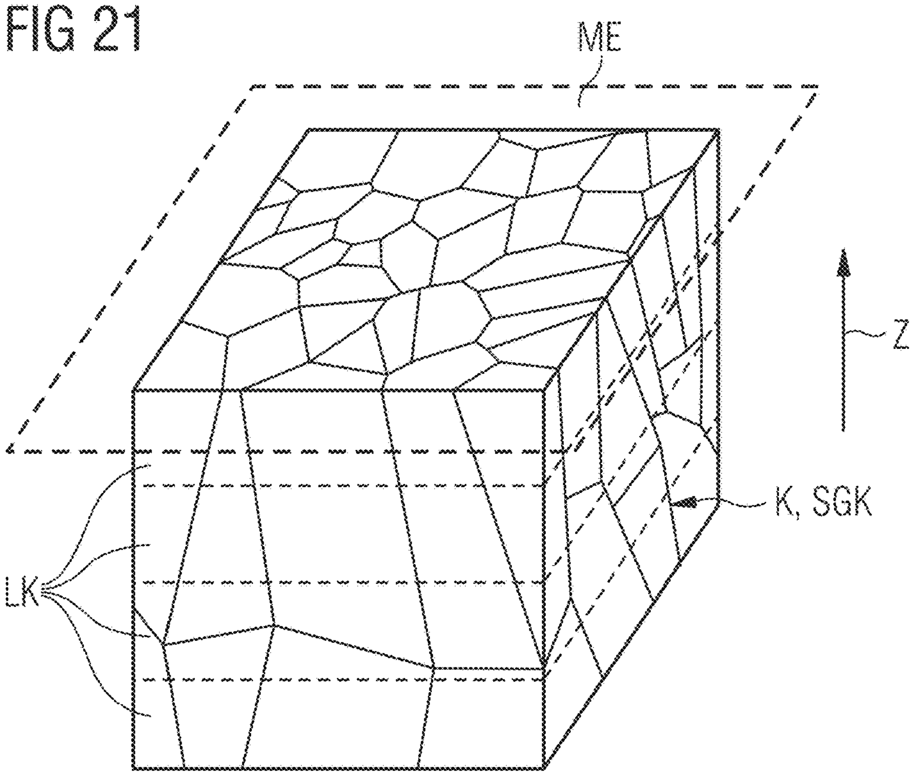
FIG. 21 shows a schematic representation for measuring the texture of a layer on a test specimen according to a first exemplary embodiment.

When preparing the test specimen, a basic distinction can also be made as to whether the test specimen K is cut within a layer plane, as shown schematically in FIG. 21. In this case, the measuring plane ME, in which the basic property values BEW (e.g. here the texture TX and the microstructure MS) are to be determined by the measurement, lies exactly in the cut layer LK. When cutting, make sure that the cut is made perpendicular to the main build direction z.

Figure 22:
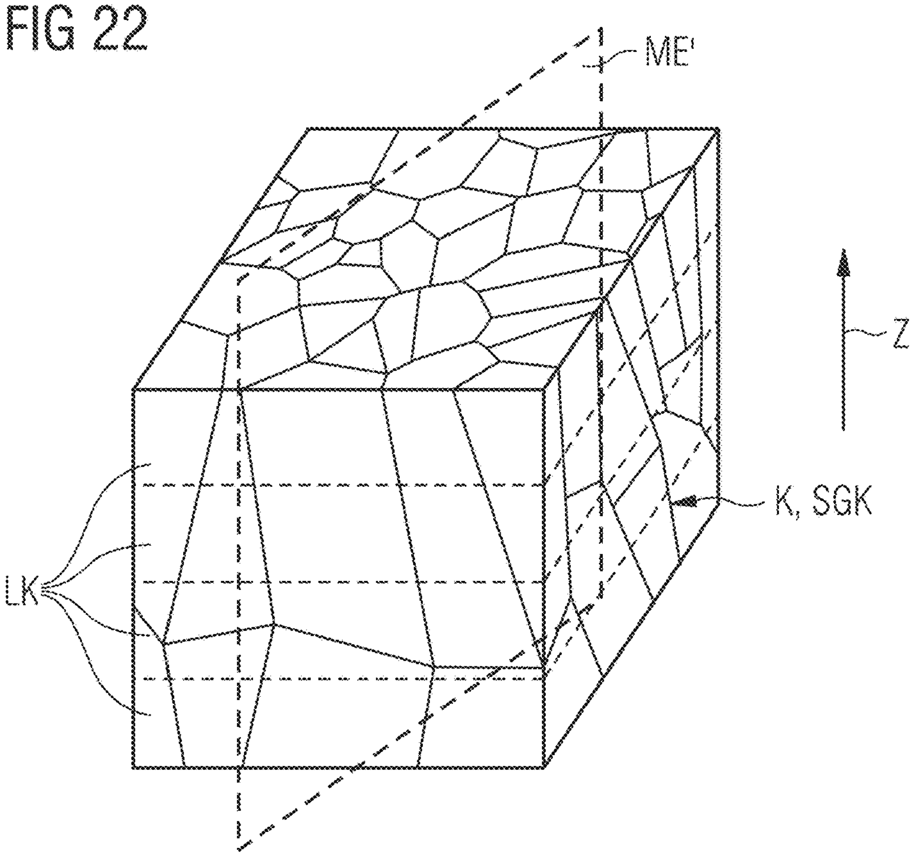
FIGS. 22 and 23 show schematic representations for measuring the textures of several layers on a test specimen according to a further method variant.

FIG. 22, on the other hand, shows that it is also possible to arrange the measuring plane ME' in such a way that it runs transversely, preferably vertically, through several layers LK (i.e. parallel to the main build direction z), so that a layer profile SP can be recorded. As described above, this can be done using a measurement with neutron radiation, for example, in which case the test specimen K does not have to be cut open in order to determine the layer profile SP in the measuring plane ME'. Alternatively, a cut is actually made along the desired measuring plane ME', as shown in FIG. 23, and in the resulting cut surface the texture, as shown as layer profile SP next to the schematic representation of the cut-open test specimen K in FIG. 23, and also the microstructure of the layer profile SP can be measured, for example by means of an EBSD image.

After the preparation of the test specimen K, the actual test procedure PV is performed in step DA4.

In a first sub-step DA4*a*, a measurement can be taken in the measuring plane. Various measurement methods that can be used here, such as the aforementioned EBSD method, the X-ray diffraction method or a measurement with neutron radiation, are generally known to a person skilled in the art and therefore do not need to be explained further here. A more detailed explanation can also be found in chapter 14.2 of the textbook L. Spieß, G. Teichert, R. Schwarzer, H. Behnken, C. Genzel, Moderne Röntgenbeugung. Röntgendiffraktometrie für Materialwissenschaftler, Physiker und Chemiker, 2019, Springer Spektrum.

Using an EBSD method with a scanning electron microscope, for example, a value tuple is measured in the layer per pixel and indicates the crystal orientation in three angles, for example in the Euler angles. In sub-step DA4*b*, the information obtained pixel by pixel can be entered into a map (e.g. an EBSD map)

The ODF can then be determined from this, which in turn defines the TX texture. Ultimately, this ODF is a kind of histogram in three-dimensional space (in Euler space), wherein the height of the histogram indicates how often the combination of values occurs. Reference can also be made to the previously mentioned textbook by L. Spieß, G. Teichert, R. Schwarzer, H. Behnken, C. Genzel.

Such a creation of a map with the measured values, e.g. the creation of an ODF in the measuring plane ME as described above, can take place in step DA5.

If exactly one layer LK is measured by placing the measuring plane ME parallel to the layer LK of the test specimen K, as shown in FIG. 21, the basic property value(s) BEW for this layer LK, for example the texture TX of the layer LK in the form of an ODF as described above, is/are determined directly in the test procedure DA4. The test procedure PV is then completed for this test specimen K after step DA5, and the determined basic property value(s) BEW can be stored in the basic property database EDB with the associated information about the parameter set PS used to create the test specimen K.

Figure 23:
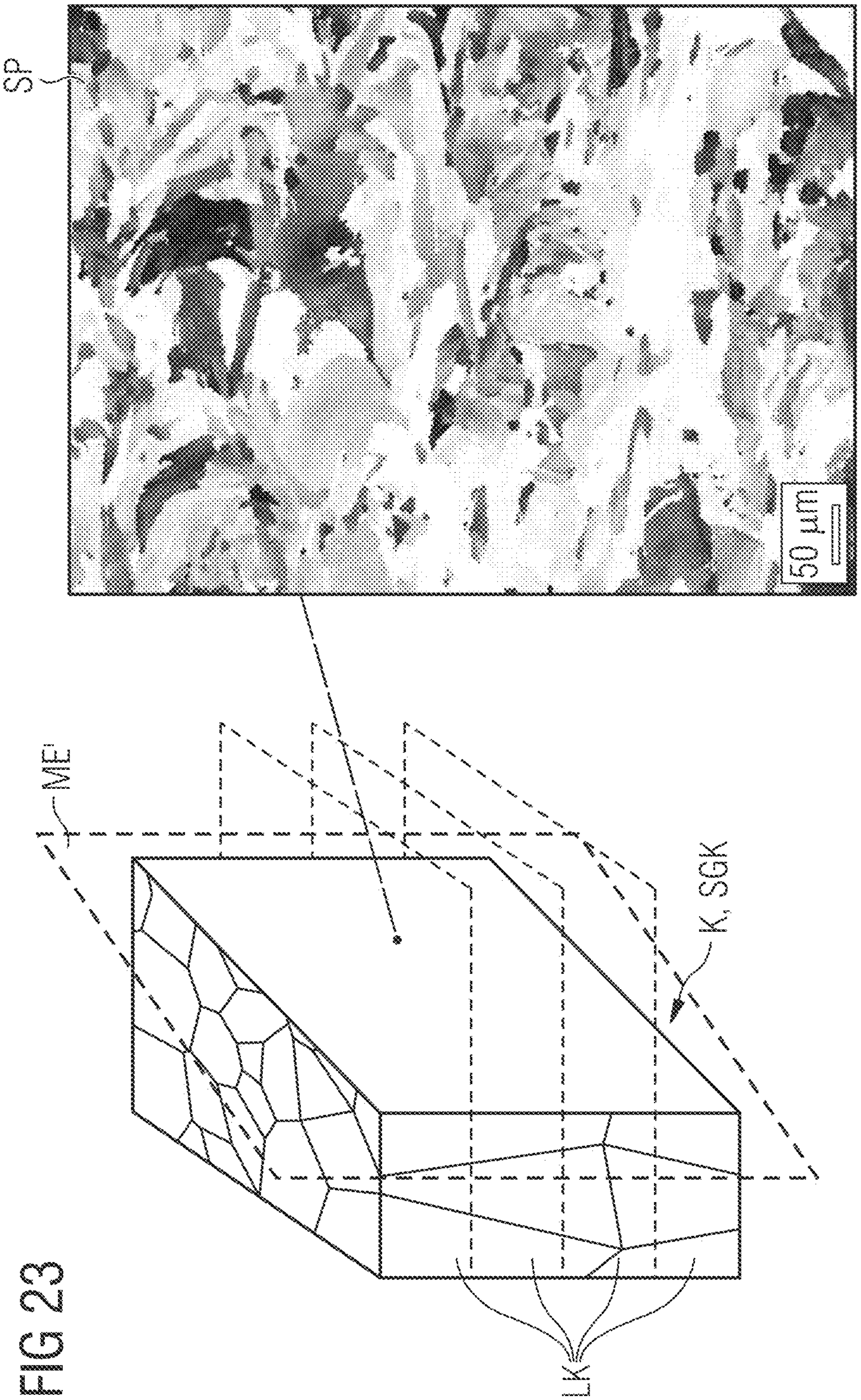

If, on the other hand, a layer profile is recorded in step DA4 as in FIG. 22 or 23, a macro property value MWA of a segment SGK already consisting of several layers LK is present, wherein this segment SGK corresponds here to the test specimen K through which the measuring plane ME' runs.

For example, a complete macro texture or macro ODF of the test specimen K (or the segment SGK of the test specimen K) can be recorded with such a layer profile. This macro property value MWA can then, for example, also be transferred directly to the macro property database EDA, as both the parameter set and the layer scanning direction arrangements used during construction, i.e. the individual hatching strategies, but also the segment scanning direction distributions are known, i.e. what layer is rotated by what angle in relation to the next following layer. If only the macro property value MWA is desired, it would be possible to end the test procedure PV after step DA5. However, a step DA6 can follow in order to also determine the basic property values BEW of the individual layers from the measured macro property value MWA.

Since this segment SGK also has a specific and known segment scanning direction distribution, the macro property value determined in this way can then also be used as a good approximation for other segments for which the same parameter set PS and the same segment scanning direction distribution applies, regardless of the number of layers. This is an advantage of using a segment scanning direction distribution as an (optimizable) parameter for characterizing a segment.

Step DA6 is explained below by way of example—without limiting the generality—using the example of a macro ODF, from which individual base ODFs for the individual layers LK are to be determined.

In a step DA6*a*, a model basic property, i.e. a model base ODF in this example, is first determined for a single one of the layers. It is assumed that all layers have the same model basic property or model base ODF except for the orientation about the z-axis. In the subsequent steps, an attempt is then made to approximate the macro property actually measured in step DA5, in this case the macro ODF, as well as possible with the aid of this model basic property using knowledge of the segment scanning direction distribution and the individual layer scanning direction arrangements or hatching strategies in an iterative fit procedure.

Therefore, in step DA6*b*, the model base ODFs for the individual layers LK are rotated according to the segment scanning direction distribution in the measurement volume.

In step DA6*c*, a model macro ODF is then calculated from the model base ODFs of the layers in the measurement volume and, if necessary, tilted by possible cutting angle deviations if measurable cutting angle deviations have occurred in practice, which is sometimes difficult to avoid. The deviations between the planned cutting plane and the actual cutting plane are regarded as cutting angle deviations. These can usually be represented by two angles.

In step DA6*d*, the error between the measured macro ODF and the model macro ODF previously calculated in step DA6*c* is then determined.

In step DA6*e*, it is lastly determined whether the error is below a certain error limit or whether, for example, a certain number of iteration steps has already been exceeded, or another cancellation criterion that was previously defined is checked.

If the cancellation criterion is not yet fulfilled, a control variable is simply incremented in step DA6*f*, and a correction for the model basis ODF and the possible intersection angle deviations is then calculated in step DA6*g*. The new or corrected model base ODF is then used in the further calculation starting again at step DA6*b*, i.e. the model base ODF is then rotated again according to the segment scanning direction distribution in the measurement volume in order to simulate the individual layers, then a new model macro ODF is determined in step DA6*c* for comparison with the actually measured macro ODF in step DA6*d*.

If the desired cancellation criterion is met, preferably of course the minimum error, the micro ODF can then be stored in step DA6*h* together with the parameter set PSK used to manufacture the test specimen K.

It should be noted once again at this juncture that this procedure can also be carried out with other basic properties and macro properties instead of the ODF, for example with an elasticity tensor.

It should also be mentioned that there are other ways of determining a macroscopic ODF instead of manufacturing, cutting and preparing the test specimen or recording a layer profile.

For example, this is possible with the help of tensile testing or by measuring with a so-called "Impulse Excitation Technique" ("IET"), in which the natural frequencies of the test specimen are determined. For this purpose, several test specimens are created with completely identical construction strategies (i.e. identical parameter sets and segment scanning direction distributions) but in different longitudinal directions of the bars or test specimens relative to the main build direction z. These test specimens are then used to test the tensile behaviour or the vibration behaviour in the various directions relative to the arbitrary reference direction, which is however uniform in the database and for the machine type. The IET method has the advantage over tensile tests that fewer different directions are generally required, for example, test specimens set up in only 15 different directions, whereas tensile tests require approximately 41 different directions to determine all the data.

As a rule, the elasticity tensors are first determined at macro level for these measurements. In the same way as described for step DA6 for the micro ODF or macro ODF, basic elasticity tensors for the individual layers can be determined from a macro elasticity tensor. For this purpose, a model base elasticity tensor can be assumed, which is used to calculate a model macro-elasticity tensor in order to adapt the model macro-elasticity tensor as well as possible to the actually measured macro-elasticity tensor in an iterative fit procedure (in a similar procedure as described in step DA6).

If the basic elasticity tensor of a layer is then known, this can be directly transferred to a database as the basic property value BEW. However, an orientation distribution function, i.e. the texture and/or a single-crystal elasticity tensor, can also be determined from this. Suitable methods are described, for example, in the book by U Fred Kocks, Carlos Norberto Tomé and H-R Wenk mentioned above.

As explained above, the method and the device for determining property values of a segment or for checking a current state of a segment as to whether it fulfils certain conditions can be used in particular within an optimization process in order to determine suitable process variable values for the production of a product.

In principle, however, it is also possible to carry out such a check completely separately from such an optimization process, for example to check, before use, control parameters that are intended for the manufacture of a component but were created in a different way than in the aforementioned optimization process. It is also possible to subsequently check components that have already been manufactured, which are not to be destroyed and on which certain load tests cannot therefore be carried out. For this purpose, it is sufficient to know the process variables used during production and required for the process described above.

Figure 24:
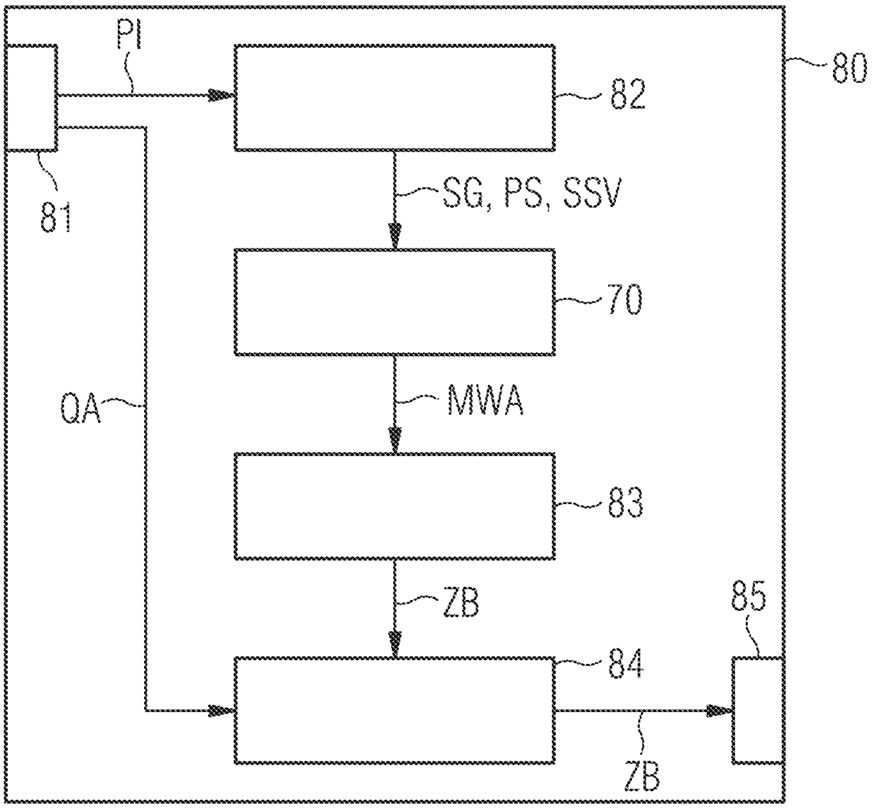
FIG. 24 shows a flow diagram of an exemplary embodiment of a process sequence for testing compliance with the property requirements of a manufacturing product.
Figure 25:
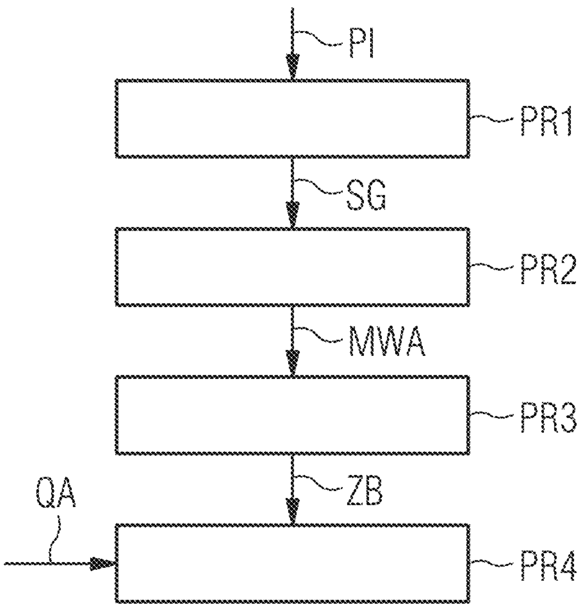
FIG. 25 is a block diagram of an exemplary embodiment of a testing device for checking compliance with the property requirements of a manufacturing product.

A testing device 80 that can be used for this purpose is shown very simplified, schematically in FIG. 24, and FIG. 25 shows a flowchart for a corresponding verification procedure. The testing device 80 can also be realized purely in the form of software components on a suitable computer, and in particular such a testing device 80 can also be integrated into other program parts, for example as a software object or sub-routine, etc.

The testing device 80 can, for example, receive product information PI about the product via an interface 81, for example geometric data of the object, the process variable values used for the object, such as the parameter set or several parameter sets already mentioned several times, as were used in different regions or segments of the component, information about rotation of the hatching strategy between different layers, and so on. This information can then be used in a segmentation unit 82 to determine whether the component consists of several segments in the sense described above, i.e. whether different parameter sets were used in different contiguous regions. This corresponds to the process step PR1 in FIG. 25. The result is then the segment information SGI or segments SG, wherein further data can also be included here, such as the number of layers of the segments, the dimensions of the segments, etc. In addition, information about the parameter sets PS and segment scanning direction distributions SSV used in the segments can also be obtained in conjunction with the segments.

In a further step PR2 (see FIG. 25), the macro property values MWA can then be determined for each of the segments SG, as previously explained with reference to FIG. 18. The device 70 also shown in FIG. 18, which is integrated here as a sub-module in the testing device 80 (see FIG. 24), can be used for this purpose.

The macro property values MWA determined by this device 70 can then be fed to a state determination unit 83, which performs step PR3 according to FIG. 25 and determines a state description for the individual segments. This can be done, for example, using the state simulation method described above. The state description can then be output as the result of the test method.

Optionally, however, a comparison with the specified quality requirements is carried out beforehand in a step PR4, i.e. it is checked whether the component fulfils the desired quality requirements. This can take place, for example, in the optional comparison unit 84 of the testing device 80, which, for this purpose, can call up the desired quality requirement data QA via the interface 81.

Via an interface 85, the state description ZB, including the information as to whether the state is such that the quality requirements are met, can then be passed on to another unit, for example a higher-level unit, which then uses this data accordingly. Of course, instead of the complete state description, e.g. also after the comparison, only a reduced state description can be output in a form that indicates whether or not the component fulfils the requirements.

It should be noted at this juncture that the testing device does not necessarily have to carry out the method as shown in FIG. 25 for the entire component, but that, for example, a state description can also be determined for individual segments of a component and these can be used in a further higher-level method or subsequent method.

Furthermore, a control data generation device 54, 54' could also have a data generation unit 57, with which it is possible to generate control data BSD, PSD for the production device 1 without the optimization process. In this case, the control data BSD, PSD is preferably first transmitted to a previously described testing device 80 (wherein this can be created internally in the control data generation device 54, 54' or can be coupled externally via a data connection to the control data generation device 54, 54') in order to (virtually) check the manufacturing product to be generated by means of this control data as described above. Based on a test result of the testing device 80, the control data BSD, PSD can then be accepted or rejected, for example by a decision unit 58, for subsequent construction. In the second case, new, more suitable control data would have to be generated.

Lastly, it should be pointed out once again that the devices and methods described in detail above are merely exemplary embodiments which can be modified by a person skilled in the art in a wide variety of ways without departing from the scope of the invention. In particular, the optimization process can be adapted almost at will to the current requirements and, for example, additional steps can be incorporated or steps can be combined or optimization criteria can be exchanged or extended. Optimization criteria can also be taken into account in different ways. It should also be noted at this juncture that although the method described above for forming a target function using a weighted sum of sub-functions may be preferred, the method is not necessarily limited to this. For example, sub-functionals can also be defined in the form of constraints, e.g. using the Lagrange multiplier method. These constraints can be, for example, equality or inequality constraints. Explanations in this regard can be found in basic works such as C. Richter, Optimierung in C++: Grundlagen und Algorithmen, 2016, Wiley-VCH, Berlin. Furthermore, the use of the indefinite article "a" or "an" does not exclude the possibility that the features in question may be present more than once. Likewise, the term "unit" does not exclude the possibility that it consists of several interacting sub-components, which may also be spatially distributed.

LIST OF REFERENCE SIGNS

1 production device/laser melting device
2 manufacturing product/component/object
2' manufacturing product/component/buffer stop
2" manufacturing product/component/square bar
3 process space/process chamber
4 chamber wall
5 container
6 container wall
7 working plane
8 construction field
10 carrier
11 base plate
12 construction platform
13 construction material (in container 5)
14 storage container

15 construction material (in storage container 14)
16 coater
17 radiant heater
20 irradiation device/exposure device
21 laser
22 impact surface of the energy beam
23 deflection device/scanner
24 focusing device
25 coupling window
50 control device
51 control unit
53 irradiation control interface
54, 54' control data generation device
55 bus
56 terminal
57 data generation unit
58 decision unit
60 device for generating optimized process variable values
61 requirement interface unit
62 interface
63 interface
64 process variable interface unit
65 optimization unit/optimizer
70 device for determining property values
71 macro property determination unit
72 parameter set interface unit
73 scanning direction interface unit
74 interface
75 interface
80 testing device
81 interface
82 segmentation unit
83 state determination unit
84 comparison unit
85 interface
AD requirement data
BEW basic property values
BSD control data/exposure control data
DBS property database system/database system
DS data memory
DA1, DA2, DA3 DA4 DA5 DA6 method steps
DA4*a*, DA4*b* sub-steps
DA6*a* to DA6*h* sub-steps
E energy beam/laser beam
EDA macro property database
EDB basic property database
FS focus control data
G area
GD geometric data
H horizontal direction
HS heating control data
HS1, HS2 layer scanning direction arrangement/hatching direction arrangement/hatching
strategy
HWR main heat flow direction
K test specimen
KPS candidate parameter sets
KWR crystal growth direction.
L, L1, L2, L3, L4 layers
LK layers
LS laser control data
ME, ME' measuring plane
MS microstructure
MS1, MS2, MS3 method steps
MWA macro property values
PGO optimized process variable values
PI product information
PR1, PR2, PR3, PR4 method steps
PS parameter set
PS' start parameter set
PSD control data/process control data
PSK parameter set
PSS parameter set suitability value/PS score
PV test procedure
QA quality requirements/quality requirement data
RO reference orientation
S scanning direction/movement direction of the impact surface
SD scan control data
SG segments
SG' start segments
SGG segment boundaries
SGI segment information
SGK test specimen segment
SG0 powder segment
SG1, SG2, SG3 segments
SP layer profile
SSV segment scanning direction distribution
SSV' start segment scanning direction distribution
SSV1, SSV2, SSV3, SSV4 segment scanning direction distribution
ST coating control data
S0 to S10 method steps
S6*a*, S6*b*, S6*c*, S9*a*, S9*b* sub-steps
TF1, . . . , TFi, . . . , TFn sub-functions/sub-functionals
THV test manufacturing process
TSD carrier control data
TX texture
V vertical direction
x, y spatial directions in layer plane
z main build direction
ZB state description
ZF target function

The invention claimed is:

1. A method for determining a macro-scale material property of a segment of an additively manufactured product constructed from layers, the method comprising:
- obtaining a parameter set defining process parameter values for forming each layer of the segment, the parameter set including a layer scanning direction arrangement specifying intralayer scanning directions used during layer solidification;
- determining a segment scanning direction distribution representing a distribution of scanning directions occurring across the layers based on orientations of the layer scanning direction arrangement between the layers;
- retrieving basic property values associated with the parameter set from a basic property database, each basic property value corresponding to a microstructural or crystallographic property of a layer formed using the parameter set; and
- computing the macro-scale material property of the segment by homogenizing the basic property values according to the segment scanning direction distribution.

2. The method of claim 1, wherein determining the segment scanning direction distribution comprises aggregating the intralayer scanning directions of the layers weighted by rotations of the layer scanning direction arrangement between successive layers.

3. The method of claim 1, wherein the basic property values comprise at least one of a texture described by an orientation density function, a microstructure descriptor, a single-crystal property, a layer elasticity tensor, a yield point distribution, a solidification coefficient, a thermal conductivity tensor, or a fracture resistance parameter.

4. The method of claim 1, wherein computing the macro-scale material property comprises applying at least one homogenization step selected from a Voigt-type averaging method, a Reuss-type averaging method, a Hill-type averaging method, or a weighted combination thereof selected according to quality requirement data or layer microstructure.

5. The method of claim 1, wherein retrieving the basic property values comprises identifying a reference-orientation basic property value stored for the parameter set and rotating the reference-orientation basic property value according to a rotation angle of the layer scanning direction arrangement for each layer.

6. The method of claim 1, further comprising storing the macro-scale material property in a macro property database indexed by the parameter set and the segment scanning direction distribution.

7. The method of claim 6, further comprising selecting the macro-scale material property from the macro property database if the parameter set and the segment scanning direction distribution match an existing entry, and computing the macro-scale material property only if no stored entry exists.

8. The method of claim 1, wherein the macro-scale material property comprises a tensor having direction-dependent values determined from the segment scanning direction distribution.

9. The method of claim 1, further comprising testing the additively manufactured product by segmenting a digital representation of the additively manufactured product into a plurality of segments, determining the macro-scale material property of each of the plurality of segments, simulating a state description of the additively manufactured product using the macro-scale material property, and comparing the state description with predefined quality requirements.

10. The method of claim 9, further comprising:

generating control data for an additive manufacturing device by generating candidate control data for forming a virtual product;

virtually evaluating the virtual product that would be formed by the candidate control data;

determining whether the virtual product satisfies quality requirements; and outputting the candidate control data for execution only if the virtual product satisfies the quality requirements.

11. The method of claim 1, further comprising creating the basic property database by manufacturing a test specimen layer by layer using a selected parameter set, performing a measurement procedure to determine at least one of the basic property values of at least one layer of the test specimen, and storing the basic property values in the basic property database indexed by the selected parameter set.

12. The method of claim 11, wherein performing the measurement procedure comprises preparing a measurement plane within the test specimen, acquiring microstructural or crystallographic measurement data in the measurement plane using electron backscatter diffraction, X-ray diffraction, or neutron diffraction, and determining the basic property values based on the measurement data.

13. The method of claim 11, further comprising determining the basic property values for multiple layers by evaluating a layer profile that extends across a plurality of layers in a measurement plane.

14. The method of claim 1, wherein at least one of the basic property values is a member of the group consisting of texture, microstructure, porosity, orientation density function, crystallographic orientation distribution, single-crystal material property, elasticity tensor, tensile strength, yield point distribution, Hill yield tensor, solidification coefficient, thermal conductivity, breaking strength, fracture resistance, and combinations thereof.

* * * * *